(12) United States Patent
Triverio et al.

(10) Patent No.: US 11,714,536 B2
(45) Date of Patent: Aug. 1, 2023

(54) AVATAR STICKER EDITOR USER INTERFACES

(71) Applicant: Apple Inc., Cupertino, CA (US)

(72) Inventors: Marco Triverio, San Francisco, CA (US); Lisa K. Forssell, Palo Alto, CA (US); Marcel Van Os, San Francisco, CA (US); Madeline Payne, Cupertino, CA (US); Paul W. Salzman, Palo Alto, CA (US); Christopher I. Wilson, Sonoma, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/746,179

(22) Filed: May 17, 2022

(65) Prior Publication Data
US 2022/0374137 A1    Nov. 24, 2022

Related U.S. Application Data

(60) Provisional application No. 63/191,864, filed on May 21, 2021.

(51) Int. Cl.
*G06F 3/0482* (2013.01)
*G06F 3/04845* (2022.01)

(52) U.S. Cl.
CPC ........ *G06F 3/04845* (2013.01); *G06F 3/0482* (2013.01); *G06F 2203/04806* (2013.01)

(58) Field of Classification Search
CPC ............... G06F 3/04845; G06F 3/0482; G06F 2203/04806
See application file for complete search history.

(56) References Cited

U.S. PATENT DOCUMENTS

| | | |
|---|---|---|
| 7,180,524 B1 | 2/2007 | Axelrod |
| 7,227,976 B1 | 6/2007 | Jung et al. |
| 7,908,554 B1 | 3/2011 | Blattner |
| 8,169,438 B1 | 5/2012 | Baraff et al. |
| 8,584,031 B2 | 11/2013 | Moore et al. |
| 8,732,609 B1 | 5/2014 | Bayersdorfer et al. |
| 8,996,639 B1 | 3/2015 | Faaborg et al. |
| 9,349,414 B1 | 5/2016 | Furment et al. |
| 9,411,506 B1 | 8/2016 | Marra et al. |
| 9,489,074 B2 | 11/2016 | Oonishi |
| 10,289,265 B2 | 5/2019 | Kulkarni |
| 10,325,416 B1 | 6/2019 | Scapel et al. |

(Continued)

FOREIGN PATENT DOCUMENTS

| | | |
|---|---|---|
| CA | 2792987 A1 | 10/2011 |
| CN | 101055646 A | 10/2007 |

(Continued)

OTHER PUBLICATIONS

Issued by the Taiwanese Patent Office in related Patent Application No. 104128684 on Feb. 23, 2017.

(Continued)

*Primary Examiner* — Hien L Duong
(74) *Attorney, Agent, or Firm* — DLA Piper LLP (US)

(57) ABSTRACT

The present disclosure generally relates to user interfaces for editing avatars. In some embodiments, user interfaces are shown for editing an avatar and avatar stickers. In some embodiments, user interfaces are shown for editing colors of one or more avatar features.

66 Claims, 39 Drawing Sheets

(56) References Cited

U.S. PATENT DOCUMENTS

| | | | |
|---|---|---|---|
| 10,325,417 B1 | 6/2019 | Scapel et al. | |
| 10,376,153 B2 | 8/2019 | Tzvieli et al. | |
| 10,410,434 B1 | 9/2019 | Scapel et al. | |
| 10,496,244 B2* | 12/2019 | Reynolds | G06T 11/001 |
| 10,505,726 B1 | 12/2019 | Andon et al. | |
| 10,580,221 B2 | 3/2020 | Scapel et al. | |
| 10,659,405 B1* | 5/2020 | Chang | G06F 3/0481 |
| 10,796,480 B2 | 10/2020 | Chen et al. | |
| 10,984,569 B2* | 4/2021 | Bondich | G06K 9/00 |
| 11,217,036 B1* | 1/2022 | Albuz | G06T 19/20 |
| 11,467,713 B2* | 10/2022 | Buzyn | G06T 19/00 |
| 2001/0050689 A1 | 12/2001 | Park | |
| 2002/0180797 A1 | 12/2002 | Bachmann | |
| 2003/0074647 A1 | 4/2003 | Andrew et al. | |
| 2005/0125744 A1 | 6/2005 | Hubbard et al. | |
| 2006/0035632 A1 | 2/2006 | Sorvari et al. | |
| 2006/0055700 A1 | 3/2006 | Niles et al. | |
| 2006/0188144 A1 | 8/2006 | Sasaki et al. | |
| 2006/0294465 A1 | 12/2006 | Ronen et al. | |
| 2007/0097113 A1 | 5/2007 | Lee et al. | |
| 2007/0162872 A1 | 7/2007 | Hong et al. | |
| 2008/0046839 A1 | 2/2008 | Mehra et al. | |
| 2008/0052242 A1 | 2/2008 | Merritt et al. | |
| 2008/0082934 A1 | 4/2008 | Kocienda et al. | |
| 2008/0155428 A1 | 6/2008 | Lee | |
| 2008/0309677 A1* | 12/2008 | Fleury | G06T 19/00 345/619 |
| 2008/0316227 A1* | 12/2008 | Fleury | G06T 13/40 345/630 |
| 2009/0027337 A1 | 1/2009 | Hildreth | |
| 2009/0044113 A1 | 2/2009 | Jones et al. | |
| 2009/0100342 A1 | 4/2009 | Jakobson et al. | |
| 2009/0144173 A1 | 6/2009 | Mo et al. | |
| 2009/0202114 A1 | 8/2009 | Morin et al. | |
| 2009/0231356 A1 | 9/2009 | Barnes et al. | |
| 2009/0249247 A1 | 10/2009 | Tseng et al. | |
| 2009/0254624 A1 | 10/2009 | Baudin et al. | |
| 2009/0297022 A1 | 12/2009 | Pettigrew et al. | |
| 2009/0300513 A1 | 12/2009 | Nims et al. | |
| 2009/0325701 A1 | 12/2009 | Andres Del Valle | |
| 2010/0026640 A1 | 2/2010 | Kim et al. | |
| 2010/0097375 A1 | 4/2010 | Tadaishi et al. | |
| 2010/0123724 A1 | 5/2010 | Moore et al. | |
| 2010/0123915 A1 | 5/2010 | Kashimoto | |
| 2010/0156807 A1 | 6/2010 | Stallings et al. | |
| 2010/0203968 A1 | 8/2010 | Gill et al. | |
| 2010/0251176 A1 | 9/2010 | Fong et al. | |
| 2011/0007174 A1 | 1/2011 | Bacivarov et al. | |
| 2011/0016425 A1 | 1/2011 | Homburg et al. | |
| 2011/0061017 A1 | 3/2011 | Ullrich et al. | |
| 2011/0074807 A1 | 3/2011 | Inada et al. | |
| 2011/0175832 A1 | 7/2011 | Miyazawa et al. | |
| 2011/0205182 A1 | 8/2011 | Miyazawa et al. | |
| 2011/0248992 A1 | 10/2011 | Van et al. | |
| 2011/0252344 A1 | 10/2011 | Van Os | |
| 2011/0265002 A1 | 10/2011 | Hong et al. | |
| 2011/0285656 A1 | 11/2011 | Yaksick et al. | |
| 2011/0302518 A1 | 12/2011 | Zhang | |
| 2012/0011449 A1 | 1/2012 | Sasson et al. | |
| 2012/0059787 A1 | 3/2012 | Brown et al. | |
| 2012/0075328 A1 | 3/2012 | Goossens | |
| 2012/0079378 A1 | 3/2012 | Goossens | |
| 2012/0102399 A1 | 4/2012 | Nicholson | |
| 2012/0113008 A1 | 5/2012 | Makinen et al. | |
| 2012/0158515 A1* | 6/2012 | K. | G06Q 30/0269 705/14.66 |
| 2012/0254318 A1 | 10/2012 | Poniatowskl | |
| 2012/0256967 A1 | 10/2012 | Baldwin et al. | |
| 2012/0293686 A1 | 11/2012 | Karn et al. | |
| 2012/0299945 A1 | 11/2012 | Aarabi | |
| 2012/0314047 A1 | 12/2012 | Kasahara et al. | |
| 2013/0014019 A1 | 1/2013 | Kim et al. | |
| 2013/0024781 A1 | 1/2013 | Douillet et al. | |
| 2013/0024802 A1 | 1/2013 | Zeng et al. | |
| 2013/0038759 A1 | 2/2013 | Jo et al. | |
| 2013/0067391 A1 | 3/2013 | Pittappilly et al. | |
| 2013/0117383 A1 | 5/2013 | Hymel et al. | |
| 2013/0141365 A1 | 6/2013 | Lynn et al. | |
| 2013/0198210 A1 | 8/2013 | Lee et al. | |
| 2013/0263043 A1 | 10/2013 | Sarbin et al. | |
| 2013/0275875 A1 | 10/2013 | Gruber et al. | |
| 2013/0286011 A1 | 10/2013 | Lv et al. | |
| 2013/0293686 A1 | 11/2013 | Blow et al. | |
| 2013/0342730 A1 | 12/2013 | Lee et al. | |
| 2014/0015784 A1 | 1/2014 | Oonishi | |
| 2014/0078144 A1* | 3/2014 | Berriman | A63F 13/61 345/426 |
| 2014/0123005 A1 | 5/2014 | Forstall et al. | |
| 2014/0137013 A1 | 5/2014 | Matas | |
| 2014/0143682 A1 | 5/2014 | Druck et al. | |
| 2014/0143693 A1 | 5/2014 | Goossens et al. | |
| 2014/0149878 A1 | 5/2014 | Mischari et al. | |
| 2014/0157167 A1 | 6/2014 | Zhu | |
| 2014/0164955 A1 | 6/2014 | Thiruvidam et al. | |
| 2014/0181219 A1 | 6/2014 | Wang et al. | |
| 2014/0195972 A1 | 7/2014 | Lee et al. | |
| 2014/0218371 A1 | 8/2014 | Du et al. | |
| 2014/0267618 A1 | 9/2014 | Esteban et al. | |
| 2014/0306898 A1 | 10/2014 | Cueto | |
| 2014/0336808 A1 | 11/2014 | Taylor et al. | |
| 2014/0351720 A1 | 11/2014 | Yin | |
| 2015/0036883 A1* | 2/2015 | Deri | G06V 10/764 382/103 |
| 2015/0077502 A1 | 3/2015 | Jordan et al. | |
| 2015/0091896 A1 | 4/2015 | Tarquini et al. | |
| 2015/0100537 A1 | 4/2015 | Grieves et al. | |
| 2015/0113435 A1 | 4/2015 | Phillips | |
| 2015/0149899 A1 | 5/2015 | Bernstein et al. | |
| 2015/0153952 A1 | 6/2015 | Grossman et al. | |
| 2015/0195179 A1 | 7/2015 | Skare et al. | |
| 2015/0213604 A1 | 7/2015 | Li et al. | |
| 2015/0248235 A1 | 9/2015 | Offenberg et al. | |
| 2015/0281145 A1 | 10/2015 | Ji | |
| 2015/0312175 A1 | 10/2015 | Langholz | |
| 2015/0370529 A1 | 12/2015 | Zambetti et al. | |
| 2016/0005211 A1 | 1/2016 | Sarkis et al. | |
| 2016/0006987 A1 | 1/2016 | Li et al. | |
| 2016/0030844 A1 | 2/2016 | Nair et al. | |
| 2016/0034133 A1 | 2/2016 | Wilson et al. | |
| 2016/0092043 A1 | 3/2016 | Missig et al. | |
| 2016/0117147 A1 | 4/2016 | Zambetti et al. | |
| 2016/0134840 A1 | 5/2016 | Mcculloch | |
| 2016/0150215 A1 | 5/2016 | Chen et al. | |
| 2016/0217601 A1* | 7/2016 | Tsuda | G06F 3/04842 |
| 2016/0247309 A1 | 8/2016 | Li et al. | |
| 2016/0275724 A1 | 9/2016 | Adeyoola et al. | |
| 2016/0284123 A1 | 9/2016 | Hare et al. | |
| 2016/0328875 A1 | 11/2016 | Fang et al. | |
| 2017/0046065 A1 | 2/2017 | Zeng et al. | |
| 2017/0068439 A1 | 3/2017 | Mohseni | |
| 2017/0069124 A1* | 3/2017 | Tong | G06T 17/20 |
| 2017/0083086 A1 | 3/2017 | Mazur et al. | |
| 2017/0140214 A1 | 5/2017 | Matas et al. | |
| 2017/0164888 A1 | 6/2017 | Matsuda et al. | |
| 2017/0193684 A1 | 7/2017 | Du et al. | |
| 2017/0206095 A1 | 7/2017 | Gibbs et al. | |
| 2017/0236298 A1 | 8/2017 | Vetter | |
| 2017/0323266 A1 | 11/2017 | Seo | |
| 2017/0352091 A1* | 12/2017 | Chen | G06F 3/04845 |
| 2018/0004404 A1 | 1/2018 | Delfino et al. | |
| 2018/0024726 A1* | 1/2018 | Hviding | G06F 3/04842 715/204 |
| 2018/0047200 A1* | 2/2018 | O'Hara | G06T 3/40 |
| 2018/0074693 A1 | 3/2018 | Jones et al. | |
| 2018/0081515 A1 | 3/2018 | Block et al. | |
| 2018/0091732 A1* | 3/2018 | Wilson | G06F 3/048 |
| 2018/0165862 A1 | 6/2018 | Sawaki | |
| 2018/0189549 A1 | 7/2018 | Inomata | |
| 2018/0268589 A1 | 9/2018 | Grant | |
| 2018/0324353 A1 | 11/2018 | Kim et al. | |
| 2018/0329587 A1 | 11/2018 | Ko et al. | |
| 2018/0335930 A1* | 11/2018 | Scapel | G06V 40/175 |
| 2018/0336715 A1* | 11/2018 | Rickwald | H04L 51/10 |
| 2018/0349795 A1 | 12/2018 | Boyle et al. | |

(56) References Cited

U.S. PATENT DOCUMENTS

| | | | |
|---|---|---|---|
| 2019/0158735 A1* | 5/2019 | Wilson | G06F 3/04845 |
| 2019/0266775 A1* | 8/2019 | Lee | G06V 40/166 |
| 2019/0266807 A1 | 8/2019 | Lee et al. | |
| 2019/0295056 A1* | 9/2019 | Wright | G06Q 30/0641 |
| 2019/0339847 A1 | 11/2019 | Scapel et al. | |
| 2019/0342507 A1 | 11/2019 | Dye et al. | |
| 2019/0347868 A1 | 11/2019 | Scapel et al. | |
| 2019/0371033 A1* | 12/2019 | Scapel | G06T 15/503 |
| 2020/0034025 A1* | 1/2020 | Brady | G09B 19/00 |
| 2020/0201540 A1 | 6/2020 | Zambetti et al. | |
| 2020/0234481 A1* | 7/2020 | Scapel | A63F 13/213 |
| 2020/0234508 A1 | 7/2020 | Shaburov et al. | |
| 2020/0264738 A1* | 8/2020 | Lee | H04N 1/32309 |
| 2020/0402304 A1* | 12/2020 | Hwang | G06V 40/176 |
| 2020/0409533 A1* | 12/2020 | Blackstock | G06F 3/0482 |
| 2021/0056769 A1 | 2/2021 | Scapel et al. | |
| 2021/0335055 A1 | 10/2021 | Scapel et al. | |
| 2021/0349612 A1 | 11/2021 | Triverio | |
| 2022/0206675 A1* | 6/2022 | Hawkes | A63F 13/46 |
| 2022/0229546 A1* | 7/2022 | Lee | G06F 3/0482 |
| 2022/0291793 A1 | 9/2022 | Zambetti et al. | |
| 2022/0301041 A1* | 9/2022 | Lee | G06K 9/00 |
| 2022/0319075 A1* | 10/2022 | Hu | H04L 51/10 |

FOREIGN PATENT DOCUMENTS

| | | |
|---|---|---|
| CN | 101098535 A | 1/2008 |
| CN | 101203821 A | 6/2008 |
| CN | 101329707 A | 12/2008 |
| CN | 101692681 A | 4/2010 |
| CN | 101742053 A | 6/2010 |
| CN | 102035990 A | 4/2011 |
| CN | 102142149 A | 8/2011 |
| CN | 102271241 A | 12/2011 |
| CN | 102298797 A | 12/2011 |
| CN | 102622085 A | 8/2012 |
| CN | 102790826 A | 11/2012 |
| CN | 102854979 A | 1/2013 |
| CN | 103516894 A | 1/2014 |
| CN | 103703438 A | 4/2014 |
| CN | 103713843 A | 4/2014 |
| CN | 103744671 A | 4/2014 |
| CN | 103927190 A | 7/2014 |
| CN | 104182741 A | 12/2014 |
| CN | 104246793 A | 12/2014 |
| CN | 104376160 A | 2/2015 |
| CN | 104753762 A | 7/2015 |
| CN | 105100462 A | 11/2015 |
| CN | 105190700 A | 12/2015 |
| CN | 105391937 A | 3/2016 |
| CN | 105611275 A | 5/2016 |
| CN | 107924113 A | 4/2018 |
| EP | 1215867 A2 | 6/2002 |
| EP | 1777611 A1 | 4/2007 |
| EP | 2040146 A2 | 3/2009 |
| EP | 2302493 A2 | 3/2011 |
| EP | 2416563 A2 | 2/2012 |
| EP | 2437148 A2 | 4/2012 |
| EP | 2615607 A2 | 7/2013 |
| EP | 2653961 A1 | 10/2013 |
| EP | 2677775 A1 | 12/2013 |
| EP | 2720126 A1 | 4/2014 |
| EP | 3190563 A1 | 7/2017 |
| GB | 2370208 A | 6/2002 |
| JP | 9-9072 A | 1/1997 |
| JP | 2000-76460 A | 3/2000 |
| JP | 2003-219217 A | 7/2003 |
| JP | 2004-519033 A | 6/2004 |
| JP | 2005-532607 A | 10/2005 |
| JP | 2006-520053 A | 8/2006 |
| JP | 2007-528240 A | 10/2007 |
| JP | 2008-97202 A | 4/2008 |
| JP | 2011-517810 A | 6/2011 |
| JP | 2011-525648 A | 9/2011 |
| JP | 2011-209887 A | 10/2011 |
| JP | 2011-530101 A | 12/2011 |
| JP | 2012-38292 A | 2/2012 |
| JP | 2012-123475 A | 6/2012 |
| JP | 2013-97760 A | 5/2013 |
| JP | 2014-206817 A | 10/2014 |
| JP | 2016-136324 A | 7/2016 |
| JP | 2017-527917 A | 9/2017 |
| JP | 6240301 B1 | 11/2017 |
| JP | 6266736 B1 | 1/2018 |
| JP | 2018-106365 A | 7/2018 |
| KR | 10-2004-0046272 A | 6/2004 |
| KR | 10-2008-0050336 A | 6/2008 |
| KR | 10-2010-0086052 A | 7/2010 |
| KR | 10-2011-0028581 A | 3/2011 |
| KR | 10-2014-0033088 A | 3/2014 |
| KR | 10-2014-0049340 A | 4/2014 |
| KR | 10-2015-0067197 A | 6/2015 |
| KR | 10-1540544 B1 | 7/2015 |
| KR | 10-1587115 B1 | 1/2016 |
| WO | 99/66394 A1 | 12/1999 |
| WO | 99/66395 A2 | 12/1999 |
| WO | 2006/094308 A2 | 9/2006 |
| WO | 2009/073607 A2 | 6/2009 |
| WO | 2009/114239 A1 | 9/2009 |
| WO | 2009/133710 A1 | 11/2009 |
| WO | 2011/127309 A1 | 10/2011 |
| WO | 2011/130849 A8 | 5/2012 |
| WO | 2012/128361 A1 | 9/2012 |
| WO | 2012/170354 A2 | 12/2012 |
| WO | 2013/120851 A1 | 8/2013 |
| WO | 2013/169851 A2 | 11/2013 |
| WO | 2013/169854 A2 | 11/2013 |
| WO | 2013/169870 A1 | 11/2013 |
| WO | 2013/169877 A2 | 11/2013 |
| WO | 2014/024000 A1 | 2/2014 |
| WO | 2014/053063 A1 | 4/2014 |
| WO | 2014/094199 A1 | 6/2014 |
| WO | 2014/105279 A1 | 7/2014 |
| WO | 2016/036218 A1 | 3/2016 |
| WO | 2016/036522 A2 | 3/2016 |
| WO | 2016/042926 A1 | 3/2016 |
| WO | 2016/045005 A1 | 3/2016 |
| WO | 2016/101124 A1 | 6/2016 |
| WO | 2016/101131 A1 | 6/2016 |
| WO | 2016/161556 A1 | 10/2016 |
| WO | 2017/218193 A1 | 12/2017 |
| WO | 2018/057272 A1 | 3/2018 |
| WO | 2019/216999 A1 | 11/2019 |
| WO | 2020/226785 A1 | 11/2020 |

OTHER PUBLICATIONS

Issued by the Chinese Patent Office in related Patent Application No. 201621208900.6 on Apr. 26, 2017.

Applivgames, "Super Mario Run" Stickers for iMessage: Free Delivery Started!, Available online at: <https://games.appliv.jp/archives/178627>, Sep. 13, 2016, 3 pages, Japanese Patent Office in an Office Action for related Patent Application No. 2019-215503, dated Feb. 5, 2021

Contents Pocket, "Line Stamp Information", Available online at: <https://web.archive.org/web/20150404080541/http://contentspocket.net/linestamp.html>, Apr. 2015, 2 pages, Japanese Patent Office in an Office Action for related Patent Application No. 2019-215503, dated Feb. 5, 2021.

Enterbrain, "No. 5 Create your own Avatar Mii Studio", vol. 26, No. 11, p. 138, Feb. 24, 2011, 4 pages, Japanese Patent Office in an Office Action for related Patent Application No. 2018-184254 dated Mar. 2, 2020.

Kyoko Makino, "How to Make a Lookalike Face Icon for Your Friend", ASCII, Japan Weekly, ASCII Media Works Inc., vol. 24, pp. 90-93, Jul. 17, 2014, 7 pages, Japanese Patent Office in an Office Action for related Patent Application No. 2018-184254 dated Mar. 2, 2020.

Mitsuru Takeuchi, "Face Shape Selection for Automatic Avatar Generation", 13th Annual Conference Proceedings of Virtual Reality Society of Japan tournament Papers [DVD-ROM], The Virtual

(56) References Cited

OTHER PUBLICATIONS

Reality Society of Japan, Sep. 24, 2008, 7 pages, Japanese Patent Office in an Office Action for related Patent Application No. 2018-184254 dated Mar. 2, 2020.
Tsuchihashi et al., "Generation of Caricatures by Automatic Selection of Templates for Shapes and Placement of Facial Parts", Technical Report of the Institute of Image Information and Television Engineers, Japan, The Institute of Image Information and Television Engineers, vol. 33, No. 11, pp. 77-80., Feb. 8, 2009, 7 pages, Japanese Patent Office in an Office Action for related Patent Application No. 2018-184254 dated Mar. 2, 2020.
Zy News, "Generate Cartoon Face within Three Seconds, you are the New-generation Expression Emperor", Online available at:<http://inews.ifeng.com/48551936/news.shtml>, Apr. 22, 2016, 3 pages, Chinese Patent Office in an Office Action for related Patent Application No. 201911199054.4 dated Jan. 20, 2021.
Advisory Action received for U.S. Appl. No. 14/833,014, dated Jan. 27, 2017, 3 pages.
Advisory Action received for U.S. Appl. No. 16/259,771, dated Feb. 26, 2020, 3 pages.
Advisory Action received for U.S. Appl. No. 16/259,771, dated Jul. 14, 2020, 6 pages.
Advisory Action received for U.S. Appl. No. 16/806,981, dated Jun. 14, 2021, 6 pages.
Applicant Initiated Interview Summary received for U.S. Appl. No. 16/259,771, dated May 5, 2020, 10 pages.
Applicant Initiated Interview Summary received for U.S. Appl. No. 16/806,981, dated Jan. 28, 2022, 4 pages.
Applicant-Initiated Interview Summary received for U.S. Appl. No. 16/259,771, dated Apr. 18, 2022, 2 pages.
Applicant-Initiated Interview Summary received for U.S. Appl. No. 16/519,850, dated Jun. 26, 2020, 4 pages.
Applicant-Initiated Interview Summary received for U.S. Appl. No. 17/093,408, dated Mar. 1, 2022, 3 pages.
Brief Communication Regarding Oral Proceedings received for European Patent Application No. 19172407.9, mailed on Nov. 9, 2020, 1 page.
Brief Communication Regarding Oral Proceedings received for European Patent Application No. 19172407.9, mailed on Nov. 20, 2020, 2 pages.
Certificate of Examination received for Australian Patent Application No. 2019100497, dated Jul. 29, 2019, 2 pages.
Certificate of Examination received for Australian Patent Application No. 2019101019, dated Nov. 12, 2019, 2 pages.
Certificate of Examination received for Australian Patent Application No. 2019101667, dated Mar. 20, 2020, 2 pages.
Certificate of Examination received for Australian Patent Application No. 2020100675, dated Jun. 30, 2020, 2 pages.
Certificate of Examination received for Australian Patent Application No. 2020101715, dated Oct. 6, 2020, 2 pages.
Corrected Notice of Allowance received for U.S. Appl. No. 15/713,490, dated May 1, 2019, 2 pages.
Corrected Notice of Allowance received for U.S. Appl. No. 16/142,288, dated Jul. 30, 2019, 5 pages.
Corrected Notice of Allowance received for U.S. Appl. No. 16/519,850, dated Nov. 2, 2020, 5 pages.
Corrected Notice of Allowance received for U.S. Appl. No. 16/519,850, dated Sep. 8, 2020, 5 pages.
Corrected Notice of Allowance received for U.S. Appl. No. 17/091,460, dated Feb. 16, 2022, 6 pages.
Corrected Notice of Allowance received for U.S. Appl. No. 17/091,460, dated Feb. 25, 2022, 6 pages.
Decision on Appeal received for U.S. Appl. No. 14/833,014, mailed on Oct. 30, 2019, 10 pages.
Decision on Appeal received for U.S. Appl. No. 16/259,771, mailed on Aug. 19, 2021, 12 pages.
Decision to Grant received for Danish Patent Application No. PA201670320, dated Oct. 18, 2018, 2 pages.
Decision to Grant received for Danish Patent Application No. PA201870372, dated Jun. 17, 2020, 2 pages.
Decision to Grant received for Danish Patent Application No. PA201870375, dated Jul. 24, 2019, 2 pages.
Decision to Grant received for Danish Patent Application No. PA201870377, dated May 14, 2019, 2 pages.
Decision to Grant received for European Patent Application No. 15759998.6, dated Jun. 18, 2020, 2 pages.
Decision to Grant received for European Patent Application No. 19172407.9, dated Jun. 17, 2021, 2 pages.
Decision to Grant received for European Patent Application No. 20168021.2, dated Feb. 3, 2022, 2 pages.
European Search Report received for European Patent Application No. 19172407.9, dated Oct. 9, 2019, 4 pages.
European Search Report received for European Patent Application No. 19181242.9, dated Nov. 27, 2019, 4 pages.
European Search Report received for European Patent Application No. 20168021.2, dated Jul. 8, 2020, 4 pages.
Examiner Interview Summary received for U.S. Appl. No. 16/806,981, dated Mar. 26, 2021, 2 pages.
Examiner-Initiated Interview Summary received for U.S. Appl. No. 16/806,981, dated Jan. 13, 2022, 4 pages.
Examiner-Initiated Interview Summary received for U.S. Appl. No. 16/806,981, dated May 24, 2021, 4 pages.
Examiner's Answer to Appeal Brief received for U.S. Appl. No. 14/833,014, mailed on Nov. 2, 2017, 48 pages.
Examiner's Answer to Appeal Brief received for U.S. Appl. No. 16/259,771, mailed on Oct. 23, 2020, 15 pages.
Examiner's Pre-Review Report received for Japanese Patent Application No. 2019-215503, dated Aug. 20, 2021, 15 pages (8 pages of English Translation and 7 pages of Official Copy).
Extended European Search Report received for European Patent Application No. 17853657.9, dated May 28, 2020, 9 pages.
Extended European Search Report received for European Patent Application No. 19212057.4, dated Feb. 27, 2020, 8 pages.
Extended European Search Report received for European Patent Application No. 20176616.9, dated Sep. 8, 2020, 7 pages.
Final Office Action received for U.S. Appl. No. 14/833,014, dated Oct. 26, 2016, 32 pages.
Final Office Action received for U.S. Appl. No. 15/352,215, dated Mar. 7, 2019, 22 pages.
Final Office Action received for U.S. Appl. No. 16/116,221, dated Mar. 22, 2019, 35 pages.
Final Office Action received for U.S. Appl. No. 16/259,771, dated Nov. 18, 2019, 13 pages.
Final Office Action received for U.S. Appl. No. 16/806,981, dated Apr. 14, 2021, 24 pages.
Final Office Action received for U.S. Appl. No. 16/806,981, dated Mar. 1, 2022, 33 pages.
Final Office Action received for U.S. Appl. No. 17/093,408, dated May 18, 2022, 41 pages.
Here are Warez Files: Eve Online Character Creator, Online Available at: <http://theherearewarezfiles.blogspot.com/2014/03/eve-online-character-creator-download.html>, Mar. 3, 2014, 7 pages.
Intention to Grant received for Danish Patent Application No. PA201670320, dated May 17, 2018, 2 pages.
Intention to Grant received for Danish Patent Application No. PA201870372, dated Feb. 13, 2020, 2 pages.
Intention to Grant received for Danish Patent Application No. PA201870375, dated Jun. 3, 2019, 2 pages.
Intention to Grant received for Danish Patent Application No. PA201870375, dated Mar. 26, 2019, 2 pages.
Intention to Grant received for Danish Patent Application No. PA201870377, dated Mar. 26, 2019, 2 pages.
Intention to Grant received for European Patent Application No. 15759998.6, dated Apr. 17, 2020, 10 pages.
Intention to Grant received for European Patent Application No. 15759998.6, dated Nov. 21, 2019, 12 pages.
Intention to Grant received for European Patent Application No. 19172407.9, dated Feb. 11, 2021, 9 pages.
Intention to Grant received for European Patent Application No. 19181242.9, dated Oct. 28, 2021, 16 pages.
Intention to Grant received for European Patent Application No. 20168021.2, dated Apr. 15, 2021, 8 pages.

(56) References Cited

OTHER PUBLICATIONS

Intention to Grant received for European Patent Application No. 20168021.2, dated Sep. 20, 2021, 8 pages.
International Preliminary Report on Patentability received for PCT Patent Application No. PCT/US2015/046262, dated Mar. 16, 2017, 26 pages.
International Preliminary Report on Patentability received for PCT Patent Application No. PCT/US2017/049795, dated Apr. 4, 2019, 16 pages.
International Preliminary Report on Patentability received for PCT Patent Application No. PCT/US2019/023793, dated Nov. 19, 2020, 12 pages.
International Search Report and Written Opinion received for PCT Application No. PCT/US2017/049795, dated Dec. 27, 2017, 26 pages.
International Search Report and Written Opinion received for PCT Patent Application No. PCT/US2019/023793, dated Aug. 27, 2019, 17 pages.
International Search Report and Written Opinion received for PCT Patent Application No. PCT/US2021/031096, dated Oct. 13, 2021, 16 pages.
Invitation to Pay Additional Fees received for PCT Patent Application No. PCT/US2017/049795, mailed on Nov. 3, 2017, 3 pages.
Invitation to Pay Additional Fees received for PCT Patent Application No. PCT/US2019/023793, mailed on Jul. 5, 2019, 11 pages.
Invitation to Pay Additional Fees received for PCT Patent Application No. PCT/US2021/031096, mailed on Aug. 19, 2021, 8 pages.
Minutes of the Oral Proceedings received for European Patent Application No. 19181242.9, mailed on Dec. 15, 2020, 6 pages.
Non-Final Office Action received for U.S. Appl. No. 15/352,215, dated Sep. 20, 2018, 31 pages.
Non-Final Office Action received for U.S. Appl. No. 16/116,221, dated Nov. 13, 2018, 27 pages.
Non-Final Office Action received for U.S. Appl. No. 16/142,288, dated Nov. 20, 2018, 15 pages.
Non-Final Office Action received for U.S. Appl. No. 16/142,305, dated Nov. 23, 2018, 32 pages.
Non-Final Office Action received for U.S. Appl. No. 16/142,328, dated Nov. 8, 2018, 18 pages.
Non-Final Office Action received for U.S. Appl. No. 16/259,771, dated Jan. 25, 2022, 20 pages.
Non-Final Office Action received for U.S. Appl. No. 16/259,771, dated May 8, 2019, 11 pages.
Non-Final Office Action received for U.S. Appl. No. 16/519,850, dated Mar. 23, 2020, 8 pages.
Non-Final Office Action received for U.S. Appl. No. 16/806,981, dated Nov. 13, 2020, 22 pages.
Non-Final Office Action received for U.S. Appl. No. 16/806,981, dated Sep. 1, 2021, 27 pages.
Non-Final Office Action received for U.S. Appl. No. 17/091,460, dated Sep. 10, 2021, 10 pages.
Non-Final Office Action received for U.S. Appl. No. 17/093,408, dated Dec. 8, 2021, 37 pages.
Notice of Acceptance received for Australian Patent Application No. 2017330212, dated Apr. 28, 2020, 3 pages.
Notice of Acceptance received for Australian Patent Application No. 2019265357, dated Dec. 24, 2020, 3 pages.
Notice of Acceptance received for Australian Patent Application No. 2020213402, dated Sep. 21, 2020, 3 pages.
Notice of Acceptance received for Australian Patent Application No. 2020294208, dated Mar. 2, 2022, 3 pages.
Notice of Allowance received for Chinese Patent Application No. 201510557356.X, dated Mar. 5, 2020, 2 pages (1 page of English Translation and 1 pages of Official Copy).
Notice of Allowance received for Chinese Patent Application No. 201910379481.4, dated Nov. 9, 2020, 6 pages (3 pages of English Translation and 3 pages of Official Copy).
Notice of Allowance received for Danish Patent Application No. PA201570563, dated May 24, 2016, 2 pages.
Notice of Allowance received for Japanese Patent Application No. 2018-107114, dated Mar. 22, 2019, 4 pages (1 page of English Translation and 3 pages of Official Copy).
Notice of Allowance received for Japanese Patent Application No. 2018-184254, dated Jun. 15, 2020, 5 pages (2 pages of English Translation and 3 pages of Official Copy).
Notice of Allowance received for Japanese Patent Application No. 2019-511767, dated Mar. 30, 2020, 4 pages (1 page of English Translation and 3 pages of Official Copy).
Notice of Allowance received for Japanese Patent Application No. 2020-120086, dated Nov. 15, 2021, 5 pages (2 pages of English Translation and 3 pages of Official Copy).
Notice of Allowance received for Korean Patent Application No. 10-2019-7005369, dated Oct. 26, 2020, 4 pages (1 page of English Translation and 3 pages of Official Copy).
Notice of Allowance received for Korean Patent Application No. 10-2020-7032147, dated May 12, 2021, 5 pages (2 pages of English Translation and 3 pages of Official Copy).
Notice of Allowance received for Korean Patent Application No. 10-2021-7023617, dated Dec. 21, 2021, 6 pages (2 pages of English Translation and 4 pages of Official Copy).
Notice of Allowance received for Netherland Patent Application No. 2019753, dated Jul. 6, 2018, 6 pages (2 pages of English Translation and 4 pages of Official copy).
Notice of Allowance received for Taiwanese Patent Application No. 104128684, dated Feb. 23, 2017, 3 pages (Official Copy only) See Communication Under 37 CFR § 1.98(a) (3).
Notice of Allowance received for U.S. Appl. No. 14/833,014, dated Nov. 20, 2019, 5 pages.
Notice of Allowance received for U.S. Appl. No. 15/352,215, dated Nov. 27, 2019, 20 pages.
Notice of Allowance received for U.S. Appl. No. 15/713,490, dated Mar. 20, 2019, 15 pages.
Notice of Allowance received for U.S. Appl. No. 16/116,221, dated Nov. 22, 2019, 13 pages.
Notice of Allowance received for U.S. Appl. No. 16/116,221, dated Sep. 20, 2019, 13 pages.
Notice of Allowance received for U.S. Appl. No. 16/142,288, dated Jun. 24, 2019, 10 pages.
Notice of Allowance received for U.S. Appl. No. 16/142,288, dated Mar. 27, 2019, 9 pages.
Notice of Allowance received for U.S. Appl. No. 16/142,288, dated May 1, 2019, 4 pages.
Notice of Allowance received for U.S. Appl. No. 16/142,305, dated Apr. 3, 2019, 5 pages.
Notice of Allowance received for U.S. Appl. No. 16/142,305, dated May 1, 2019, 2 pages.
Notice of Allowance received for U.S. Appl. No. 16/142,328, dated Apr. 5, 2019, 7 pages.
Notice of Allowance received for U.S. Appl. No. 16/519,850, dated Aug. 26, 2020, 8 pages.
Notice of Allowance received for U.S. Appl. No. 17/091,460, dated Apr. 28, 2022, 9 pages.
Notice of Allowance received for U.S. Appl. No. 17/091,460, dated Feb. 4, 2022, 10 pages.
Notice of Allowance received for U.S. Appl. No. 17/091,460, dated May 23, 2022, 9 pages.
Office Action received for Australian Patent Application No. 2017330212, dated Feb. 21, 2020, 2 pages.
Office Action received for Australian Patent Application No. 2020294208, dated Dec. 17, 2021, 2 pages.
Office Action received for Chinese Patent Application No. 201510557356.X, dated Aug. 15, 2019, 12 pages (7 pages of English Translation and 5 pages of Official Copy).
Office Action received for Chinese Patent Application No. 201510557356.X, dated Dec. 29, 2017, 11 pages (5 pages of English Translation and 6 pages of Official Copy).
Office Action received for Chinese Patent Application No. 201510557356.X, dated Nov. 23, 2018, 12 pages (5 pages of English Translation and 7 pages of Official Copy).
Office Action received for Chinese Patent Application No. 201520679198.0, dated Jun. 24, 2016, 5 pages (3 pages of English Translation and 2 pages of Official Copy).

(56) References Cited

OTHER PUBLICATIONS

Office Action received for Chinese Patent Application No. 201621208900.6, dated Apr. 26, 2017, 2 pages (Official Copy only) See Communication Under 37 CFR § 1.98(a) (3).
Office Action received for Chinese Patent Application No. 201810411708.4, dated Feb. 24, 2022, 10 pages (5 pages of English Translation and 5 pages of Official Copy).
Office Action received for Chinese Patent Application No. 201810411708.4, dated Feb. 26, 2021, 16 pages (8 pages of English Translation and 8 pages of Official Copy).
Office Action received for Chinese Patent Application No. 201810411708.4, dated Nov. 12, 2021, 12 pages (6 pages of English Translation and 6 pages of Official Copy).
Office Action received for Chinese Patent Application No. 201910315328.5, dated Nov. 30, 2021, 21 pages (10 pages of English Translation and 11 pages of Official Copy).
Office Action received for Chinese Patent Application No. 201910379481.4, dated Mar. 2, 2020, 18 pages (10 pages of English Translation and 8 pages of Official Copy).
Office Action received for Chinese Patent Application No. 201910691865.X, dated Aug. 4, 2021, 10 pages (6 pages of English Translation and 4 pages of Official Copy).
Office Action received for Chinese Patent Application No. 201910691865.X, dated Feb. 4, 2021, 16 pages (9 pages of English Translation and 7 pages of Official Copy).
Office Action received for Chinese Patent Application No. 201910691865.X, dated Jul. 8, 2020, 17 pages (8 pages of English Translation and 9 pages of Official Copy).
Office Action received for Chinese Patent Application No. 201910691872.X, dated Jun. 3, 2020, 10 pages (5 pages of English Translation and 5 pages of Official Copy).
Office Action received for Chinese Patent Application No. 201910691872.X, dated Jun. 23, 2021, 10 pages (5 pages of English Translation and 5 pages of Official Copy).
Office Action received for Chinese Patent Application No. 201910691872.X, dated Mar. 24, 2021, 19 pages (9 pages of English Translation and 10 pages of Official Copy).
Office Action received for Chinese Patent Application No. 201910691872.X, dated Nov. 10, 2021, 16 pages (9 pages of English Translation and 7 pages of Official Copy).
Office Action received for Chinese Patent Application No. 201911199054.4, dated Jan. 20, 2021, 19 pages (11 pages of English Translation and 8 pages of Official Copy).
Office Action received for Chinese Patent Application No. 201911199054.4, dated Jul. 3, 2020, 15 pages (9 pages of English Translation and 6 pages of Official Copy).
Office Action received for Chinese Patent Application No. 201911199054.4, dated Jun. 10, 2021, 13 pages (7 pages of English Translation and 6 pages of Official Copy).
Office Action received for Chinese Patent Application No. 202010330318.1, dated Jul. 13, 2021, 12 pages (6 pages of English Translation and 6 pages of Official Copy).
Office Action received for Chinese Patent Application No. 202010330318.1, dated Mar. 31, 2021, 13 pages (7 pages of English Translation and 6 pages of Official Copy).
Office Action received for Chinese Patent Application No. 202010330318.1, dated Nov. 19, 2020, 18 pages (9 pages of English Translation and 9 pages of Official Copy).
Office Action received for Chinese Patent Application No. 202110820692.4, dated Mar. 15, 2022, 18 pages (9 pages of English Translation and 9 pages of Official Copy).
Office Action received for Danish Patent Application No. PA201670319, dated Aug. 2, 2016, 6 pages.
Office Action received for Danish Patent Application No. PA201670319, dated Jun. 21, 2017, 6 pages.
Office Action received for Danish Patent Application No. PA201670319, dated Nov. 24, 2016, 7 pages.
Office Action received for Danish Patent Application No. PA201670320, dated Aug. 4, 2016, 9 pages.
Office Action received for Danish Patent Application No. PA201670320, dated Dec. 5, 2016, 4 pages.
Office Action received for Danish Patent Application No. PA201670320, dated Jan. 18, 2018, 2 pages.
Office Action received for Danish Patent Application No. PA201670320, dated Jul. 3, 2017, 4 pages.
Office Action received for Danish Patent Application No. PA201870372, dated Aug. 20, 2019, 2 pages.
Office Action received for Danish Patent Application No. PA201870372, dated Jan. 31, 2019, 4 pages.
Office Action received for Danish Patent Application No. PA201870374, dated Feb. 6, 2019, 5 pages.
Office Action received for Danish Patent Application No. PA201870374, dated Jun. 17, 2019, 5 pages.
Office Action received for Danish Patent Application No. PA201870375, dated Jan. 31, 2019, 4 pages.
Office Action received for Danish Patent Application No. PA201870377, dated Jan. 31, 2019, 4 pages.
Office Action received for European Patent Application No. 15759998.6, dated Dec. 19, 2018, 6 pages.
Office Action received for European Patent Application No. 15759998.6, dated Jul. 16, 2018, 6 pages.
Office Action received for European Patent Application No. 15759998.6, dated May 29, 2019, 6 pages.
Office Action received for European Patent Application No. 17853657.9, dated Apr. 1, 2021, 6 pages.
Office Action received for European Patent Application No. 19172407.9, dated Oct. 18, 2019, 7 pages.
Office Action received for European Patent Application No. 19181242.9, dated Dec. 6, 2019, 9 pages.
Office Action received for European Patent Application No. 19212057.4, dated Mar. 9, 2021, 6 pages.
Office Action received for European Patent Application No. 20168021.2, dated Jul. 22, 2020, 8 pages.
Office Action received for European Patent Application No. 20176616.9, dated Jun. 10, 2021, 4 pages.
Office Action received for Indian Patent Application No. 201814036472, dated Jul. 8, 2021, 8 pages.
Office Action received for Japanese Patent Application No. 2017-510631, dated Mar. 2, 2018, 12 pages (7 pages of English Translation and 5 pages of Official Copy).
Office Action received for Japanese Patent Application No. 2018-107114, dated Oct. 9, 2018, 4 pages (2 pages of English Translation and 2 pages of Official copy).
Office Action received for Japanese Patent Application No. 2018-184254, dated Mar. 2, 2020, 8 pages (4 pages of English Translation and 4 pages of Official Copy).
Office Action received for Japanese Patent Application No. 2019-215503, dated Feb. 5, 2021, 12 pages (6 pages of English Translation and 6 pages of Official Copy).
Office Action received for Japanese Patent Application No. 2019-215503, dated Jul. 3, 2020, 12 pages (6 pages of English Translation and 6 pages of Official Copy).
Office Action received for Japanese Patent Application No. 2020-120086, dated May 21, 2021, 6 pages (3 pages of English Translation and 3 pages of Official Copy).
Office Action received for Japanese Patent Application No. 2020-120086, dated Nov. 20, 2020, 6 pages (3 pages of English Translation and 3 pages of Official Copy).
Office Action received for Japanese Patent Application No. 2021-092483, dated Apr. 1, 2022, 8 pages (4 pages of English Translation and 4 pages of Official Copy).
Office Action received for Korean Patent Application No. 10-2019-7005369, dated Mar. 13, 2020, 12 pages (5 pages of English Translation and 7 pages of Official Copy).
Office Action received for Korean Patent Application No. 10-2020-7032147, dated Feb. 16, 2021, 6 pages (2 pages of English Translation and 4 pages of Official Copy).
Office Action received for Korean Patent Application No. 10-2021-7002582, dated Apr. 16, 2021, 13 pages (6 pages of English Translation and 7 pages of Official Copy).

(56) References Cited

OTHER PUBLICATIONS

Office Action received for Korean Patent Application No. 10-2021-7002582, dated Oct. 29, 2021, 6 pages (3 pages of English Translation and 3 pages of Official Copy).
Office Action received for Korean Patent Application No. 10-2022-7003364, dated Apr. 22, 2022, 14 pages (6 pages of English Translation and 8 pages of Official Copy).
Office Action received for Netherland Patent Application No. 2019753, dated Apr. 12, 2018, 8 pages (3 page of English Translation and 5 pages of Official Copy).
Office Action received for Taiwanese Patent Application No. 104128684, dated Nov. 8, 2016, 24 pages (9 pages of English Translation and 15 pages of Official Copy).
Record of Oral Hearing received for U.S. Appl. No. 16/259,771, mailed on Aug. 4, 2021, 15 pages.
Result of Consultation received for European Patent Application No. 19172407.9, mailed on Nov. 5, 2020, 17 pages.
Result of Consultation received for European Patent Application No. 19181242.9, mailed on Dec. 1, 2020, 12 pages.
Search Report and Opinion received for Danish Patent Application No. PA201870372, dated Sep. 14, 2018, 8 pages.
Search Report and Opinion received for Danish Patent Application No. PA201870372, dated Sep. 17, 2018, 10 pages.
Search Report and Opinion received for Danish Patent Application No. PA201870374, dated Aug. 27, 2018, 9 pages.
Search Report and Opinion received for Danish Patent Application No. PA201870375, dated Aug. 23, 2018, 8 pages.
Search Report and Opinion received for Danish Patent Application No. PA201870377, dated Sep. 4, 2018, 8 pages.
Search Report and Opinion received for Netherlands Patent Application No. 2015364, dated Jul. 4, 2017, 12 pages (5 pages of English Translation of Search Opinion and 7 pages of official copy).
Summons to Attend Oral Proceedings received for European Patent Application No. 19172407.9, mailed on Jun. 24, 2020, 14 pages.
Summons to Attend Oral Proceedings received for European Patent Application No. 19181242.9, mailed on Jun. 16, 2020, 12 pages.
Summons to Attend Oral Proceedings received for European Patent Application No. 19181242.9, mailed on May 19, 2022, 7 pages.
Summons to Attend Oral Proceedings received for European Patent Application No. 20176616.9, mailed on Dec. 17, 2021, 7 pages.
Supplemental Notice of Allowance received for U.S. Appl. No. 14/833,014, dated Mar. 12, 2020, 2 pages.
Supplemental Notice of Allowance received for U.S. Appl. No. 15/713,490, dated May 30, 2019, 2 pages.
Non-Final Office Action received for U.S. Appl. No. 14/833,014, dated Mar. 21, 2016, 26 pages.
Office Action Received for Australian Patent Application No. 2015101183, dated Nov. 6, 2015, 4 pages.
Office Action received for Chinese Patent Application No. 2015206791980, dated Mar. 7, 2016, 6 pages (4 pages of English Translation and 2 pages of Official Copy).
Office Action Received for Chinese Patent Application No. 2015206791980, dated Nov. 18, 2015, 4 pages (2 pages English Translation and 2 pages Official copy).
Applivgames, "Super Mario Run" Stickers for iMessage: Free Delivery Started!, Available online at: <https://games.app-liv.jp/archives/178627>, Sep. 13, 2016, 3 pages (Official Copy Only) See Communication Under 37 CFR § 1.98(a) (3).
Contents Pocket, "Line Stamp Information", Available online at: <https://web.archive.org/web/20150404080541/http://contents-pocket.net/linestamp.html>, Apr. 2015, 2 pages (Official Copy Only) See Communication Under 37 CFR § 1.98(a) (3).
Enterbrain, "No. 5 Create your own Avatar Mii Studio", vol. 26, No. 11, p. 138, Feb. 24, 2011, 4 pages (Official Copy Only) See Communication Under 37 CFR § 1.98(a) (3).
Flatlinevertigo, "Black Desert Online: Intro to Hair Customization", Online Available at: <https://www.youtube.com/watch?v=9MCbfd_eMEg>, Sep. 9, 2015, 3 pages.

Horowitz Paul, "Always Show Scroll Bars in Mac OS X", OS X Daily, available online at: URL: http: jjosxdaily.com/2011/08/03/show-scroll-bars-mac-os-x-lion/, Aug. 3, 2011, 7 pages.
Koti Kotresh, "Colour with Asian Paints.A Mobail App by Android Application—2018", Available Online at <https://www.youtube.com/watch?v=M6EIO7ErYd0&feature=youtu.be&t=81>, May 6, 2018, 2 pages.
Kyoko Makino, "How to Make a Lookalike Face Icon for Your Friend", ASCII, Japan Weekly, ASCII Media Works Inc., vol. 24, pp. 90-93, Jul. 17, 2014, 7 pages (official copy only) See Communication Under 37 CFR § 1.98(a) (3).
Mitsuru Takeuchi, "Face Shape Selection for Automatic Avatar Generation", 13th Annual Conference Proceedings of Virtual Reality Society of Japan tournament Papers [DVD-ROM], The Virtual Reality Society of Japan, Sep. 24, 2008, 7 pages (Official Copy Only) See Communication Under 37 CFR § 1.98(a) (3).
Intention to Grant received for Danish Patent Application No. PA201570563, dated Mar. 17, 2016, 7 pages.
PC World, "How to make AR Emojis on the Samsung Galaxy S9", You Tube, Available Online: https://www.youtube.com/watch?v=8wQICfulkz0, Feb. 25, 2018, 2 pages.
International Search Report and Written Opinion received for PCT Patent Application No. PCT/US2015/046262, dated Mar. 15, 2016, 34 pages.
Invitation to Pay Additional Fees received for PCT Patent Application No. PCT/US2015/046262, mailed on Nov. 23, 2015, 7 pages.
Singh Lovepreet, "Samsung Galaxy Watch: How to Change Watch Face—Tips and Tricks", Online available at: <https://www.youtube.com/watch?pp=desktop&v=IN7gPxTZ1qU>, Dec. 4, 2018, 80 pages.
Slashgear, "Samsung AR Emoji demo on the Galaxy S9", Available Online at <https://www.youtube.com/watch?v=GQwNKzY4C9Y>, Feb. 25, 2018, 3 pages.
Spellburst,"The SIMS 3: Create a SIM With Me | #2—Dark Fairy + Full CC List!", Available online at: <https://www.youtube.com/watch?v=Dy_5g9B-wkA>, Oct. 9, 2017, 2 pages.
Theunlockr, "Galaxy Watch Complete Walkthrough: The Best Watch They've Made So Far", Available online at: https://www.youtube.com/watch?v=xiECIfe1SN4, Sep. 11, 2018, 27 pages.
Tsuchihashi et al., "Generation of Caricatures by Automatic Selection of Templates for Shapes and Placement of Facial Parts", Technical Report of the Institute of Image Information and Television Engineers, Japan, The Institute of Image Information and Television Engineers, vol. 33, No. 11, pp. 77-80., Feb. 8, 2009, 7 pages (Official Copy Only) See Communication Under 37 CFR § 1.98(a) (3).
Zy News, "Generate Cartoon Face within Three Seconds, you are the New-generation Expression Emperor", Online available at: <http://inews.ifeng.com/48551936/news.shtml>, Apr. 22, 2016, 3 pages (Official Copy Only) See Communication Under 37 CFR § 1.98(a) (3).
International Search Report and Written Opinion received for PCT Patent Application No. PCT/US2022/029811, dated Nov. 7, 2022, 15 pages.
Non-Final Office Action received for U.S. Appl. No. 17/827,004, dated Nov. 9, 2022, 27 pages.
Applicant-Initiated Interview Summary received for U.S. Appl. No. 17/093,408, dated Jul. 1, 2022, 3 pages.
Applicant-Initiated Interview Summary received for U.S. Appl. No. 17/370,505, dated Oct. 17, 2022, 4 pages.
Brief Communication Regarding Oral Proceedings received for European Patent Application No. 19181242.9, mailed on Oct. 5, 2022, 4 pages.
Brief Communication Regarding Oral Proceedings received for European Patent Application No. 20176616.9, mailed on Jun. 9, 2022, 1 page.
Brief Communication Regarding Oral Proceedings received for European Patent Application No. 20176616.9, mailed on May 27, 2022, 1 page.
Decision on Appeal received for Korean Patent Application No. 10-2021-7002582, mailed on May 13, 2022, 29 pages (2 pages of English Translation and 27 pages of Official Copy).
Extended European Search Report received for European Patent Application No. 22154034.7, dated May 11, 2022, 14 pages.

(56) References Cited

OTHER PUBLICATIONS

Extended European Search Report received for European Patent Application No. 22179347.4, dated Oct. 13, 2022, 7 pages.
Final Office Action received for U.S. Appl. No. 16/259,771, dated Aug. 12, 2022, 25 pages.
Invitation to Pay Additional Fees and Partial International Search Report received for PCT Patent Application No. PCT/US2022/029811, mailed on Sep. 14, 2022, 9 pages.
Non-Final Office Action received for U.S. Appl. No. 17/093,408, dated Sep. 14, 2022, 46 pages.
Non-Final Office Action received for U.S. Appl. No. 17/370,505, dated Jul. 6, 2022, 14 pages.
Notice of Allowance received for Chinese Patent Application No. 201910315328.5, dated Aug. 24, 2022, 4 pages (1 page of English Translation and 3 pages of Official Copy).
Notice of Allowance received for Japanese Patent Application No. 2019-215503, dated Aug. 26, 2022, 3 pages (1 page of English Translation and 2 pages of Official Copy).
Notice of Allowance received for Japanese Patent Application No. 2021-092483, dated Sep. 30, 2022, 4 pages (1 page of English Translation and 3 pages of Official Copy).
Office Action received for Australian Patent Application No. 2021202254, dated Jun. 20, 2022, 2 pages.
Office Action received for Japanese Patent Application No. 2021-153573, dated Oct. 17, 2022, 4 pages (2 pages of English Translation and 2 pages of Official Copy).
Intention to Grant received for European Patent Application No. 19181242.9, dated Nov. 17, 2022, 9 pages.
International Preliminary Report on Patentability received for PCT Patent Application No. PCT/US2021/031096, dated Nov. 24, 2022, 11 pages.
Notice of Acceptance received for Australian Patent Application No. 2021202254, dated Nov. 16, 2022, 3 pages.
Notice of Allowance received for Chinese Patent Application No. 202110820692.4, dated Nov. 16, 2022, 2 pages (1 page of English Translation and 1 page of Official Copy).
Office Action received for Korean Patent Application No. 10-2022-7009437, dated Nov. 30, 2022, 6 pages (2 pages of English Translation and 4 pages of Official Copy).
Applicant-Initiated Interview Summary received for U.S. Appl. No. 17/093,408, dated Jan. 5, 2023, 3 pages.
Office Action received for Chinese Patent Application No. 201780058426.4, dated Dec. 2, 2022, 11 pages (5 pages of English Translation and 6 pages of Official Copy).
Office Action received for Korean Patent Application No. 10-2022-7003364, dated Dec. 26, 2022, 8 pages (3 pages of English Translation and 5 pages of Official Copy).
Notice of Allowance received for U.S. Appl. No. 17/370,505, dated Feb. 2, 2023, 8 pages.
Office Action received for Indian Patent Application No. 202215026505, dated Feb. 8, 2023, 9 pages.

\* cited by examiner

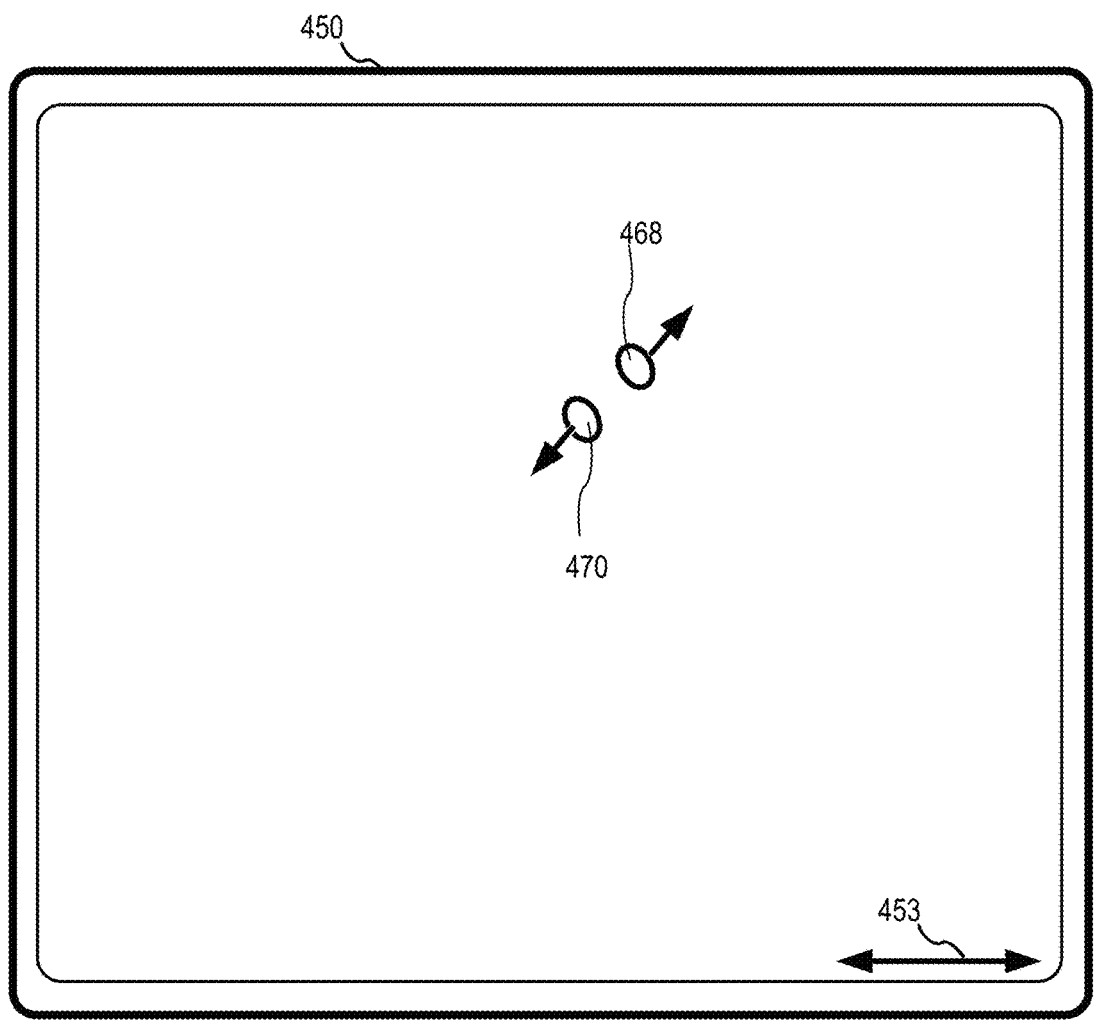
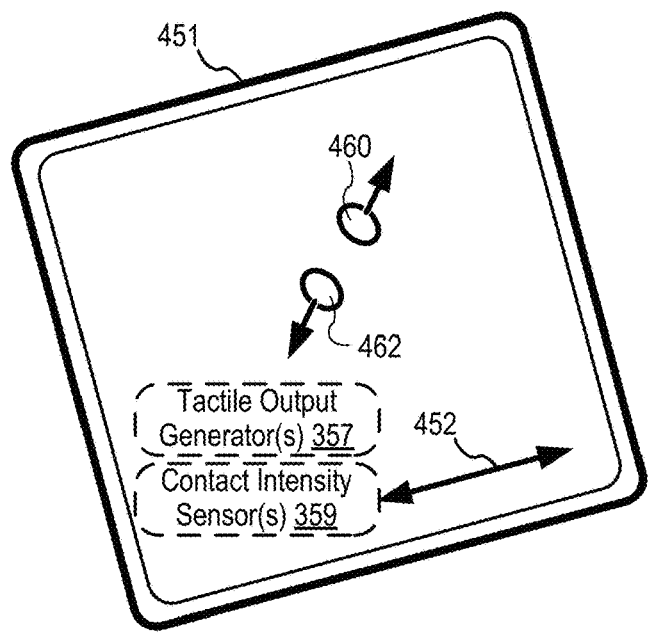
*FIG. 4B*

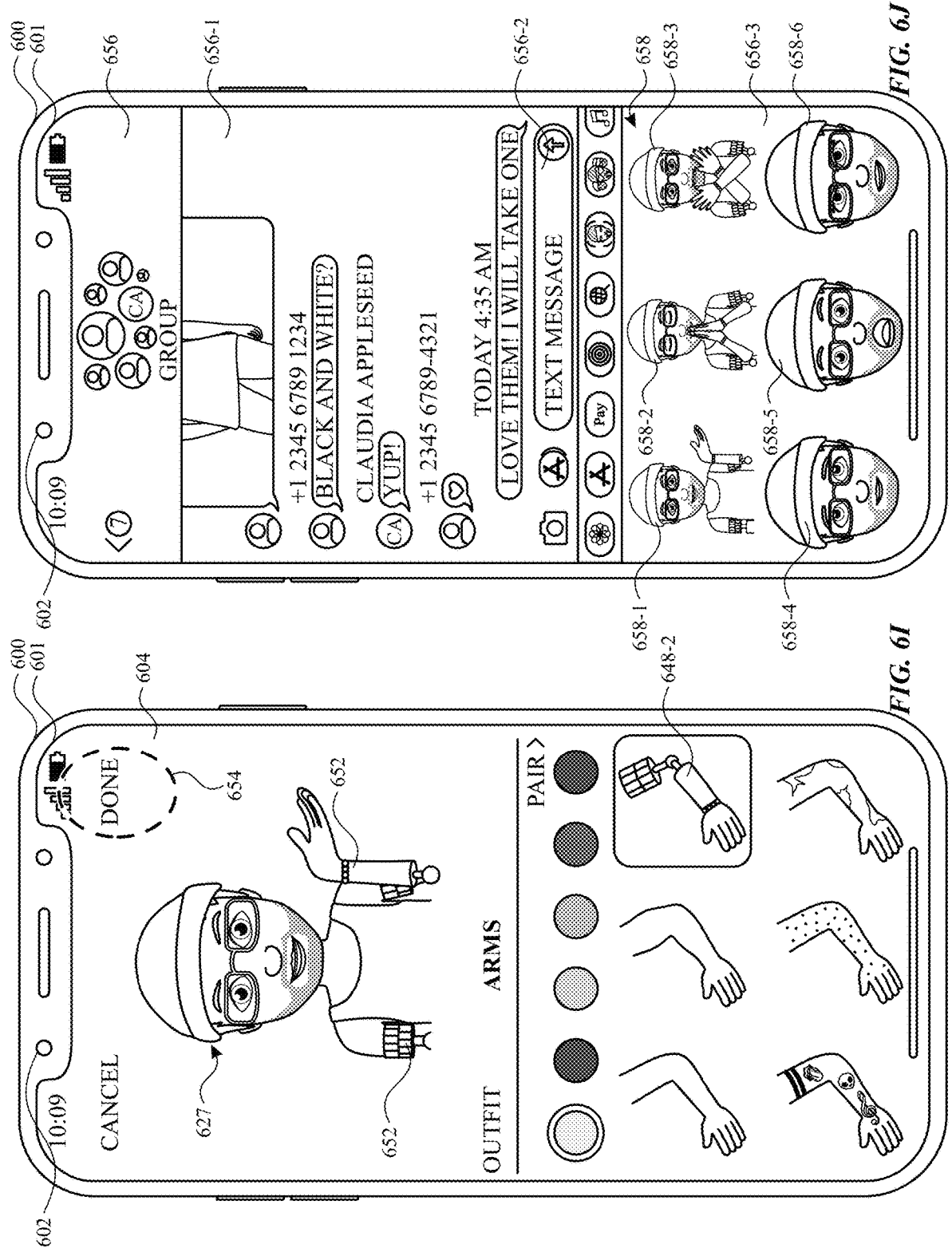

700

702
Display, via the display generation component, an avatar editing interface that includes:

704
A representation of a virtual avatar having a plurality of avatar features, wherein the virtual avatar is associated with a set of stickers including a first avatar sticker that shows the virtual avatar in a first pose and a second avatar sticker that shows the virtual avatar in a second pose different from the first pose.

706
A first set of one or more graphical interface objects that are selectable for modifying a first avatar feature of the plurality of avatar features that are visible in the representation of the virtual avatar.

708
While displaying the avatar editing interface including the representation of the virtual avatar, detect, via the one or more input devices, an input corresponding to a request to display editing options for a second avatar feature of the plurality of avatar features.

710
In response to detecting the input, update display of the avatar editing interface, including:

712
Display a representation of the first avatar sticker having an appearance that includes the second avatar feature and is based on an appearance of the virtual avatar.

714
Display a second set of one or more graphical interface objects that are selectable for modifying one or more of the avatar features that are visible in the first avatar sticker.

*FIG. 7*

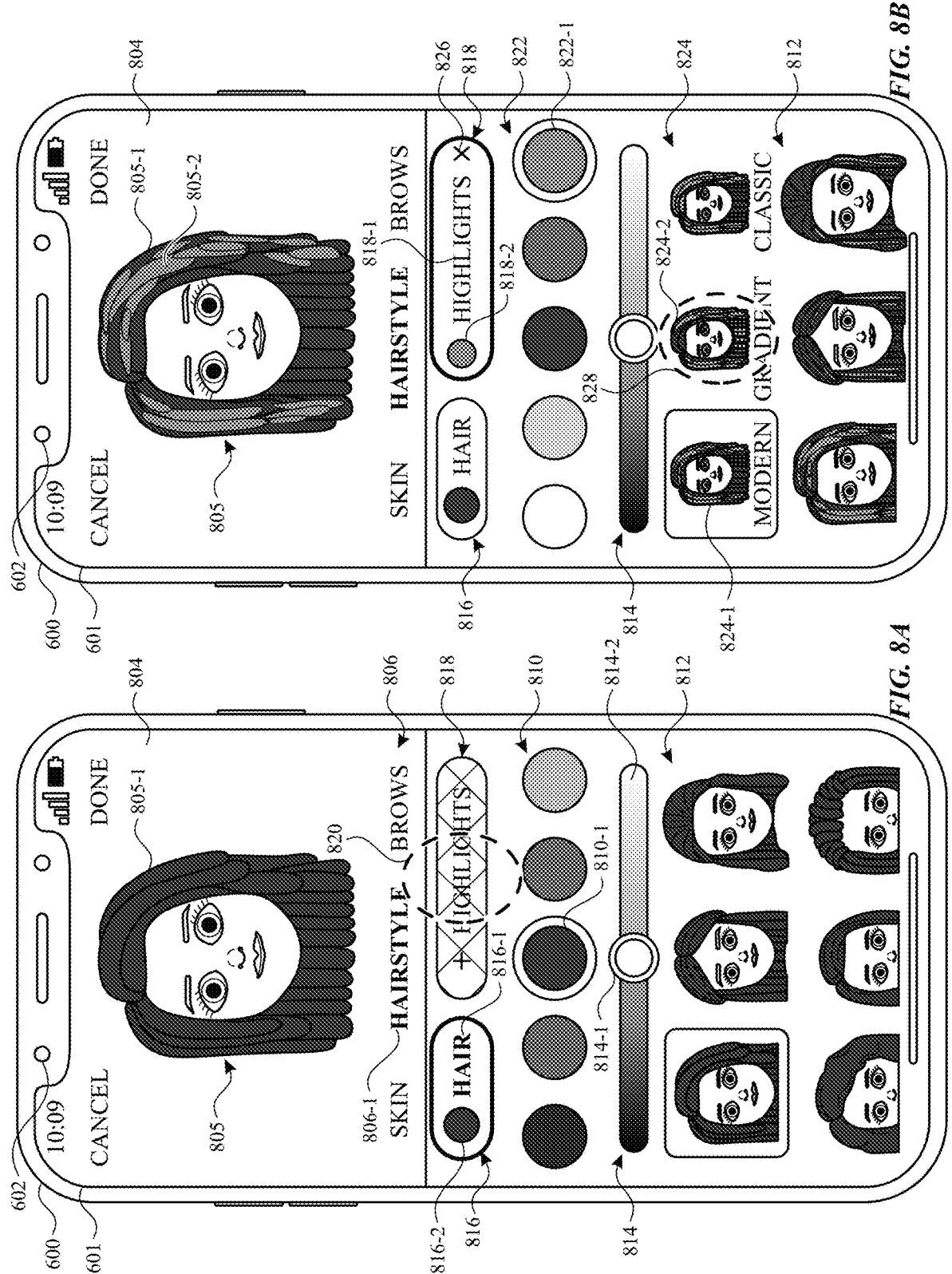

900

902
Display, via the display generation component, an avatar editing interface that includes:

904
A representation of a virtual avatar, wherein the representation of the virtual avatar includes a first avatar feature and the first avatar feature includes a first color.

906
A first graphical interface object that is selectable to initiate a process for modifying an appearance of the first avatar feature to include a second color.

908
A plurality of selectable options for modifying a characteristic of the first avatar feature, wherein the plurality of selectable options includes respective representations of the first avatar feature and the first avatar feature includes the first color.

910
While displaying the avatar editing interface, detect, via the one or more input devices, an input directed to the first graphical interface object.

912
In response to detecting the input directed to the first graphical interface object, update display of the avatar editing interface, including:

914
Display an updated representation of the virtual avatar, wherein the updated representation of the virtual avatar includes the first avatar feature and the first avatar feature includes the first color and the second color.

916
Display an updated plurality of selectable options, wherein the updated plurality of selectable options includes respective updated representations of the first avatar feature and the first avatar feature includes the first color and the second color.

918
Display controls for modifying the second color that were not displayed prior to detecting the input.

*FIG. 9*

AVATAR STICKER EDITOR USER INTERFACES

CROSS-REFERENCE TO RELATED APPLICATION

This application claims the benefit of priority of U.S. Provisional Application Ser. No. 63/191,864, entitled "AVATAR STICKER EDITOR USER INTERFACES," filed May 21, 2021, the content of which is hereby incorporated by reference in its entirety.

FIELD

The present disclosure relates generally to computer user interfaces, and more specifically to techniques for editing avatars.

BACKGROUND

Avatars are used to represent the users of electronic devices. The avatars can represent the appearance of a user or can represent an idealized or completely fictional representation of the user. Avatars can then be associated with a user so that the appearance of the avatar to others triggers an association or link with the user. Avatars can be created and edited for such use, including use in multimedia communications.

BRIEF SUMMARY

Some techniques for editing avatars using electronic devices, however, are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices.

Accordingly, the present technique provides electronic devices with faster, more efficient methods and interfaces for editing avatar stickers. Such methods and interfaces optionally complement or replace other methods for editing avatars. Such methods and interfaces reduce the cognitive burden on a user and produce a more efficient human-machine interface. For battery-operated computing devices, such methods and interfaces conserve power and increase the time between battery charges.

In accordance with some embodiments, a method is described. The method is performed at a computer system that is in communication with a display generation component and one or more input devices. The method comprises: displaying, via the display generation component, an avatar editing interface that includes: a representation of a virtual avatar having a plurality of avatar features, wherein the virtual avatar is associated with a set of stickers including a first avatar sticker that shows the virtual avatar in a first pose and a second avatar sticker that shows the virtual avatar in a second pose different from the first pose; and a first set of one or more graphical interface objects that are selectable for modifying a first avatar feature of the plurality of avatar features that are visible in the representation of the virtual avatar; while displaying the avatar editing interface including the representation of the virtual avatar, detecting, via the one or more input devices, an input corresponding to a request to display editing options for a second avatar feature of the plurality of avatar features; and in response to detecting the input, updating display of the avatar editing interface, including: displaying a representation of the first avatar sticker having an appearance that includes the second avatar feature and is based on an appearance of the virtual avatar; and displaying a second set of one or more graphical interface objects that are selectable for modifying one or more of the avatar features that are visible in the first avatar sticker.

In accordance with some embodiments, a non-transitory computer-readable storage medium is described. The non-transitory computer-readable storage medium stores one or more programs configured to be executed by one or more processors of a computer system that is in communication with a display generation component, and one or more input devices, the one or more programs including instructions for: displaying, via the display generation component, an avatar editing interface that includes: a representation of a virtual avatar having a plurality of avatar features, wherein the virtual avatar is associated with a set of stickers including a first avatar sticker that shows the virtual avatar in a first pose and a second avatar sticker that shows the virtual avatar in a second pose different from the first pose; and a first set of one or more graphical interface objects that are selectable for modifying a first avatar feature of the plurality of avatar features that are visible in the representation of the virtual avatar; while displaying the avatar editing interface including the representation of the virtual avatar, detecting, via the one or more input devices, an input corresponding to a request to display editing options for a second avatar feature of the plurality of avatar features; and in response to detecting the input, updating display of the avatar editing interface, including: displaying a representation of the first avatar sticker having an appearance that includes the second avatar feature and is based on an appearance of the virtual avatar; and displaying a second set of one or more graphical interface objects that are selectable for modifying one or more of the avatar features that are visible in the first avatar sticker.

In accordance with some embodiments, a transitory computer-readable storage medium is described. The transitory computer-readable storage medium stores one or more programs configured to be executed by one or more processors of a computer system that is in communication with a display generation component, and one or more input devices, the one or more programs including instructions for: displaying, via the display generation component, an avatar editing interface that includes: a representation of a virtual avatar having a plurality of avatar features, wherein the virtual avatar is associated with a set of stickers including a first avatar sticker that shows the virtual avatar in a first pose and a second avatar sticker that shows the virtual avatar in a second pose different from the first pose; and a first set of one or more graphical interface objects that are selectable for modifying a first avatar feature of the plurality of avatar features that are visible in the representation of the virtual avatar; while displaying the avatar editing interface including the representation of the virtual avatar, detecting, via the one or more input devices, an input corresponding to a request to display editing options for a second avatar feature of the plurality of avatar features; and in response to detecting the input, updating display of the avatar editing interface, including: displaying a representation of the first avatar sticker having an appearance that includes the second avatar feature and is based on an appearance of the virtual avatar; and displaying a second set of one or more graphical interface objects that are selectable for modifying one or more of the avatar features that are visible in the first avatar sticker.

In accordance with some embodiments, a computer system is described. The computer system comprises: a display generation component; one or more input devices; one or more processors; and memory storing one or more programs configured to be executed by the one or more processors, the one or more programs including instructions for: displaying, via the display generation component, an avatar editing interface that includes: a representation of a virtual avatar having a plurality of avatar features, wherein the virtual avatar is associated with a set of stickers including a first avatar sticker that shows the virtual avatar in a first pose and a second avatar sticker that shows the virtual avatar in a second pose different from the first pose; and a first set of one or more graphical interface objects that are selectable for modifying a first avatar feature of the plurality of avatar features that are visible in the representation of the virtual avatar; while displaying the avatar editing interface including the representation of the virtual avatar, detecting, via the one or more input devices, an input corresponding to a request to display editing options for a second avatar feature of the plurality of avatar features; and in response to detecting the input, updating display of the avatar editing interface, including: displaying a representation of the first avatar sticker having an appearance that includes the second avatar feature and is based on an appearance of the virtual avatar; and displaying a second set of one or more graphical interface objects that are selectable for modifying one or more of the avatar features that are visible in the first avatar sticker.

In accordance with some embodiments, a computer system is described. The computer system comprises: a display generation component; one or more input devices; means for displaying, via the display generation component, a communication request interface that includes: means for displaying, via the display generation component, an avatar editing interface that includes: a representation of a virtual avatar having a plurality of avatar features, wherein the virtual avatar is associated with a set of stickers including a first avatar sticker that shows the virtual avatar in a first pose and a second avatar sticker that shows the virtual avatar in a second pose different from the first pose; and a first set of one or more graphical interface objects that are selectable for modifying a first avatar feature of the plurality of avatar features that are visible in the representation of the virtual avatar; means for, while displaying the avatar editing interface including the representation of the virtual avatar, detecting, via the one or more input devices, an input corresponding to a request to display editing options for a second avatar feature of the plurality of avatar features; and means for, in response to detecting the input, updating display of the avatar editing interface, including: displaying a representation of the first avatar sticker having an appearance that includes the second avatar feature and is based on an appearance of the virtual avatar; and displaying a second set of one or more graphical interface objects that are selectable for modifying one or more of the avatar features that are visible in the first avatar sticker.

In accordance with some embodiments, a computer program product is described. The computer program product comprises one or more programs configured to be executed by one or more processors of a computer system that is in communication with a display generation component and one or more input devices, the one or more programs including instructions for: displaying, via the display generation component, an avatar editing interface that includes: a representation of a virtual avatar having a plurality of avatar features, wherein the virtual avatar is associated with a set of stickers including a first avatar sticker that shows the virtual avatar in a first pose and a second avatar sticker that shows the virtual avatar in a second pose different from the first pose; and a first set of one or more graphical interface objects that are selectable for modifying a first avatar feature of the plurality of avatar features that are visible in the representation of the virtual avatar; while displaying the avatar editing interface including the representation of the virtual avatar, detecting, via the one or more input devices, an input corresponding to a request to display editing options for a second avatar feature of the plurality of avatar features; and in response to detecting the input, updating display of the avatar editing interface, including: displaying a representation of the first avatar sticker having an appearance that includes the second avatar feature and is based on an appearance of the virtual avatar; and displaying a second set of one or more graphical interface objects that are selectable for modifying one or more of the avatar features that are visible in the first avatar sticker.

In accordance with some embodiments, a method is described. The method is performed at a computer system that is in communication with a display generation component and one or more input devices. The method comprises: displaying, via the display generation component, an avatar editing interface that includes: a representation of a virtual avatar, wherein the representation of the virtual avatar includes a first avatar feature and the first avatar feature includes a first color; a first graphical interface object that is selectable to initiate a process for modifying an appearance of the first avatar feature to include a second color; and a plurality of selectable options for modifying a characteristic of the first avatar feature, wherein the plurality of selectable options includes respective representations of the first avatar feature and the first avatar feature includes the first color; while displaying the avatar editing interface, detecting, via the one or more input devices, an input directed to the first graphical interface object; and in response to detecting the input directed to the first graphical interface object, updating display of the avatar editing interface, including: displaying an updated representation of the virtual avatar, wherein the updated representation of the virtual avatar includes the first avatar feature and the first avatar feature includes the first color and the second color; displaying an updated plurality of selectable options, wherein the updated plurality of selectable options includes respective updated representations of the first avatar feature and the first avatar feature includes the first color and the second color; and displaying controls for modifying the second color that were not displayed prior to detecting the input.

In accordance with some embodiments, a non-transitory computer-readable storage medium is described. The non-transitory computer-readable storage medium stores one or more programs configured to be executed by one or more processors of a computer system that is in communication with a display generation component, and one or more input devices, the one or more programs including instructions for: displaying, via the display generation component, an avatar editing interface that includes: a representation of a virtual avatar, wherein the representation of the virtual avatar includes a first avatar feature and the first avatar feature includes a first color; a first graphical interface object that is selectable to initiate a process for modifying an appearance of the first avatar feature to include a second color; and a plurality of selectable options for modifying a characteristic of the first avatar feature, wherein the plurality of selectable options includes respective representations of the first avatar feature and the first avatar feature includes the first color; while displaying the avatar editing interface, detecting, via the one or more input devices, an input directed to the first graphical interface object; and in response to detecting the input directed to the first graphical interface object, updating display of the avatar editing interface, including: displaying an updated representation of the virtual avatar, wherein the updated representation of the virtual avatar includes the first avatar feature and the first avatar feature includes the first color and the second color; displaying an updated plurality of selectable options, wherein the updated plurality of selectable options includes respective updated representations of the first avatar feature and the first avatar feature includes the first color and the second color; and displaying controls for modifying the second color that were not displayed prior to detecting the input.

In accordance with some embodiments, a transitory computer-readable storage medium is described. The transitory computer-readable storage medium stores one or more programs configured to be executed by one or more processors of a computer system that is in communication with a display generation component, and one or more input devices, the one or more programs including instructions for: displaying, via the display generation component, an avatar editing interface that includes: a representation of a virtual avatar, wherein the representation of the virtual avatar includes a first avatar feature and the first avatar feature includes a first color; a first graphical interface object that is selectable to initiate a process for modifying an appearance of the first avatar feature to include a second color; and a plurality of selectable options for modifying a characteristic of the first avatar feature, wherein the plurality of selectable options includes respective representations of the first avatar feature and the first avatar feature includes the first color; while displaying the avatar editing interface, detecting, via the one or more input devices, an input directed to the first graphical interface object; and in response to detecting the input directed to the first graphical interface object, updating display of the avatar editing interface, including: displaying an updated representation of the virtual avatar, wherein the updated representation of the virtual avatar includes the first avatar feature and the first avatar feature includes the first color and the second color; displaying an updated plurality of selectable options, wherein the updated plurality of selectable options includes respective updated representations of the first avatar feature and the first avatar feature includes the first color and the second color; and displaying controls for modifying the second color that were not displayed prior to detecting the input.

In accordance with some embodiments, a computer system is described. The computer system comprises: a display generation component; one or more input devices; one or more processors; and memory storing one or more programs configured to be executed by the one or more processors, the one or more programs including instructions for: displaying, via the display generation component, an avatar editing interface that includes: a representation of a virtual avatar, wherein the representation of the virtual avatar includes a first avatar feature and the first avatar feature includes a first color; a first graphical interface object that is selectable to initiate a process for modifying an appearance of the first avatar feature to include a second color; and a plurality of selectable options for modifying a characteristic of the first avatar feature, wherein the plurality of selectable options includes respective representations of the first avatar feature and the first avatar feature includes the first color; while displaying the avatar editing interface, detecting, via the one or more input devices, an input directed to the first graphical interface object; and in response to detecting the input directed to the first graphical interface object, updating display of the avatar editing interface, including: displaying an updated representation of the virtual avatar, wherein the updated representation of the virtual avatar includes the first avatar feature and the first avatar feature includes the first color and the second color; displaying an updated plurality of selectable options, wherein the updated plurality of selectable options includes respective updated representations of the first avatar feature and the first avatar feature includes the first color and the second color; and displaying controls for modifying the second color that were not displayed prior to detecting the input.

In accordance with some embodiments, a computer system is described. The computer system comprises: a display generation component; one or more input devices; means for displaying, via the display generation component, an avatar editing interface that includes: a representation of a virtual avatar, wherein the representation of the virtual avatar includes a first avatar feature and the first avatar feature includes a first color; a first graphical interface object that is selectable to initiate a process for modifying an appearance of the first avatar feature to include a second color; and a plurality of selectable options for modifying a characteristic of the first avatar feature, wherein the plurality of selectable options includes respective representations of the first avatar feature and the first avatar feature includes the first color; means for, while displaying the avatar editing interface, detecting, via the one or more input devices, an input directed to the first graphical interface object; and means for, in response to detecting the input directed to the first graphical interface object, updating display of the avatar editing interface, including: displaying an updated representation of the virtual avatar, wherein the updated representation of the virtual avatar includes the first avatar feature and the first avatar feature includes the first color and the second color; displaying an updated plurality of selectable options, wherein the updated plurality of selectable options includes respective updated representations of the first avatar feature and the first avatar feature includes the first color and the second color; and displaying controls for modifying the second color that were not displayed prior to detecting the input.

In accordance with some embodiments, a computer program product is described. The computer program product comprises one or more programs configured to be executed by one or more processors of a computer system that is in communication with a display generation component and one or more input devices, the one or more programs including instructions for: displaying, via the display generation component, an avatar editing interface that includes: a representation of a virtual avatar, wherein the representation of the virtual avatar includes a first avatar feature and the first avatar feature includes a first color; a first graphical interface object that is selectable to initiate a process for modifying an appearance of the first avatar feature to include a second color; and a plurality of selectable options for modifying a characteristic of the first avatar feature, wherein the plurality of selectable options includes respective representations of the first avatar feature and the first avatar feature includes the first color; while displaying the avatar editing interface, detecting, via the one or more input devices, an input directed to the first graphical interface object; and in response to detecting the input directed to the first graphical interface object, updating display of the avatar editing interface, including: displaying an updated representation of the virtual avatar, wherein the updated representation of the virtual avatar includes the first avatar feature and the first avatar feature includes the first color and the second color; displaying an updated plurality of selectable options, wherein the updated plurality of selectable options includes respective updated representations of the first avatar feature and the first avatar feature includes the first color and the second color; and displaying controls for modifying the second color that were not displayed prior to detecting the input.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for editing avatars, thereby increasing the effectiveness, efficiency, and user satisfaction with such devices. Such methods and interfaces may complement or replace other methods for editing avatars.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 4B illustrates an exemplary user interface for a multifunction device with a touch-sensitive surface that is separate from the display in accordance with some embodiments.

FIG. 7 is a flow diagram illustrating a method for editing avatar stickers, in accordance with some embodiments.

FIG. 9 is a flow diagram illustrating a method for editing avatars, in accordance with some embodiments.

DESCRIPTION OF EMBODIMENTS

Figure 1A:
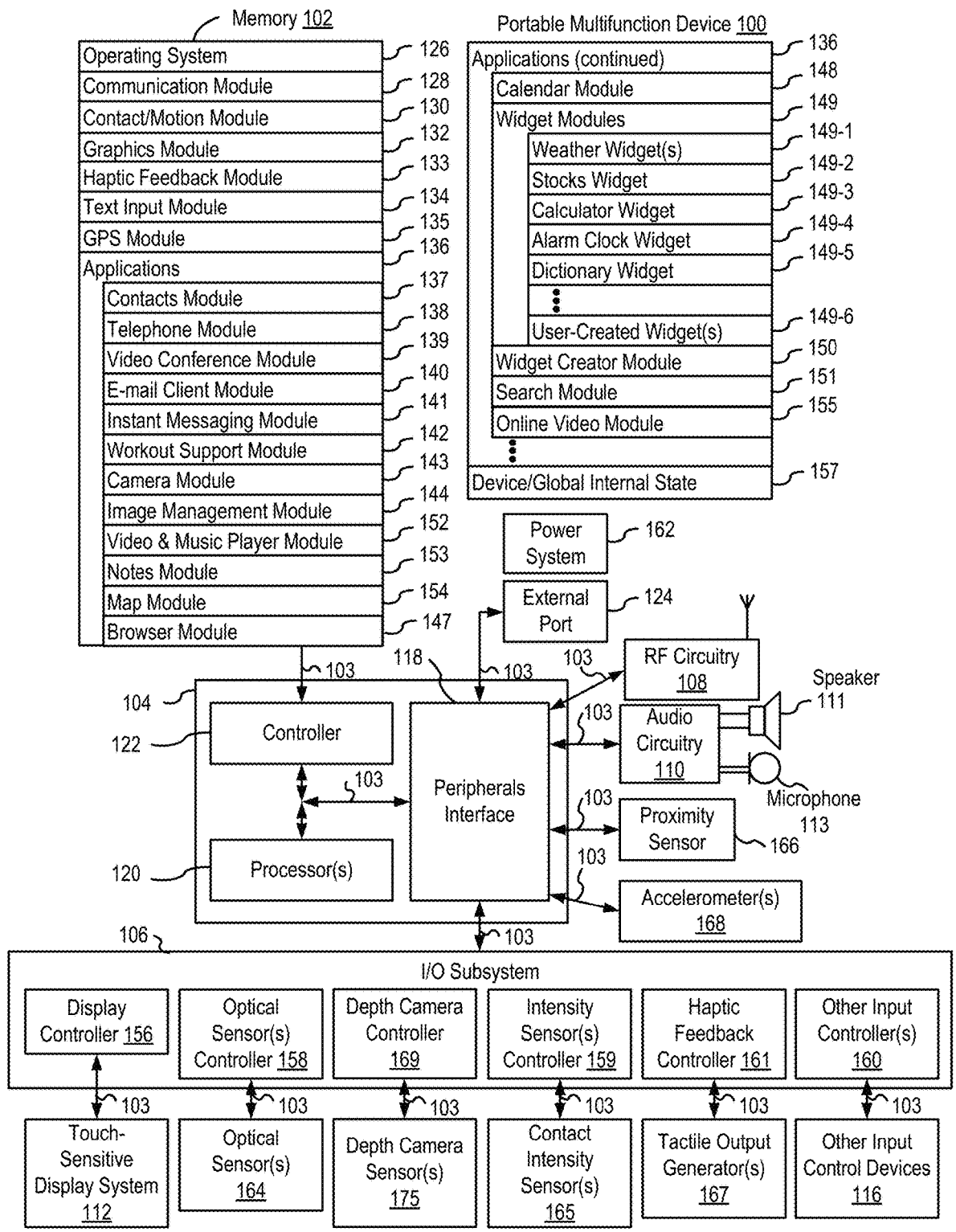
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for editing avatars. Such techniques can reduce the cognitive burden on a user who edits avatars, thereby enhancing productivity. Further, such techniques can reduce processor and battery power otherwise wasted on redundant user inputs.

Below, FIGS. 1A-1B, 2, 3, 4A-4B, and 5A-5B provide a description of exemplary devices for performing the techniques for editing avatars. FIGS. 6A-6R illustrate exemplary user interfaces for editing avatar stickers. FIG. 7 is a flow diagram illustrating methods of editing avatar stickers in accordance with some embodiments. The user interfaces in FIGS. 6A-6R are used to illustrate the processes described below, including the processes in FIG. 7. FIGS. 8A-8U illustrate exemplary user interfaces for editing avatars. FIG. 9 is a flow diagram illustrating methods of editing avatars in accordance with some embodiments. The user interfaces in FIGS. 8A-8U are used to illustrate the processes described below, including the processes in FIG. 9.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Although the following description uses terms "first," "second," etc. to describe various elements, these elements should not be limited by the terms. In some embodiments, these terms are used to distinguish one element from another. For example, a first touch could be termed a second touch, and, similarly, a second touch could be termed a first touch, without departing from the scope of the various described embodiments. In some embodiments, the first touch and the second touch are two separate references to the same touch. In some embodiments, the first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs (such as computer programs (e.g., including instructions)) and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures and/or air gestures) as input. In some embodiments, the one or more input devices are integrated with the computer system. In some embodiments, the one or more input devices are separate from the computer system. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228, 700, "Operation Of A Computer With A Touch Screen Interface," filed Sep. 16, 2005; (8) U.S. patent application Ser. No. 11/228,737, "Activating Virtual Keys Of A Touch- Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

In some embodiments, a depth map (e.g., depth map image) contains information (e.g., values) that relates to the distance of objects in a scene from a viewpoint (e.g., a camera, an optical sensor, a depth camera sensor). In one embodiment of a depth map, each depth pixel defines the position in the viewpoint's Z-axis where its corresponding two-dimensional pixel is located. In some embodiments, a depth map is composed of pixels wherein each pixel is defined by a value (e.g., 0-255). For example, the "0" value represents pixels that are located at the most distant place in a "three dimensional" scene and the "255" value represents pixels that are located closest to a viewpoint (e.g., a camera, an optical sensor, a depth camera sensor) in the "three dimensional" scene. In other embodiments, a depth map represents the distance between an object in a scene and the plane of the viewpoint. In some embodiments, the depth map includes information about the relative depth of various features of an object of interest in view of the depth camera (e.g., the relative depth of eyes, nose, mouth, ears of a user's face). In some embodiments, the depth map includes information that enables the device to determine contours of the object of interest in a z direction.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. Nos. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals,"

which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
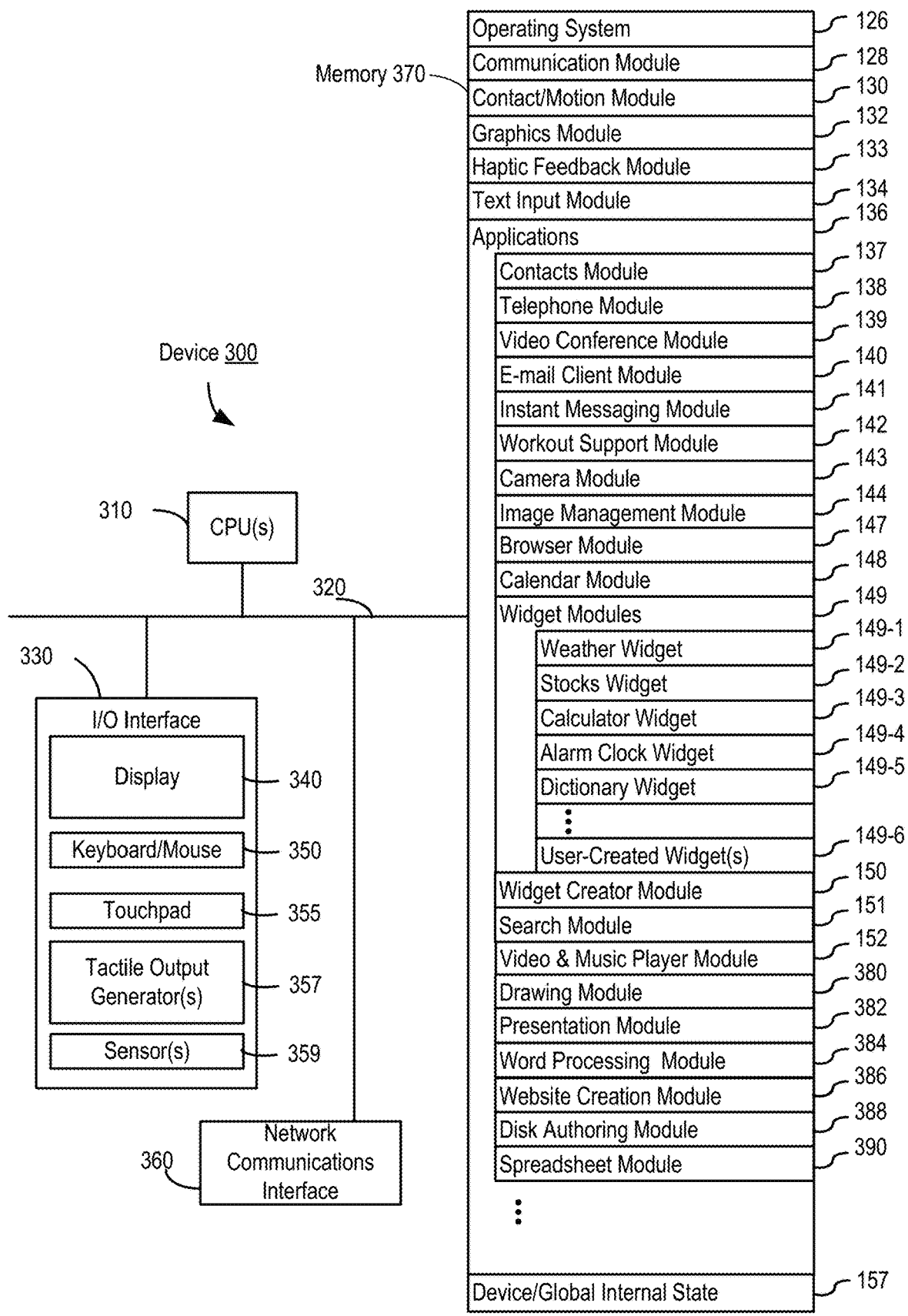
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:
Contacts module 137 (sometimes called an address book or contact list);
Telephone module 138;
Video conference module 139;
E-mail client module 140;
Instant messaging (IM) module 141;
Workout support module 142;
Camera module 143 for still and/or video images;
Image management module 144;
Video player module;
Music player module;
Browser module 147;
Calendar module 148;
Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
Widget creator module 150 for making user-created widgets 149-6;
Search module 151;
Video and music player module 152, which merges video player module and music player module;
Notes module 153;
Map module 154; and/or
Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs (such as computer programs (e.g., including instructions)), procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
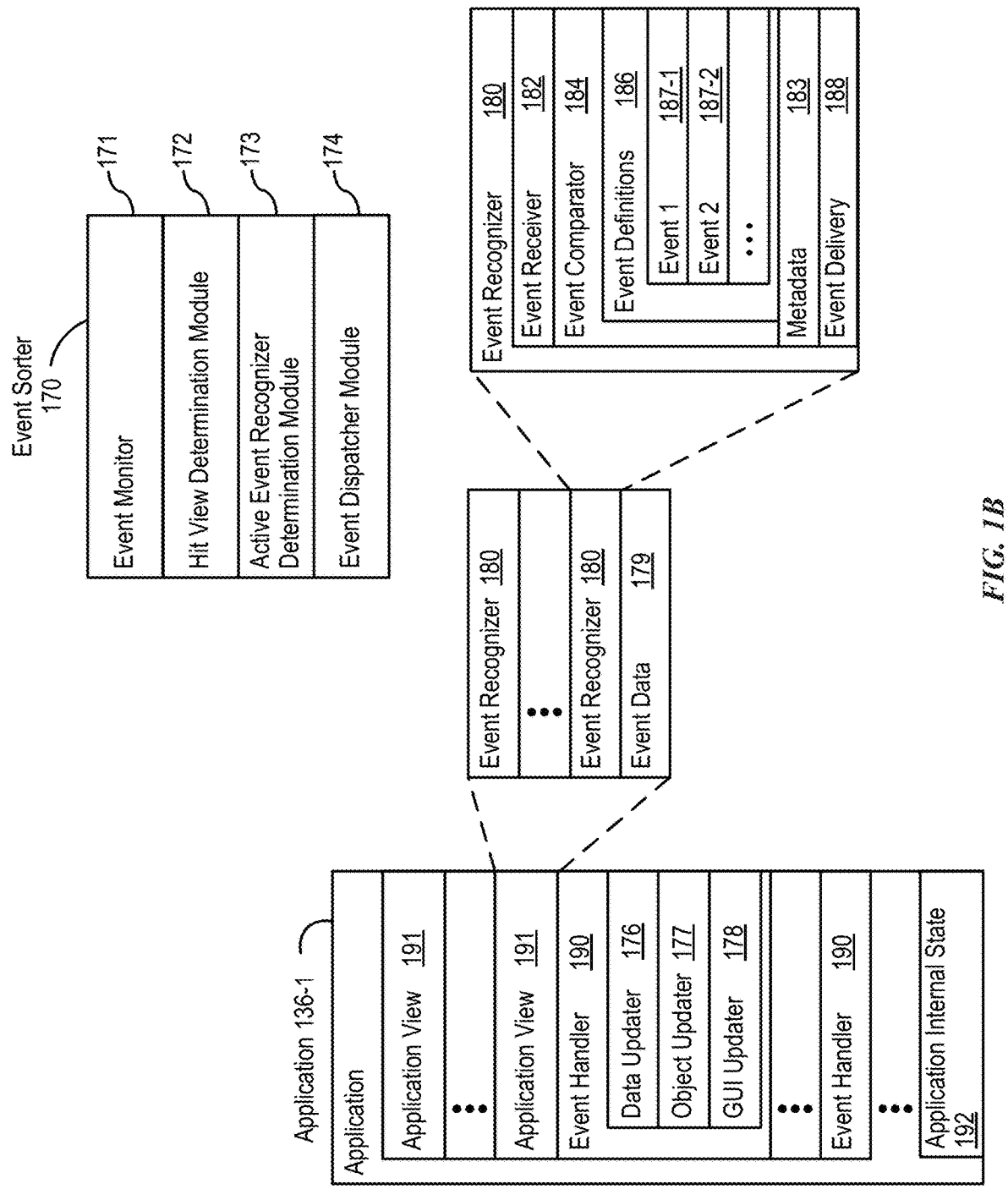
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (e.g., 187-1 and/or 187-2) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definitions 186 include a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
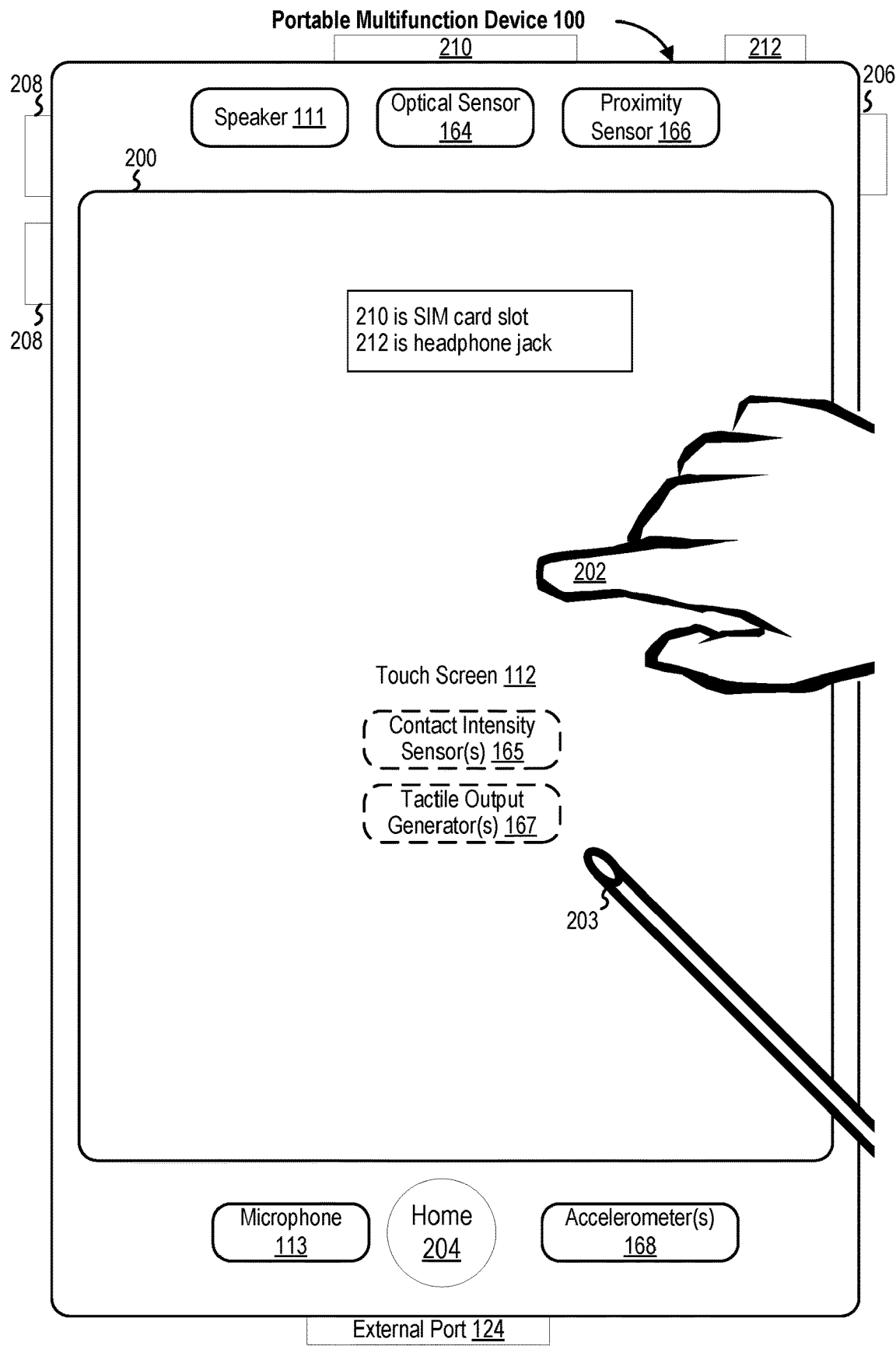
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or computer programs (e.g., sets of instructions or including instructions) need not be implemented as separate software programs (such as computer programs (e.g., including instructions)), procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
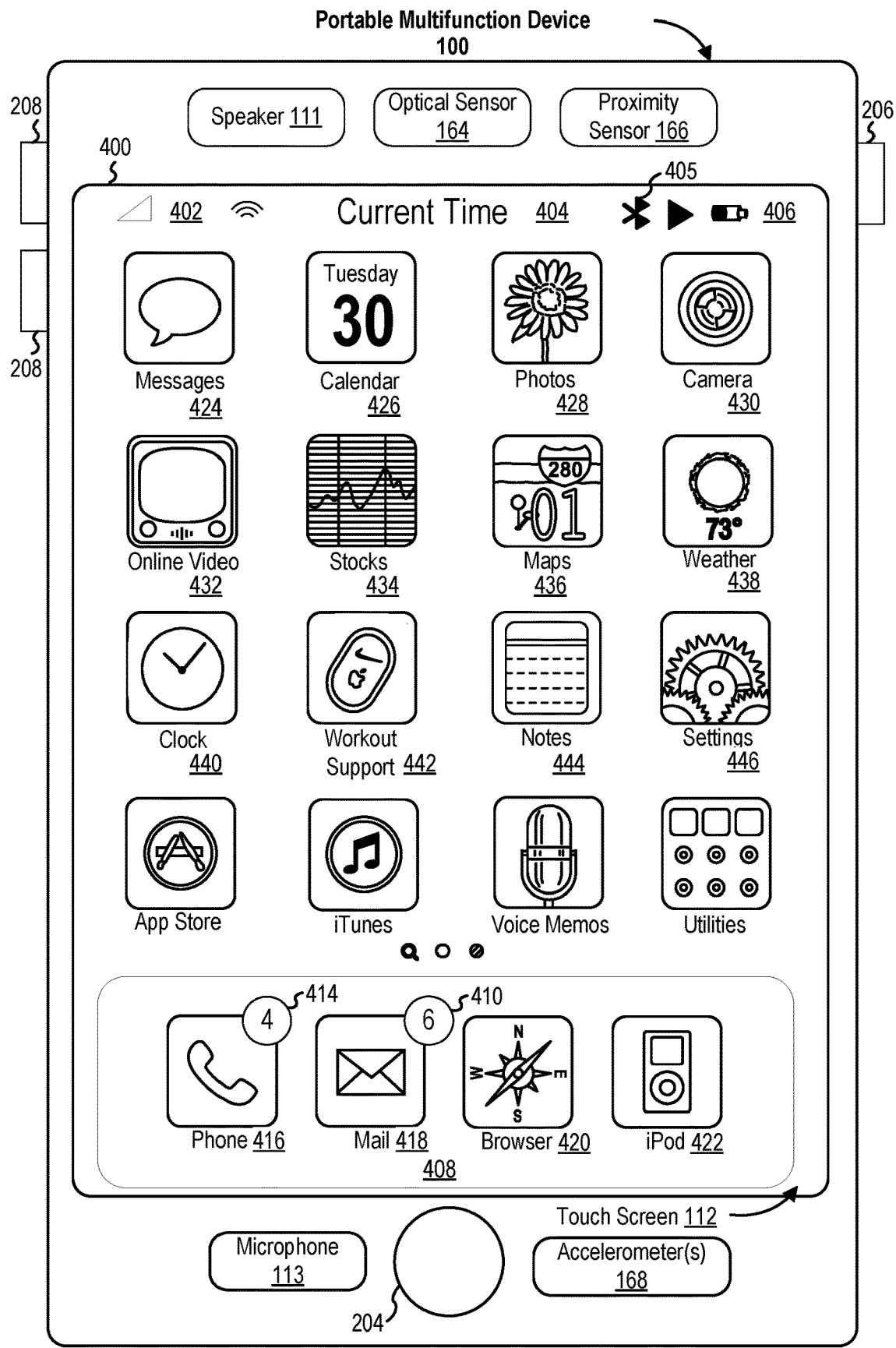
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;

Time 404;

Bluetooth indicator 405;

Battery status indicator 406;

Tray 408 with icons for frequently used applications, such as:

- Icon 416 for telephone module 138, labeled "Phone," which optionally includes an indicator 414 of the number of missed calls or voicemail messages;
- Icon 418 for e-mail client module 140, labeled "Mail," which optionally includes an indicator 410 of the number of unread e-mails;
- Icon 420 for browser module 147, labeled "Browser;" and
- Icon 422 for video and music player module 152, also referred to as iPod (trademark of Apple Inc.) module 152, labeled "iPod;" and Icons for other applications, such as:

- Icon 424 for IM module 141, labeled "Messages;"
- Icon 426 for calendar module 148, labeled "Calendar;"
- Icon 428 for image management module 144, labeled "Photos;"
- Icon 430 for camera module 143, labeled "Camera;"
- Icon 432 for online video module 155, labeled "Online Video;"
- Icon 434 for stocks widget 149-2, labeled "Stocks;"
- Icon 436 for map module 154, labeled "Maps;"
- Icon 438 for weather widget 149-1, labeled "Weather;"
- Icon 440 for alarm clock widget 149-4, labeled "Clock;"
- Icon 442 for workout support module 142, labeled "Workout Support;"
- Icon 444 for notes module 153, labeled "Notes;" and
- Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
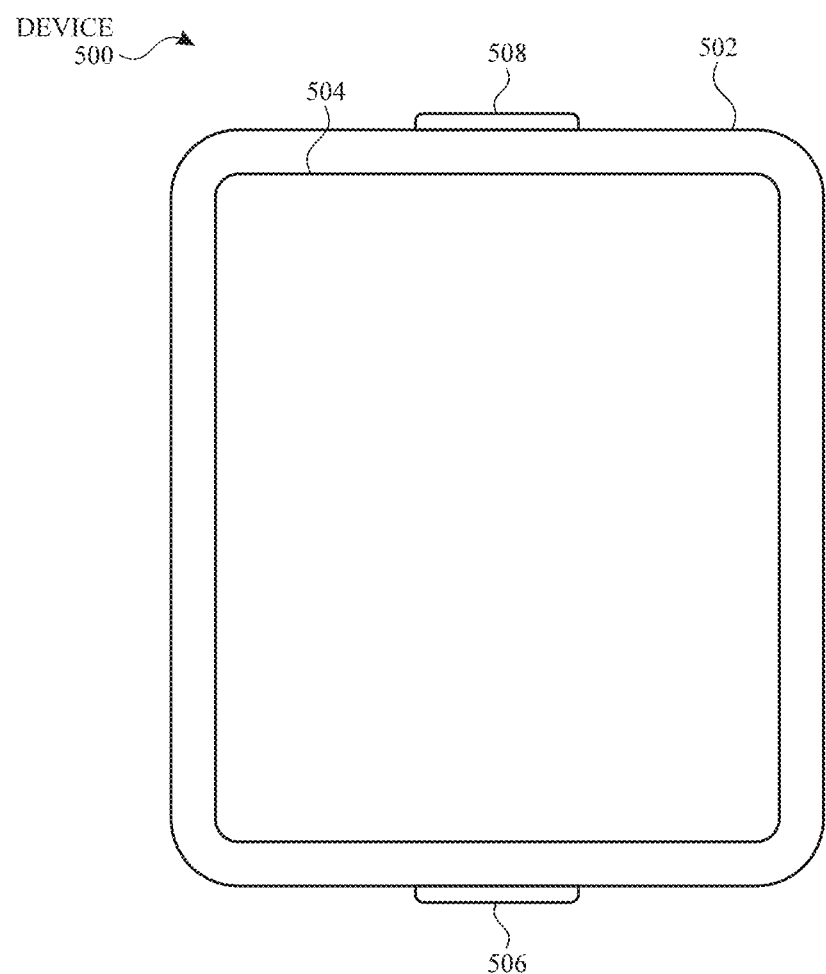
FIG. 5A illustrates a personal electronic device in accordance with some embodiments.
Figure 6A:
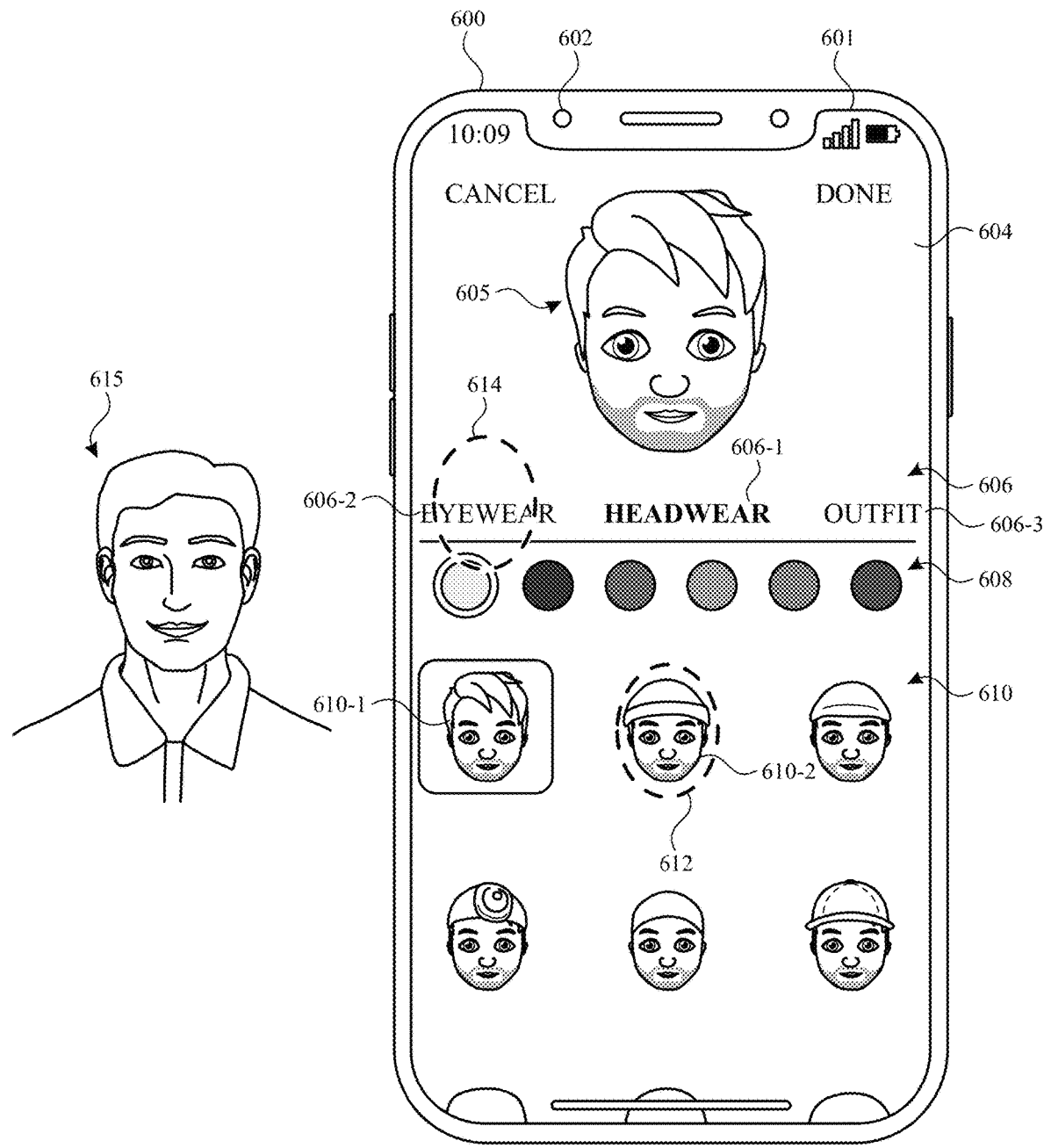
FIGS. 6A-6R illustrate exemplary user interfaces for editing avatar stickers, in accordance with some embodiments

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
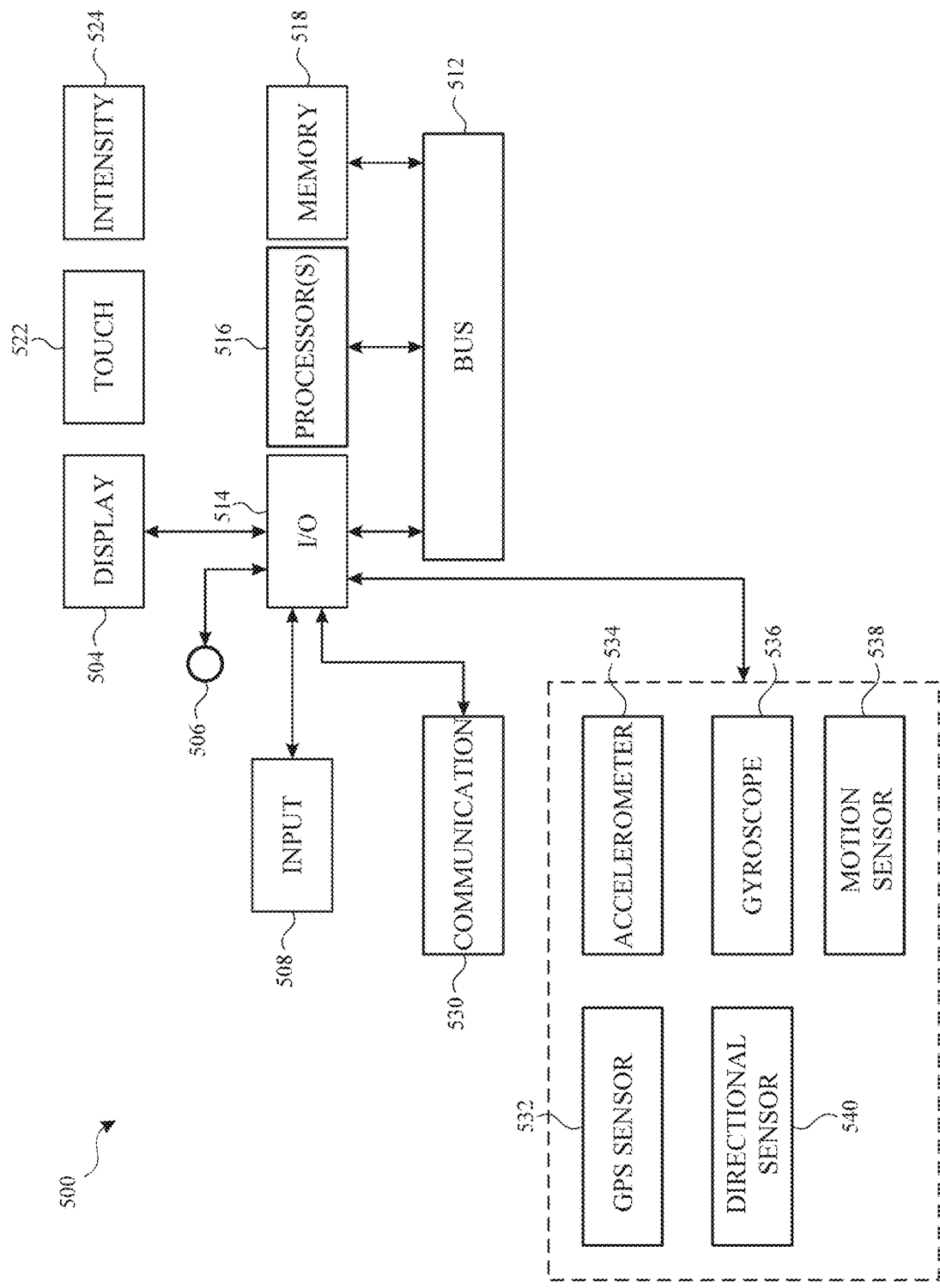
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700 and 900 (FIGS. 7 and 9). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Attention is now directed towards embodiments of user interfaces ("UI") and associated processes that are implemented on an electronic device, such as portable multifunction device 100, device 300, or device 500.

FIGS. 6A-6R illustrate exemplary user interfaces for editing avatar stickers, in accordance with some embodiments. The user interfaces in these figures are used to illustrate the processes described below, including the processes in FIG. 7.

FIG. 6A illustrates device 600 displaying, via display 601 (e.g., a touch-sensitive display), editing interface 604, which is an interface for editing an appearance of an avatar (e.g., a virtual avatar) and/or avatar sticker. Device 600 includes camera 602 for detecting an appearance of user 615, which, in some embodiments, is used to control or modify a displayed pose or appearance of the displayed avatar to track the face of the user. For example, as user 615 moves his head and makes different facial expressions, device 600 detects the user's movements, poses, and facial expressions using camera 602 and modifies the appearance of avatar 605 in real time to replicate the movements, poses, and facial expressions of user 615. Device 600 includes one or more elements of devices 100, 300, or 500.

In FIG. 6A, editing interface 604 includes avatar 605. The appearance of avatar 605 is edited by selecting different avatar feature options from various avatar feature categories 606. For example, in FIG. 6A, headwear category 606-1 is currently selected (as indicated by the centered and bolded appearance of "Headwear"), and different headwear options 610 are displayed for modifying the headwear of avatar 605. Color options 608 can be selected to modify the color of a selected headwear option. In FIG. 6A, headwear option 610-1 is currently selected. Headwear option 610-1 corresponds to a no-headwear option, thus, avatar 605 is displayed without any headwear.

Figure 6B:
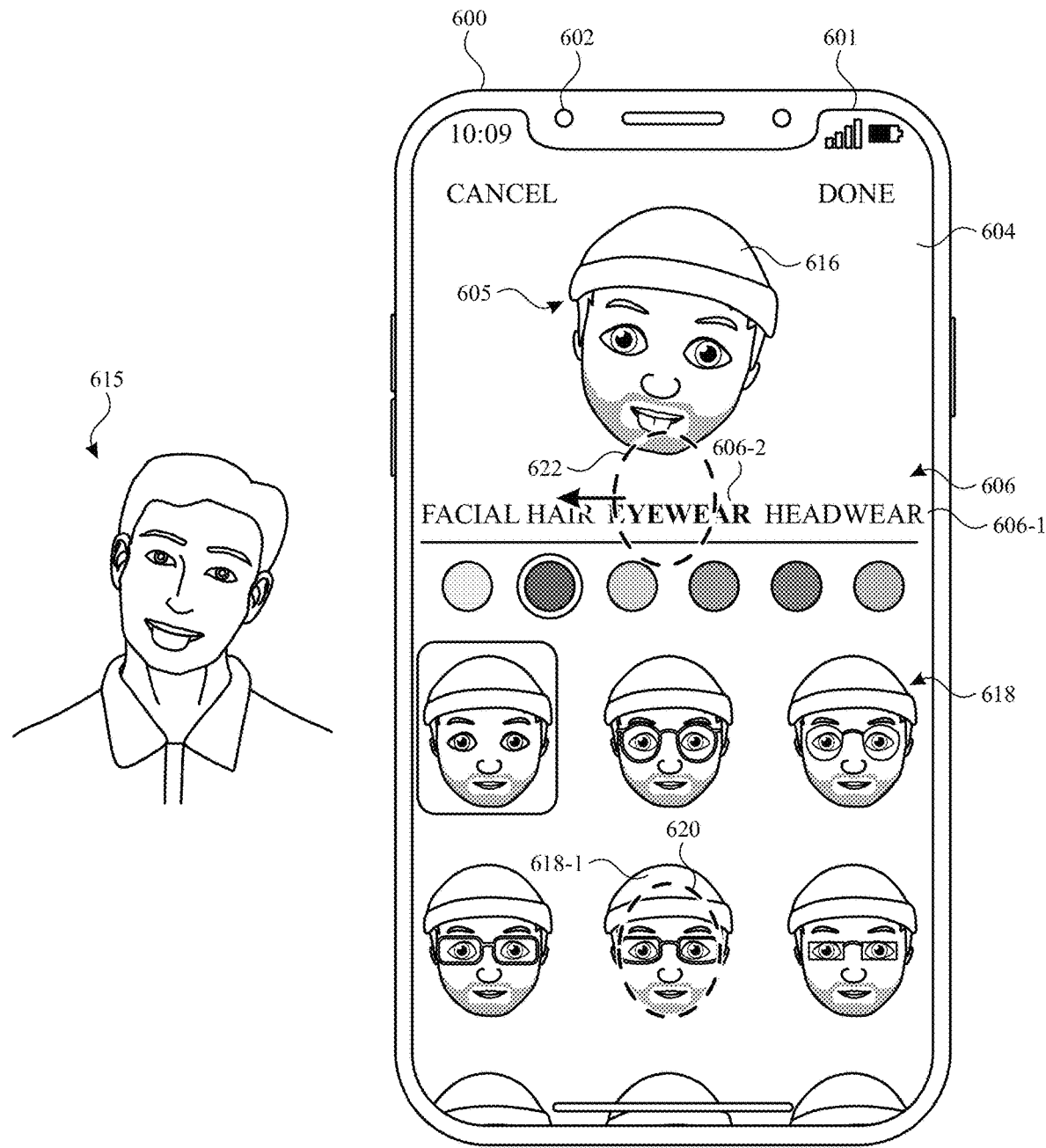

In FIG. 6A, device 600 detects input 612 selecting headwear option 610-2 and input 614 selecting eyewear category 606-2 and, in response, updates editing interface 604 as shown in FIG. 6B. In response to input 612, device 600 updates the appearance of avatar 605 to include hat 616, which corresponds to headwear option 610-2. In response to input 614, device 600 selects eyewear category 606-2 and displays eyewear options 618.

Figure 6C:
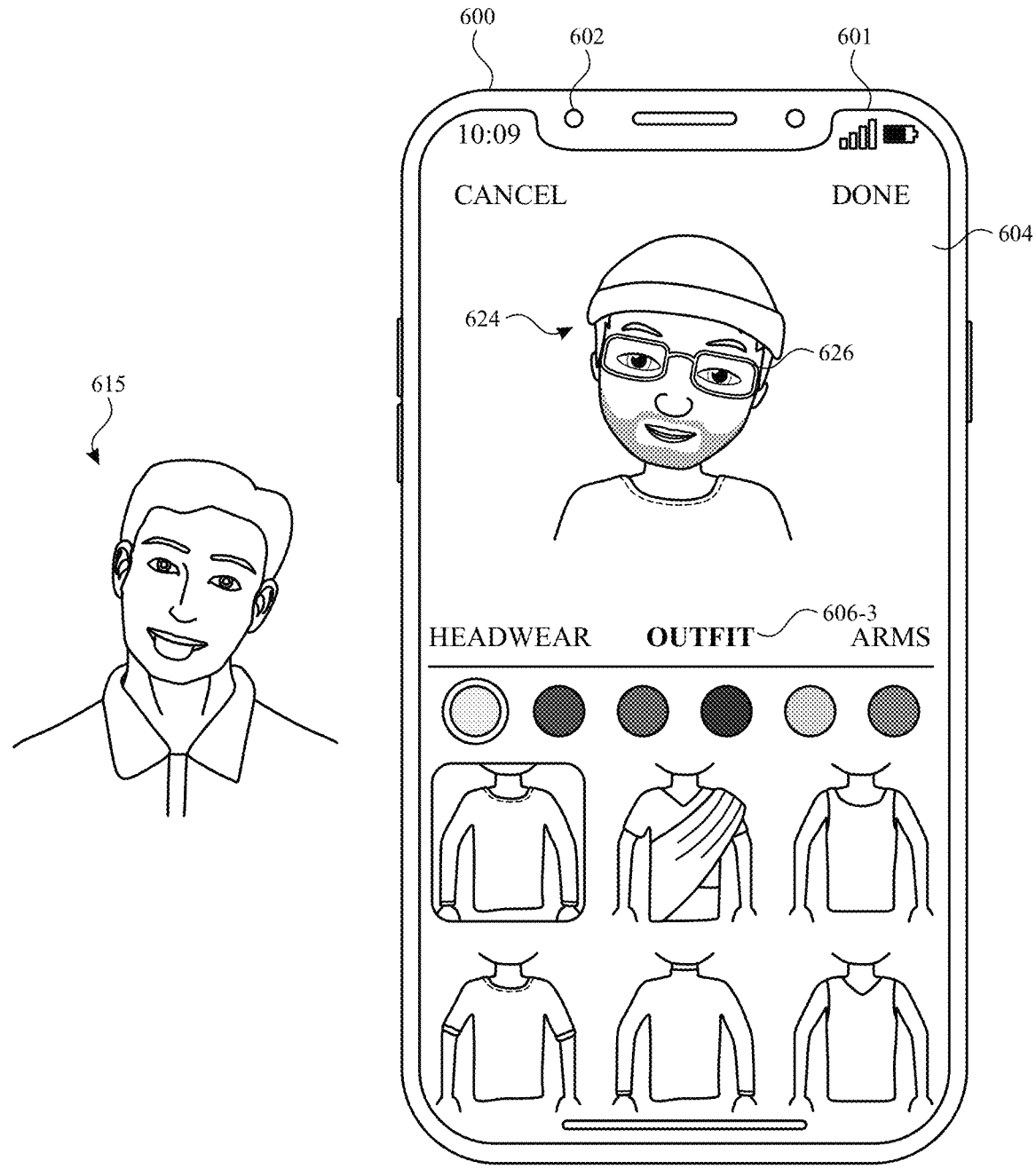

In FIG. 6B, user 615 sticks out his tongue and tilts his head. Device 600 detects the change in pose using camera 602 and, in response, modifies the appearance of avatar 605 to tilt the avatar's head and stick out its tongue. Device 600 detects selection of glasses option 618-1 via input 620, and detects swipe gesture 622 on the feature categories. In response, device 600 updates the avatar to have glasses 626 corresponding to glasses option 618-1, and selects outfit category 606-3, as shown in FIG. 6C.

In some embodiments, when a particular avatar feature is selected for editing, device 600 replaces the displayed, dynamic avatar with a static avatar sticker that shows a representation of the avatar having one or more features that are selected for editing. For example, in FIG. 6C, outfit category 606-3 is a category for editing the avatar's outfit, which is not displayed with avatar 605. Accordingly, device 600 transitions from displaying avatar 605 to displaying an avatar sticker that shows the avatar's outfit (and, optionally, other related features such as arms, hands, and neck), so that the user can see the outfit on the avatar and any changes the user makes to the outfit. In some embodiments, the transition includes an animation in which the avatar transforms into the sticker. For example, FIG. 6C depicts an interstitial depiction 624 of the avatar transitioning from the dynamic avatar to the avatar sticker. The depiction shows the updated appearance of the avatar having hat 616 and glasses 626, and shows a zooming-out effect to begin displaying the avatar's body. Additionally, the avatar stops tracking the user's face as the avatar's head and facial features transition to the pose of the sticker shown in FIG. 6D. As shown in FIG. 6C, the avatar is shown closing its eyes and closing its mouth (having withdrawn the tongue) as the avatar's head moves to an upright position, while user 615 maintains the head tilt and tongue-out pose. In some embodiments, the transition is depicted as a cross-fade from the avatar to the avatar sticker, where the avatar sticker fades in as the avatar fades out.

Figure 6D:
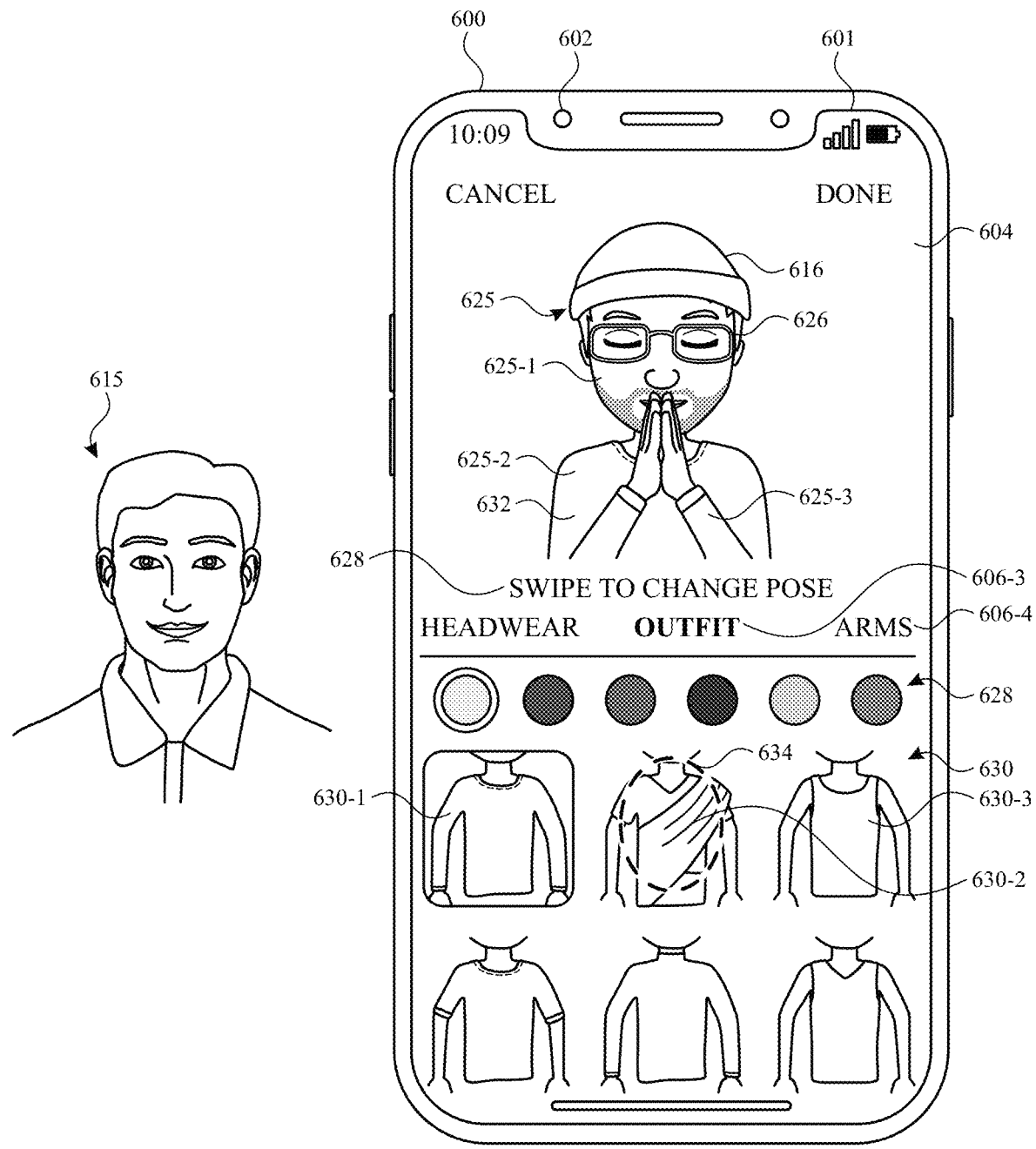

FIG. 6D depicts the completed transition from avatar 605 to avatar sticker 625. Avatar sticker 625 represents the current appearance of the avatar, as edited in FIGS. 6A and 6B. Accordingly, sticker 625 includes hat 616 and glasses 626. Sticker 625 includes avatar head 625-1, body 625-2, and arms 625-3, and is shown with outfit 632 corresponding to outfit option 630-1. Contrary to avatar 605, avatar sticker 625 is static. Accordingly, device 600 does not modify the appearance of the avatar sticker to track the user's face. For example, in FIG. 6D, user 615 is looking forward with eyes open and smiling, whereas sticker 625 shows the avatar in a praying pose with its eyes closed without smiling.

When outfit category 606-3 is selected, editing interface 604 is updated to include outfit options 630 for selecting an outfit for the avatar (which is shown on the avatar sticker) and color options 628 for selecting a color for the selected outfit. In FIG. 6D, device 600 detects input 634, selecting outfit option 630-2. In response, device 600 updates sticker 625 to display outfit 636 corresponding to outfit option 630-2, as shown in FIG. 6E.

In some embodiments, a user can interact with device 600 to change the sticker that is displayed in editing interface 604. For example, in FIG. 6E, device 600 displays prompt 628 prompting the user to swipe on the displayed sticker to display a different sticker. In some embodiments, the stickers displayed by device 600 are a subset of a larger collection of stickers, where the stickers in the subset include those that depict the avatar feature that is currently selected for editing, and does not include stickers that do not depict the avatar feature that is currently selected for editing. Because the user is currently editing the avatar's outfit, the stickers that are currently available to be displayed by device 600 are those that show the avatar's outfit. For example, in response to input 638, device 600 replaces sticker 625 with sticker 627, which is a different sticker that depicts the avatar's outfit with the avatar in a hand-raised pose. Sticker 627 depicts the avatar's head 627-1, body 627-2, and arms 627-3 while wearing outfit 636 corresponding to selected avatar option 630-2.

Figure 6F:
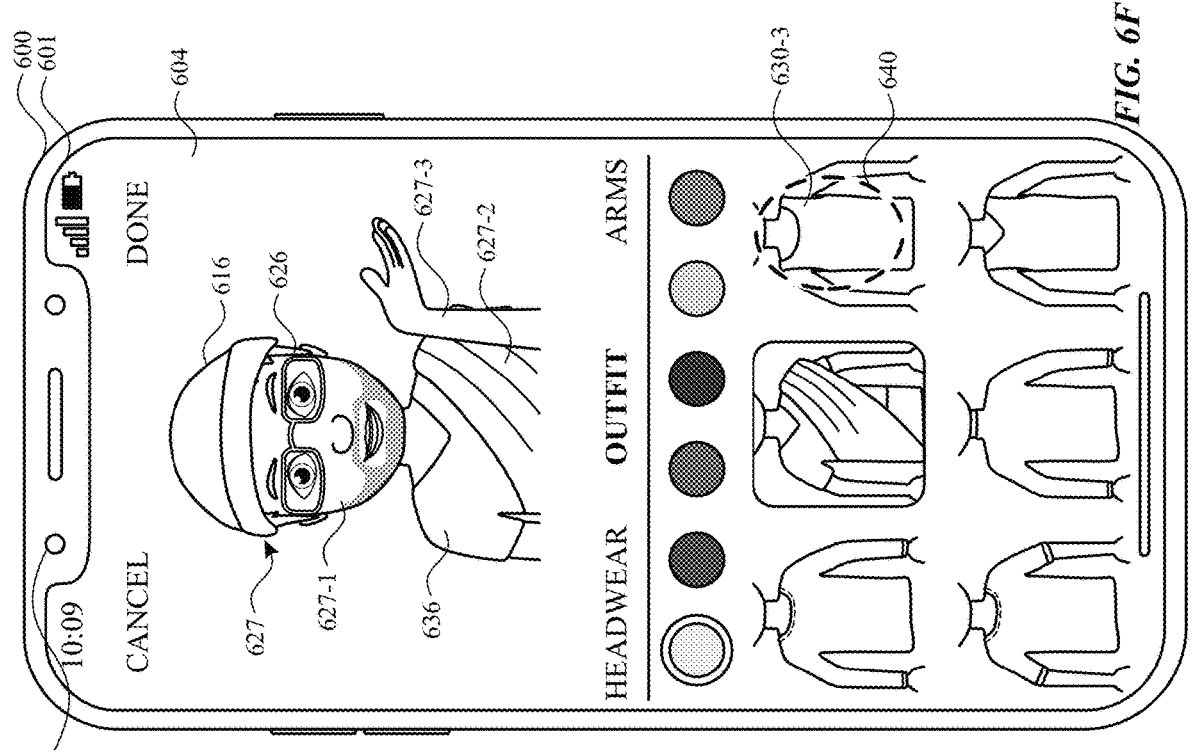
Figure 6E:
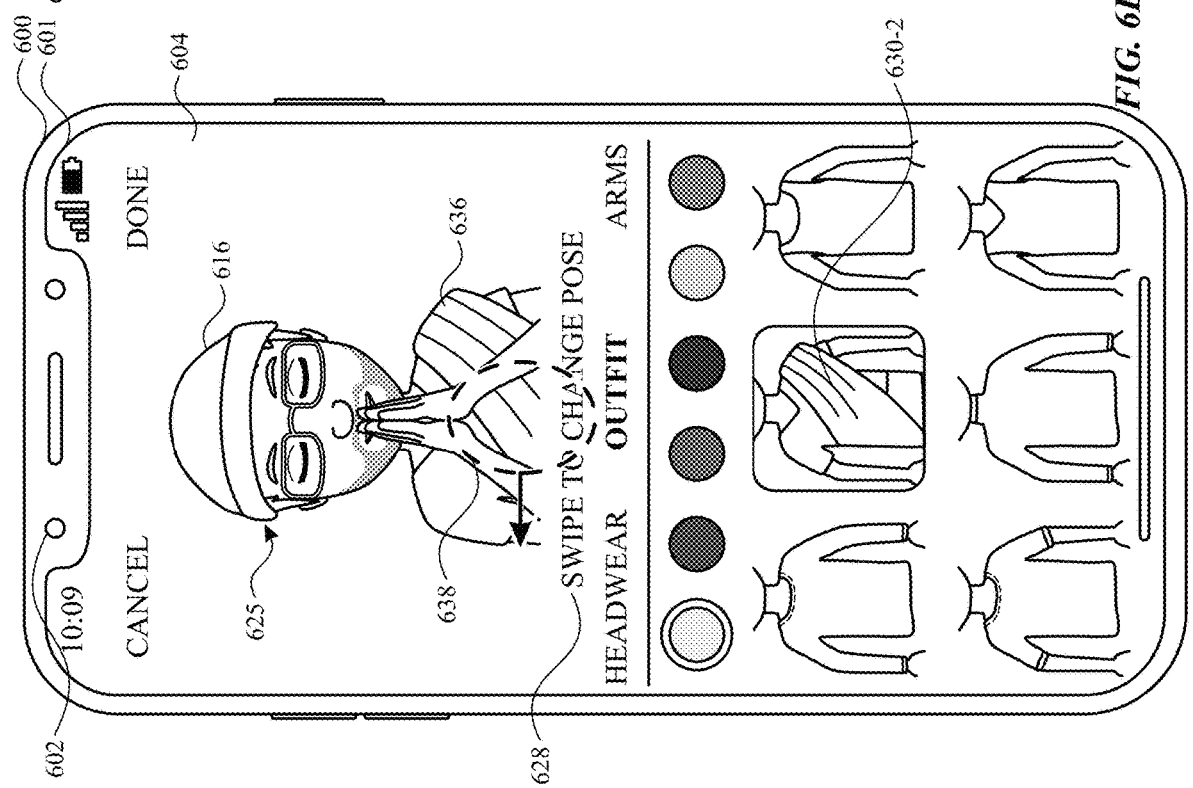
Figure 6G:
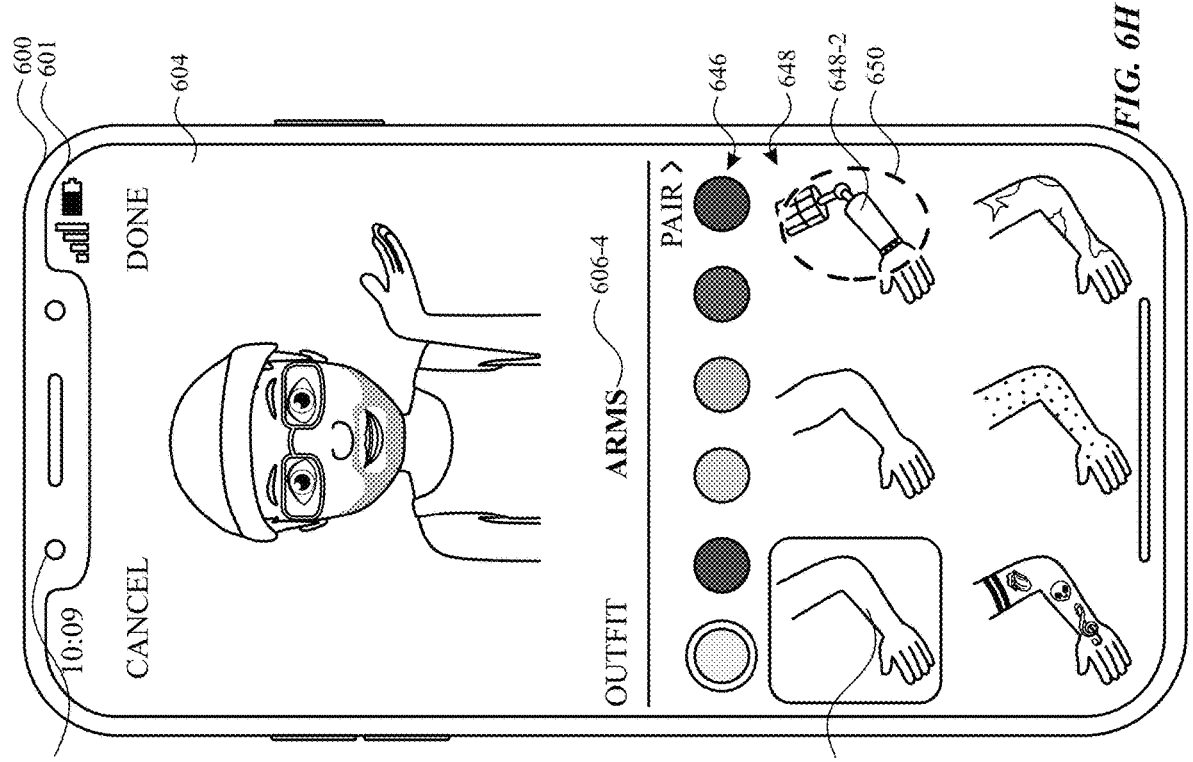
Figure 6H:
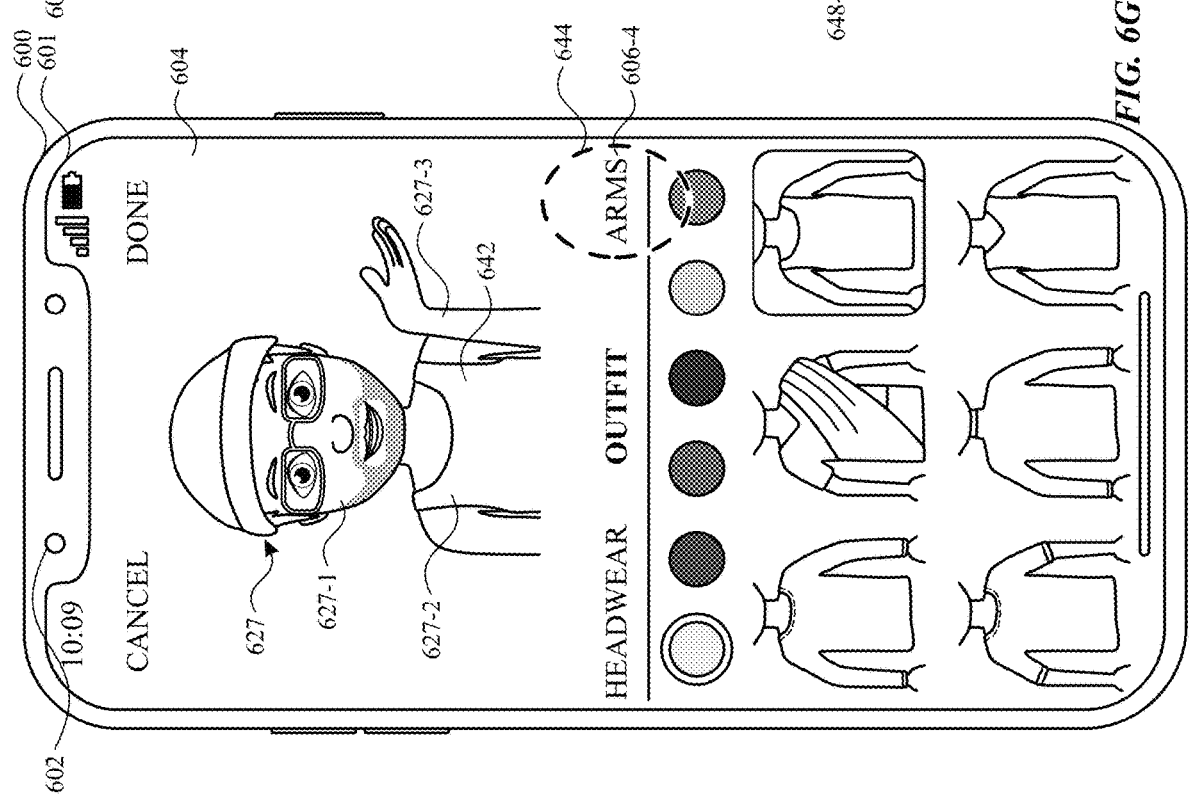

In FIG. 6F, device 600 detects input 640 selecting outfit option 630-3 and, in response, updates sticker 627 to include outfit 642, as shown in FIG. 6G. In FIG. 6G, device 600 detects input 644 to select arms category 606-4. In FIG. 6H, device 600 updates editing interface 604 to display arms options 648 and color options 646. Avatar arm option 648-1 is currently selected. Device 600 detects input 650 to select arms option 648-2. In some embodiments, a selection of an arm option can be applied to both of the avatar's arms. In some embodiments, a selection of an arm option can be applied to the avatar's left or right arm. In some embodiments, editing interface 604 includes an option that can be selected to dictate whether a selected arm option is applied to the avatar's left arm, right arm, or both. In FIG. 6I, device 600 depicts sticker 627 with avatar arms 652 corresponding to selected avatar arm option 648-2.

In some embodiments, editing interface 804 can be accessed from a messaging application and, in some embodiments, stickers editing using editing interface 804 can be used in the messaging application. For example, in FIG. 6I, device 600 detects input 654 and, in response, displays messaging interface 656, as shown in FIG. 6J. Messages interface 656 includes message display region 656-1 showing messages sent to participants of a group messaging conversation. Messaging interface 656 also includes sticker region 656-3 that displays stickers 658 that can be selected to be added to the message conversation. For example, sticker 658-1 can be selected and, in response, device 600 displays sticker 658-1 in message compose region 656-2 and/or in message display region 656-1. Stickers 658 include stickers that were included in the subset available for display while editing the avatar's outfit or arms (e.g., stickers 658-1, 658-2, and 658-3) and stickers that were not included in the subset (e.g., stickers 658-4, 658-5, and 658-6) because these stickers do not include a representation of the avatar's outfit or arms.

FIGS. 6K-6R illustrate example embodiments of an avatar editing interface displayed on device 650. Device 650 includes display 651 (e.g., a touch-sensitive display), and input mechanism 652. Device 650 includes one or more elements of devices 100, 300, 500, or 600.

Figure 6L:
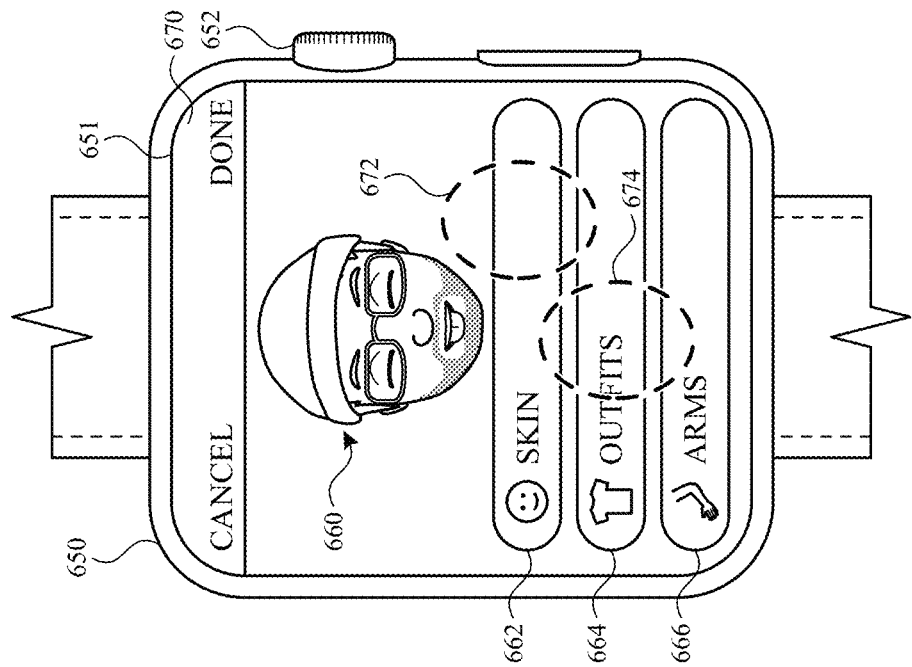
Figure 6K:
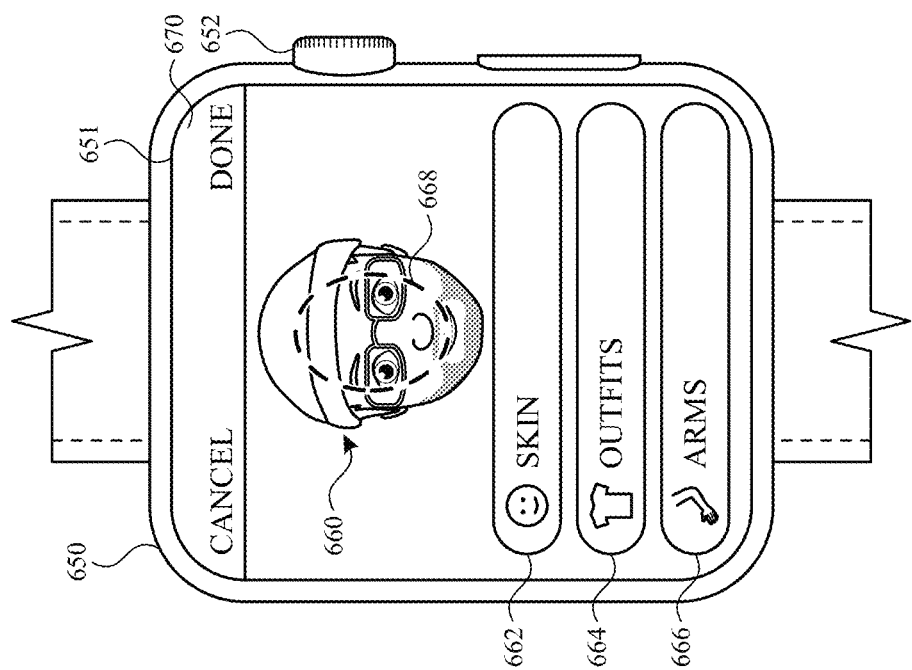
Figure 6N:
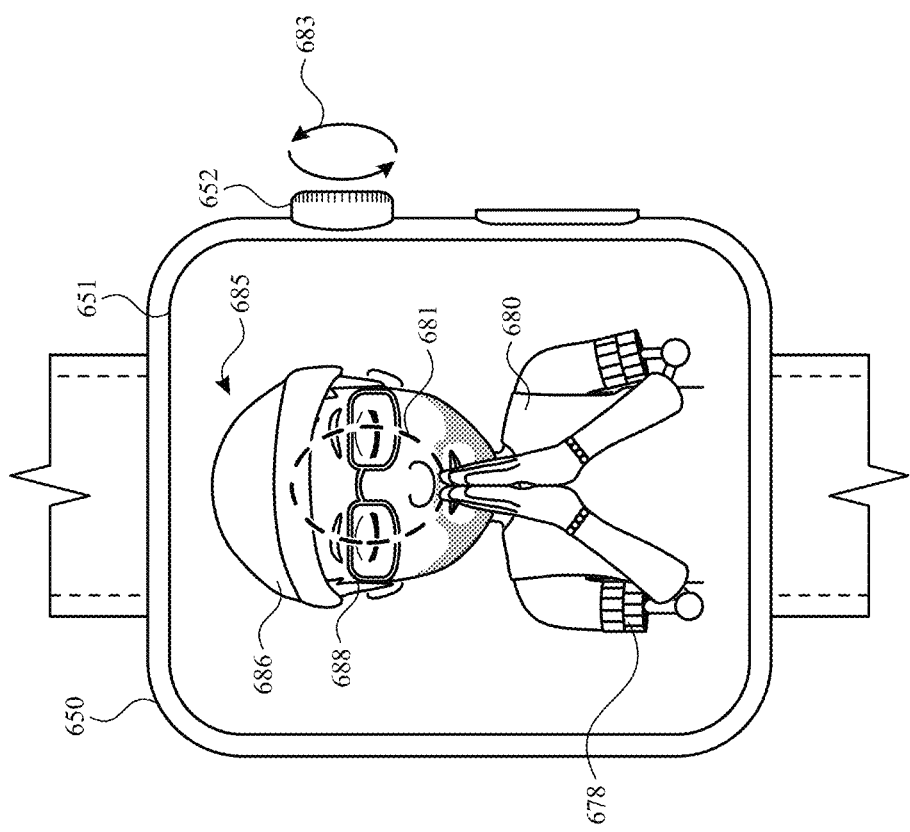

In FIG. 6K, device 650 displays editing interface 670, which includes avatar 660 (similar to avatar 605) and avatar feature category options 662, 664, and 666, which can be selected to edit a feature of avatar 660. In some embodiments, avatar 660 can be selected to display the avatar having different facial expressions. For example, in response to input 668, device 650 displays avatar 660 sticking its tongue out, as shown in FIG. 6L. In some embodiments, device 650 displays the avatar having different facial expressions in response to an input using input mechanism 652 (e.g., a rotation and/or depress of the input mechanism).

Figure 6M:
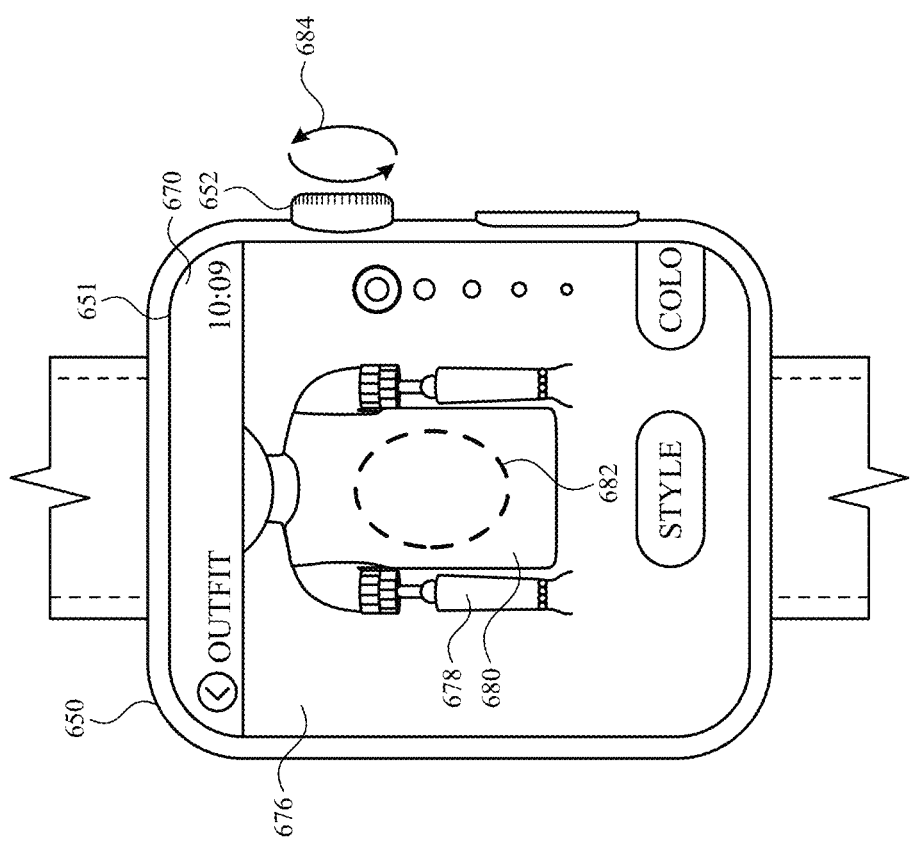

In FIG. 6M, device 650 displays outfit editing interface 676 in response to input 674 on outfits option 664 in FIG. 6L. Outfit editing interface 676 is an interface for editing an outfit of avatar 660, similar to that depicted in FIG. 6D, for example. When outfit editing interface 676 is displayed, additional features of the avatar, such as the avatar's arms 678 and outfit 680, are displayed to illustrate the changes to the avatar's outfit. In some embodiments, the avatar outfit is modified using input mechanism 652. In some embodiments, the avatar outfit is modified using touch inputs on display 651.

In some embodiments, device 650 cycles through displaying various stickers that correspond to the avatar feature that is currently selected for editing. For example, in response to input 682 or input 684 (or, in some embodiments, after a predetermined amount of time), device 650 displays sticker 685, as shown in FIG. 6N. Sticker 685 is similar to sticker 625, but updated to reflect the features selected in FIGS. 6F and 6H. Accordingly, sticker 685 shows the avatar with hat 686 (similar to hat 616), glasses 688 (similar to glasses 626), avatar arms 678 (similar to arms 652), and outfit 680 (similar to outfit 642). In response to input 681, input 683, or after a predetermined amount of time, device 650 cycles to sticker 690, shown in FIG. 6O. In the embodiments, depicted in FIGS. 6M-6O, device 650 is editing the avatar's outfit and, therefore, cycles through stickers that show the avatar's outfit, and does not cycle through stickers that do not illustrate the avatar's outfit.

Figure 6P:
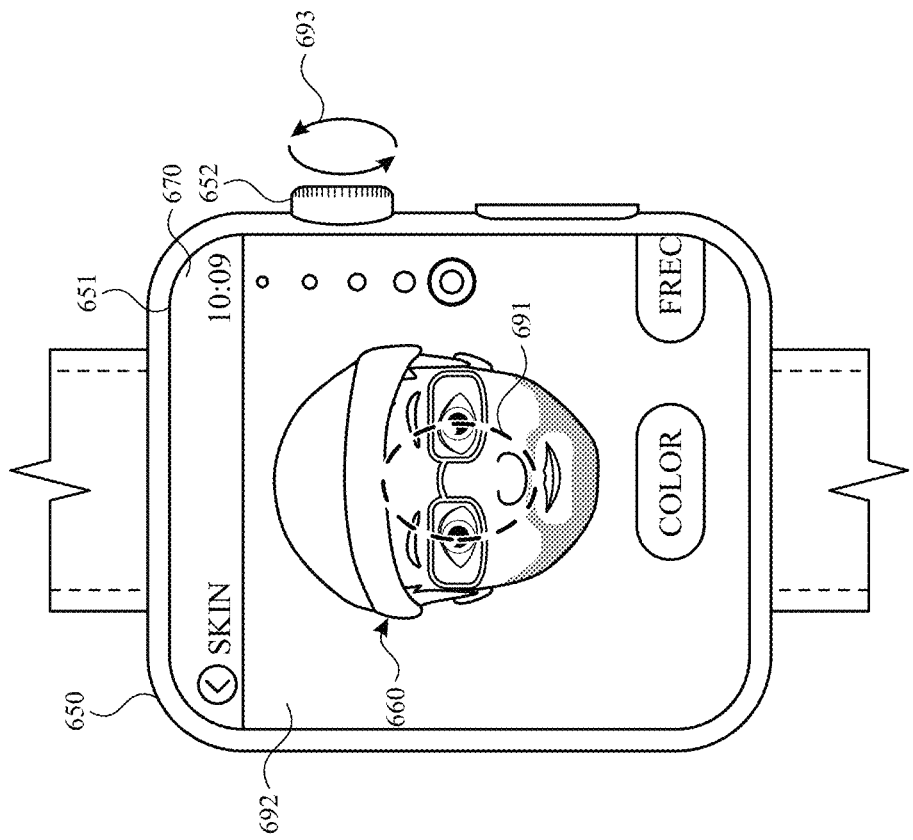
Figure 6O:
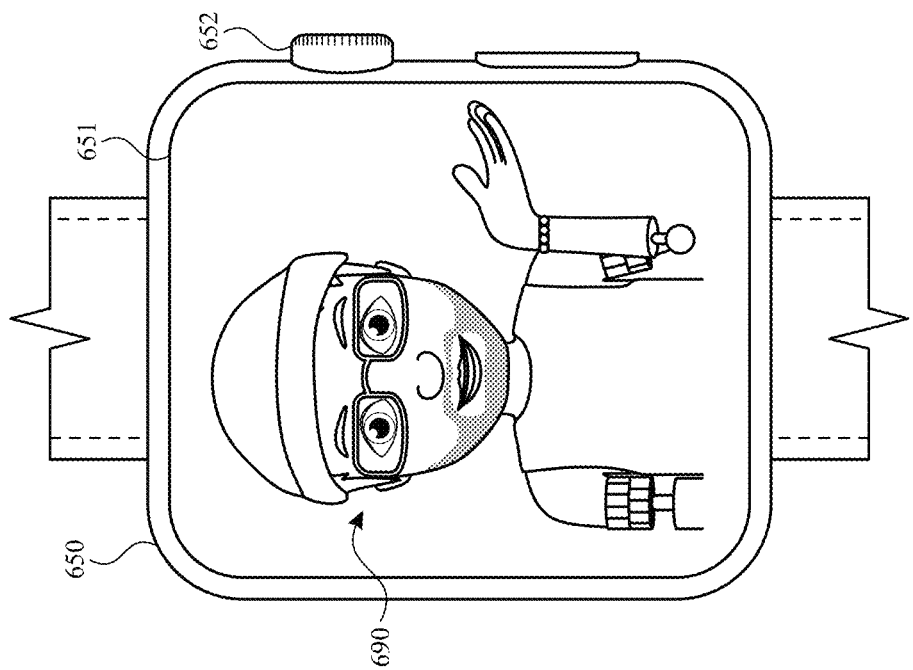
Figure 6R:
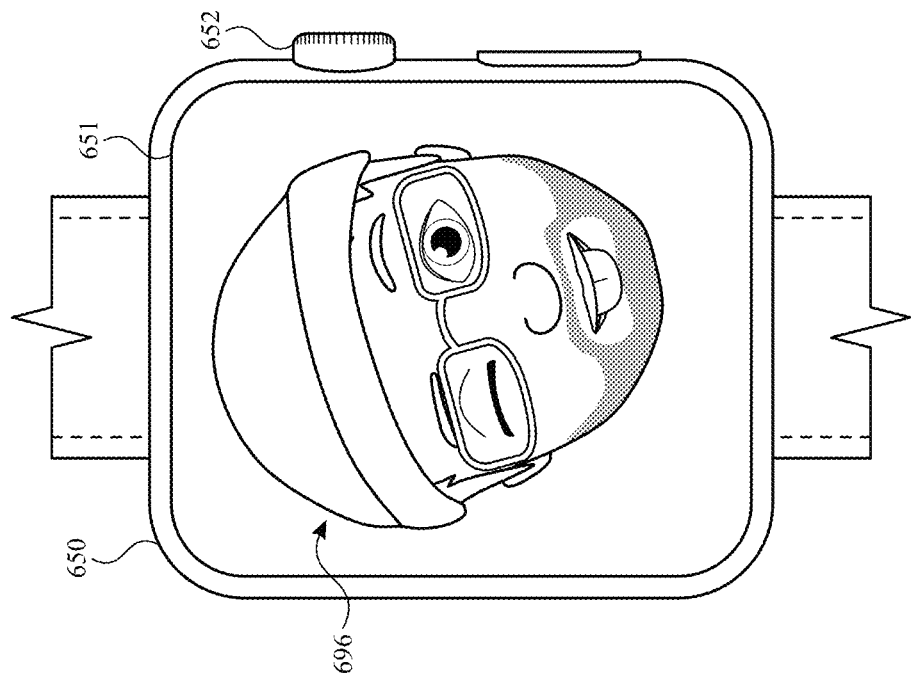

In FIG. 6P, device 650 displays skin editing interface 692 in response to input 672 on skin option 662 in FIG. 6L. Skin editing interface 692 is an interface for editing the skin of avatar 660. When skin editing interface 692 is displayed, the avatar's arms and outfit are not displayed. In some embodiments, the avatar's skin is modified using input mechanism 652. In some embodiments, the avatar's skin is modified using touch inputs on display 651.

Figure 6Q:
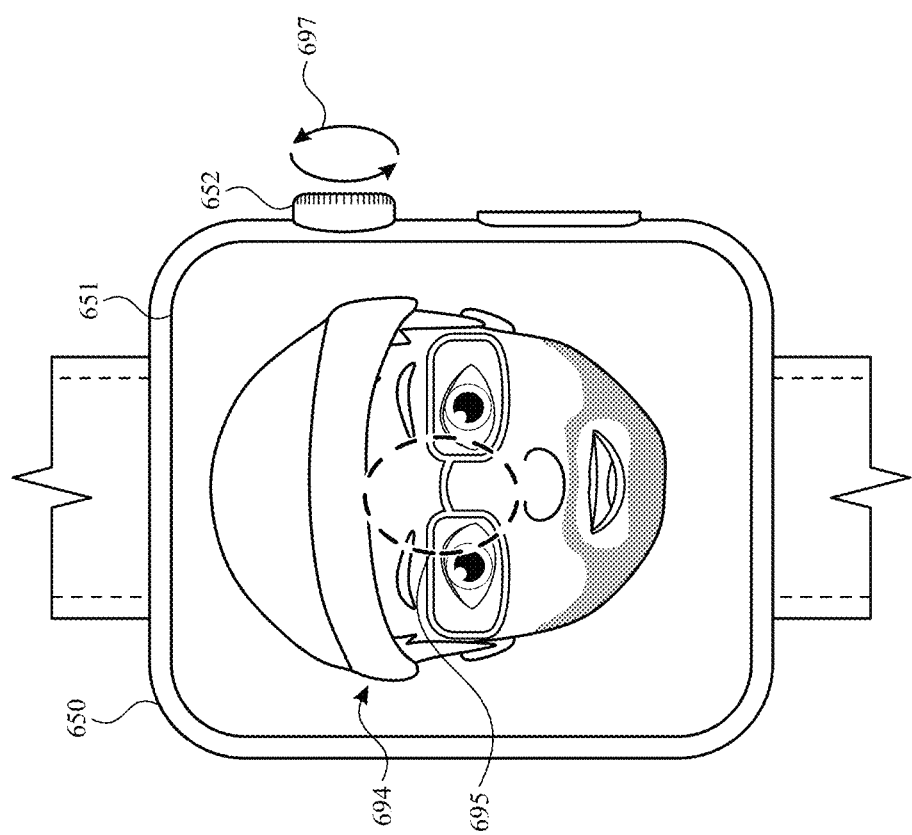

As depicted in FIGS. 6Q and 6R, device 650 cycles through displaying stickers that depict the avatar's skin, but not stickers that include the avatar's outfit or arms. For example, in response to input 691, input 693, or after a predetermined amount of time, device 650 displays sticker 694, as shown in FIG. 6Q. In response to input 695, input 697, or after a predetermined amount of time, device 650 displays sticker 696, as shown in FIG. 6R.

FIG. 7 is a flow diagram illustrating a method for editing avatar stickers using a computer system in accordance with some embodiments. Method 700 is performed at a computer system (e.g., a smartphone, a tablet, a smartwatch) that is in communication with a display generation component (e.g., a display controller, a touch-sensitive display system) and one or more input devices (e.g., a touch-sensitive surface). Some operations in method 700 are, optionally, combined, the orders of some operations are, optionally, changed, and some operations are, optionally, omitted.

As described below, method 700 provides an intuitive way for editing avatar stickers. The method reduces the cognitive burden on a user for editing avatar stickers, thereby creating a more efficient human-machine interface. For battery-operated computing devices, enabling a user to edit avatar stickers faster and more efficiently conserves power and increases the time between battery charges.

The computer system (e.g., 600 or 650) displays (702) via the display generation component (e.g., 601 or 651), an avatar editing interface (e.g., 604 or 670) (e.g., an interface for editing one or more features of an avatar character) that includes (e.g., concurrently displaying): (704) a representation of a virtual avatar (e.g., 605 or 660) (e.g., an avatar that can be customized and, optionally, created by a user of the computer system) (e.g., a live preview of a virtual avatar that tracks movement of a face of a user) having a plurality of avatar features (e.g., 616 and/or 626), wherein the virtual avatar is associated with a set of stickers including a first avatar sticker (e.g., 625 or 685) that shows the virtual avatar in a first pose and a second avatar sticker (e.g., 627 or 690) that shows the virtual avatar in a second pose different from the first pose (e.g., user-customizable (e.g., selectable or configurable) avatar features); and (706) a first set of one or more graphical interface objects (e.g., 610 or 618) that are selectable for modifying a first avatar feature of the plurality of avatar features that are visible in the representation of the virtual avatar (e.g., different outfit options, different arm options, different headwear options; different eye color options). In some embodiments, the virtual avatar is modeled to represent a human character, and the avatar features generally correspond to physical traits of a human. For example, such an avatar may include a representation of a person having various physical, human features or characteristics (e.g., an older woman with a dark skin tone and having long, straight, brown hair). Such an avatar would also include a representation of a person having various non-human characteristics that are typically associated with an appearance of a human (e.g., cosmetic enhancements, hats, eyeglasses, sunglasses, etc.). In some embodiments, the representation of the virtual avatar includes the avatar's head and avatar features located on, or immediately adjacent to, the avatar's head, such as facial features, the avatar's neck, a hat, eyeglasses, and the like. In some embodiments, the representation of the virtual avatar does not include a portion of the avatar, such as the avatar's body or avatar features that are not located on, or immediately adjacent to, the avatar's head.

While displaying the avatar editing interface including the representation of the virtual avatar, the computer system (e.g., 600 or 650) detects (708), via the one or more input devices (e.g., 601; 602; 651; and/or 652), an input corresponding to a request to display editing options for a second avatar feature of the plurality of avatar features (e.g., 622 or 674) (e.g., a feature of the avatar's body (e.g., the avatar's outfit (e.g., shirt); or the avatar's arms)).

In response to detecting the input (e.g., 622) (in some embodiments, after detecting the input (e.g., 674)), the computer system (e.g., 600 or 650) updates (710) display of the avatar editing interface (e.g., 604 or 670), including: the computer system displays (712) (e.g., in a region of the avatar editing interface that was previously occupied by at least a portion of the representation of the virtual avatar) a representation of the first avatar sticker (e.g., 625 or 685) having an appearance that includes the second avatar feature (e.g., 632, 636, 642, 652, 678, and/or 680) and is based on an appearance of the virtual avatar (e.g., a static representation of the avatar having a static pose and an appearance based on the avatar including the second avatar feature and, optionally, features used to create and/or modify an appearance of the avatar (e.g., a hat, sunglasses, hair style/color, skin tone, etc.)); and the computer system displays (714) a second set of one or more graphical interface objects (e.g., 630 or 648) that are selectable for modifying one or more of the avatar features (e.g., the second avatar feature) that are visible in the first avatar sticker (e.g., different outfit options, different arm options, different headwear options; different eye color options) (in some embodiments, replacing the first set of one or more graphical interface objects with the second set of one or more graphical interface objects) (in some embodiments, the one or more avatar features that are modified using the second set of one or more graphical interface objects are also visible in the second avatar sticker). Displaying the representation of the first avatar sticker having an appearance that includes the second avatar feature and is based on an appearance of the virtual avatar reduces the number of inputs at the computer system (e.g., 600 or 650) by automatically adjusting a displayed appearance of the virtual avatar to emphasize the avatar features being edited without requiring additional input from the user. Reducing the number of inputs needed to perform an operation enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the specific avatar sticker that is displayed in response to the input is automatically selected by the computer system (e.g., 600 or 650) (e.g., without further user input), and is selected to emphasize the second avatar feature. In some embodiments, the avatar sticker includes one or more avatar features that are not located on, or immediately adjacent to, the avatar's head, such as a shirt, arms, and/or hands, for example. In some embodiments, the avatar sticker includes features (e.g., additional features compared to the representation of the virtual avatar) that are displayed to modify an appearance of the avatar in order to convey a particular expression, emotion, sentiment, etc. For example, stickers can include a heart over the avatar's eyes to convey love or a tear under the avatar's eye(s) to convey sadness. In some embodiments, the avatar sticker includes slight modifications to the appearance of the avatar, such as altering a portion of the avatar while still retaining an overall recognizable representation of the avatar. An example of one such modification is a "mind blown" sticker in which the sticker is a representation of the avatar with a top portion of the avatar's head removed and displaying an exploded state of the avatar's brain.

In some embodiments, the first avatar sticker (e.g., 625 or 685) that shows the virtual avatar in the first pose includes a first portion of the virtual avatar (e.g., 625-2 or 625-3) (e.g., avatar arm(s)) that is not visible in the representation of the virtual avatar (e.g., 605) displayed in the avatar editing interface (e.g., 604) (e.g., the first portion of the virtual avatar is not displayed in the representation of the virtual avatar). In some embodiments, the second avatar sticker (e.g., 627 or 690) that shows the virtual avatar in the second pose includes a second portion of the virtual avatar (e.g., 627-2 or 627-3) (e.g., an avatar torso) (in some embodiments, the second portion of the virtual avatar is the same as the first portion) that is not visible in the representation of the virtual avatar (e.g., 605) displayed in the avatar editing interface (e.g., 604) (e.g., the second portion of the virtual avatar is not displayed in the representation of the virtual avatar). Displaying the first avatar sticker showing the virtual avatar in the first pose and including a first portion of the virtual avatar that is not visible in the representation of the virtual avatar and displaying the second avatar sticker showing the virtual avatar in the second pose and including a second portion of the virtual avatar that is not visible in the representation of the virtual avatar provides feedback to a user of the computer system (e.g., 600 or 650) that the first or second portion of the virtual avatar is being edited (or is at least relevant to the feature of the avatar that is being edited) and reduces the number of inputs at the computer system by automatically adjusting display of the virtual avatar to emphasize features being edited without requiring additional input from the user. Providing improved feedback and reducing the number of inputs needed to perform an operation enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, while displaying the representation of the first avatar sticker (e.g., 625), the computer system (e.g., 600 or 650) detects, via the one or more input devices (e.g., 601; 602; 651; 652), a second input (e.g., 638) (e.g., a tap or swipe gesture directed to the representation of the first avatar sticker). In response to detecting the second input, the computer system displays (e.g., in a region of the avatar editing interface that was previously occupied by at least a portion of the representation of the first avatar sticker) a representation of the second avatar sticker (e.g., 627) having an appearance that includes the second avatar feature (e.g., 627-2 or 627-3) and is based on an appearance of the virtual avatar. In some embodiments, the computer system continues to display the second set of one or more graphical interface objects that are selectable for modifying one or more of the avatar features that are visible in the first avatar sticker (and/or the second avatar sticker). In some embodiments, the computer system displays a set of one or more graphical interface objects that are selectable for modifying one or more of the avatar features that are visible in the second avatar sticker (in some embodiments, replacing the second set of one or more graphical interface objects with a different set of one or graphical interface objects). Displaying the representation of the second avatar sticker having an appearance that includes the second avatar feature and is based on an appearance of the virtual avatar reduces the number of inputs at the computer system by automatically adjusting a displayed appearance of the virtual avatar to emphasize the avatar features being edited without requiring additional input from the user. Reducing the number of inputs needed to perform an operation enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, while displaying the representation of the second avatar sticker having a first appearance (e.g., 627) (e.g., the second avatar sticker shows the virtual avatar wearing a first outfit), the computer system (e.g., 600 or 650) detects, via the one or more input devices (e.g., 601; 602; 651; and/or 652), a set of one or more inputs that includes an input corresponding to a request to change an appearance of the virtual avatar (e.g., 640) (e.g., a selection of one of the graphical interface objects in the second set of one or more graphical interface objects) (e.g., selecting a different outfit for the virtual avatar). In response to detecting the set of one or more inputs, the computer system displays the representation of the second avatar sticker (e.g., 627 in FIG. 6I) having a second appearance different from the first appearance and based on the request to change the appearance of the virtual avatar (e.g., displaying the second avatar sticker with the different outfit that was selected for the virtual avatar). Displaying the representation of the second avatar sticker having a second appearance different from a first appearance and based on a request to change an appearance of the virtual avatar provides feedback to a user of the computer system that a feature of the virtual avatar was edited and reduces the number of inputs at the computer system by automatically adjusting a displayed appearance of the virtual avatar to emphasize the avatar features being edited without requiring additional input from the user. Providing improved feedback and reducing the number of inputs needed to perform an operation enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, while displaying the avatar editing interface (e.g., 604) including the representation of the virtual avatar (e.g., 605), the computer system (e.g., 600; 650) detects, via the one or more input devices (e.g., 601; 602; 651; and/or 652), an input (e.g., 614) corresponding to a request to display editing options for a third avatar feature (e.g., avatar eyewear) of the plurality of avatar features. In response to detecting the input corresponding to the request to display editing options for the third avatar feature of the plurality of avatar features, the computer system displays a third set of one or more graphical interface objects (e.g., 618) (e.g., avatar eyewear options) that are selectable for modifying the third avatar feature (in some embodiments, replacing the first set of one or more graphical interface objects with the third set of one or more graphical interface objects). Displaying a third set of one or more graphical interface objects that are selectable for modifying the third avatar feature while displaying the avatar editing interface including the representation of the virtual avatar, provides feedback to a user of the computer system that the third avatar feature has been selected for editing and reduces the number of inputs at the computer system by automatically adjusting a displayed appearance of the virtual avatar to emphasize the avatar features being edited without requiring additional input from the user. Providing improved feedback and reducing the number of inputs needed to perform an operation enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, while displaying the avatar editing interface (e.g., 604) including the representation of the first avatar sticker (e.g., 625), the computer system (e.g., 600; 650) detects, via the one or more input devices (e.g., 601; 602; 651; and/or 652), an input (e.g., 644) corresponding to a request to display editing options for a fourth avatar feature (e.g., avatar arms) of the plurality of avatar features. In response to detecting the input corresponding to the request to display editing options for the fourth avatar feature of the plurality of avatar features, the computer system displays a fourth set of one or more graphical interface objects (e.g., 648) (e.g., avatar arms options) that are selectable for modifying the fourth avatar feature (in some embodiments, replacing the second set of one or more graphical interface objects with the fourth set of one or more graphical interface objects). Displaying a fourth set of one or more graphical interface objects that are selectable for modifying the fourth avatar feature while displaying the avatar editing interface including the representation of the first avatar sticker provides improved feedback to a user of the computer system that the fourth avatar feature is selected for editing and reduces the number of inputs at the computer system by automatically adjusting a displayed appearance of the virtual avatar to emphasize the avatar features being edited without requiring additional input from the user. Providing improved feedback and reducing the number of inputs needed to perform an operation enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, while displaying the avatar editing interface (e.g., 604) including the representation of the virtual avatar (e.g., 605) having a first appearance of the first avatar feature (e.g., and prior to displaying the representation of the first avatar sticker), the computer system (e.g., 600 or 650) detects, via the one or more input devices (e.g., 601; 602; 651; and/or 652), a selection (e.g., 612) of one of the graphical interface objects (e.g., 610-2) in the first set of one or more graphical interface objects (e.g., 610) (e.g., selecting a hat for the virtual avatar). In response to detecting the selection of one of the graphical interface objects in the first set of one or more graphical interface objects, the computer system displays the representation of the virtual avatar having a second appearance of the first avatar feature that is different from the first appearance and based on the selected graphical interface object in the first set of one or more graphical interface objects (e.g., 605 in FIG. 6B) (e.g., displaying the representation of the virtual avatar with the selected hat). Displaying the representation of the virtual avatar having a second appearance of the first avatar feature that is different from the first appearance and based on the selected graphical interface object in the first set of one or more graphical interface objects, and while displaying the avatar editing interface including the representation of the virtual avatar, provides feedback to a user of the computer system that an appearance of the virtual avatar has been edited and reduces the number of inputs at the computer system by automatically adjusting a displayed appearance of the virtual avatar to emphasize the avatar features being edited without requiring additional input from the user. Providing improved feedback and reducing the number of inputs needed to perform an operation enhances the operability of the computer system and makes the user-system interface more efficient (e.g., by helping the user to provide proper inputs and reducing user mistakes when operating/ interacting with the computer system) which, additionally, reduces power usage and improves battery life of the computer system by enabling the user to use the system more quickly and efficiently.

In some embodiments, while displaying the avatar editing interface (e.g., 604) including the representation of the first avatar sticker (e.g., 625) having a first appearance of the second avatar feature (e.g., 625-2 or 625-3), the computer system (e.g., 600; 650) detects, via the one or more input devices (e.g., 601; 602; 651; and/or 652), a selection (e.g., 634) of one of the graphical interface objects (e.g., 630-2) in the second set of one or more graphical interface objects (e.g., 630) (e.g., selecting a different outfit for the virtual avatar; selecting different arms for the virtual avatar). In response to detecting the selection, the computer system displays the representation of the first avatar sticker having a second appearance of the second avatar feature that is different from the first appearance and based on the selected graphical interface object in the second set of one or more graphical interface objects (e.g., 625 in FIG. 6E) (e.g., displaying the representation of the first avatar sticker with the different outfit that was selected for the virtual avatar; displaying the representation of the first avatar sticker with the different arms that were selected for the virtual avatar). Displaying the representation of the first avatar sticker having a second appearance of the second avatar feature that is different from the first appearance and based on the selected graphical interface object in the second set of one or more graphical interface objects provides feedback to a user of the computer system that an appearance of the virtual avatar has been edited and reduces the number of inputs at the computer system by automatically adjusting a displayed appearance of the virtual avatar to emphasize the avatar features being edited without requiring additional input from the user. Providing improved feedback and reducing the number of inputs needed to perform an operation enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the second avatar feature includes avatar clothing (e.g., 616, 626, 632, 636, or 642) (e.g., a hat or an outfit). In some embodiments, the second avatar feature includes avatar arms (e.g., 625-3, 627-3, or 652) (e.g., a style or type of avatar arm).

In some embodiments, displaying the avatar editing interface (e.g., 604) that includes the representation of the virtual avatar (e.g., 605) includes displaying an animation of the representation of the virtual avatar (e.g., 605 in FIG. 6B) (e.g., the virtual avatar changes poses and/or facial expressions). In some embodiments, the animation of the representation of the virtual avatar is based on a face (e.g., face of user 615) (e.g., one or more facial features of a user of the computer system) that is detected by one or more cameras (e.g., 602) (e.g., a visible light camera, a depth camera, and/or an infrared camera) associated with (e.g., in communication with) the computer system (e.g., 600 or 650) (e.g., the representation of the virtual avatar changes in response to detecting one or more changes (e.g., a change in pose, position, and/or orientation) in a face positioned within a field-of-view of one or more cameras (e.g., the representation of the virtual avatar mimics changes in the movement and/or facial expressions of a face detected within a field-of-view of one or more cameras (e.g., one or more cameras in communication with the computer system))). Animating the representation of the virtual avatar based on a face that is detected by one or more cameras associated with the computer system provides additional controls for viewing different features of the virtual avatar without cluttering the user interface with additional displayed controls. Providing additional control options without cluttering the user interface with additional displayed controls enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the representation of the first avatar sticker (e.g., 625, 627, 685, or 690) is static (e.g., the virtual avatar does not change poses and/or facial expressions over time) (e.g., the appearance of the first avatar sticker is not responsive to changes in the user's face). Displaying the static representation of the first avatar sticker enhances the user experience by permitting the user to modify the appearance of the virtual avatar, and to view the corresponding changes, without having to maintain a particular pose in order to view the avatar features that are being modified and reduces the number of inputs at the computer system (e.g., 600; 650) by eliminating the need to track the face of the user while the user is editing the virtual avatar. Enhancing the user experience and reducing the number of inputs needed to perform an operation enhances the operability of the computer system and makes the user-system interface more efficient (e.g., by helping the user to provide proper inputs and reducing user mistakes when operating/ interacting with the computer system) which, additionally, reduces power usage and improves battery life of the computer system by enabling the user to use the system more quickly and efficiently.

In some embodiments, displaying the avatar editing interface (e.g., 670) that includes the representation of the virtual avatar (e.g., 660) includes displaying the representation of the virtual avatar with a first facial pose of the virtual avatar (e.g., 660 in FIG. 6K) (and, in some embodiments, the first avatar feature) (e.g., the representation of the virtual avatar has a first facial expression (e.g., a surprised expression)). While displaying the avatar editing interface including the representation of the virtual avatar with the first facial pose of the virtual avatar, the computer system (e.g., 600; 650) detects, via the one or more input devices (e.g., 601; 602; 651; 652), a first input (e.g., 668) (e.g., a tap gesture; a swipe gesture) (e.g., an input directed to the representation of the virtual avatar). In response to detecting the first input, the computer system transitions the representation of the virtual avatar from the first facial pose of the virtual avatar to a second facial pose of the virtual avatar (e.g., 660 in FIG. 6L) (e.g., the representation of the virtual avatar changes to a second facial expression (e.g., a tongue-out, winking expression)) that is different from the first facial pose (and, in some embodiments, the first avatar feature). Transitioning the representation of the virtual avatar from the first facial pose of the virtual avatar to a second facial pose of the virtual avatar that is different from the first facial pose provides controls for adjusting the view of the avatar to display different poses that show the first avatar feature without cluttering the user interface with additional displayed controls. Providing additional control options without cluttering the user interface with additional displayed controls enhances the operability of the computer system (e.g., 600; 650) and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments (e.g., when the representation of the virtual avatar is not responsive to changes in the user's face), the computer system changes the facial pose (e.g., facial expression) of the representation of the virtual avatar in response to detecting an input on the representation of the virtual avatar.

In some embodiments, while displaying the avatar editing interface (e.g., 670) including a representation of a respective avatar sticker in the set of stickers (e.g., 685), the computer system (e.g., 600 or 650) detects expiration of a predetermined amount of time. In response to detecting expiration of the predetermined amount of time, the computer system displays a representation of a subsequent avatar sticker (e.g., 690) in the set of stickers different from the respective avatar sticker (e.g., automatically (e.g., without user input) transitioning from displaying a first sticker in the set of stickers to a second sticker in the set of stickers). Displaying a representation of a subsequent avatar sticker in the set of stickers different from the respective avatar sticker in response to detecting expiration of the predetermined amount of time automatically adjusts the view of the avatar to display different poses that show the respective avatar feature being edited without requiring additional user input. Performing an operation automatically when a set of conditions has been met reduces the number of inputs at the computer system (e.g., 600 or 650), enhances the operability of the computer system, and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the set of stickers includes one or more avatar stickers (e.g., 625, 627, 658-1, 658-2, 658-3, 685, or 690) that show a respective avatar feature that is currently selected for editing (e.g., the second avatar feature) and one or more avatar stickers (e.g., 658-4, 658-5, 658-6, 694, or 696) that do not show the respective avatar feature that is currently selected for editing. In some embodiments, the respective avatar sticker (e.g., 625 or 685) and the subsequent avatar sticker (e.g., 627 or 690) are selected from a first subset of avatar stickers that includes multiple stickers that show the respective avatar feature and does not include stickers that do not show the respective avatar feature. Displaying stickers that are selected from a first subset of avatar stickers that includes multiple stickers that show the respective avatar feature and does not include stickers that do not show the respective avatar feature conserves computational resources by displaying only the avatar stickers that show the feature being edited and eliminating display of stickers that are not relevant to the user. Conserving computational resources enhances the operability of the computer system (e.g., 600 or 650) and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, as the computer system cycles through the avatar stickers, the computer system displays avatar stickers that correspond to (e.g., show or depict) the avatar feature that is currently selected for editing, and does not display (e.g., skips display of) avatar stickers that do not correspond to the avatar feature that is currently selected for editing.

In some embodiments, while displaying a representation of a sticker (e.g., 685 or 690) from the set of stickers (e.g., the respective avatar sticker or the subsequent avatar sticker), the computer system (e.g., 600 or 650) detects an input (e.g., 672) corresponding to a request to display editing options for a fifth avatar feature of the plurality of avatar features. In response to (in some embodiments, after) detecting the input corresponding to the request to display editing options for the fifth avatar feature, the computer system displays a representation of a first sticker (e.g., 694 or 696) that is selected from a second subset of avatar stickers that includes multiple stickers that show the fifth avatar feature and does not include stickers that do not show the fifth avatar feature. Displaying representations of a first sticker that is selected from a second subset of avatar stickers that includes multiple stickers that show the fifth avatar feature and does not include stickers that do not show the fifth avatar feature conserves computational resources by displaying only the avatar stickers that show the feature being edited and eliminating display of stickers that are not relevant to the user. Conserving computational resources enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, the computer system transitions from displaying the first sticker that is selected from the second subset of avatar stickers to displaying a second sticker that is selected from the second subset of avatar stickers. In some embodiments, the transition from the first sticker in the second subset to the second sticker in the second subset occurs automatically (e.g., after expiration of a predetermined amount of time) or manually (e.g., in response to an input (e.g., an input on the first sticker in the second subset)).

In some embodiments, updating display of the avatar editing interface (e.g., 604 or 670) includes displaying an animation (e.g., 624) (e.g., a sequenced graphical transition) of the representation of the virtual avatar (e.g., 605) transitioning to the representation of the first avatar sticker (e.g., 625). Displaying an animation of the representation of the virtual avatar transitioning to the representation of the first avatar sticker provides feedback to a user of the computer system (e.g., 600 or 650) that a different avatar feature has been selected for editing. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, the transition is depicted as an animation in which the representation of the virtual avatar transitions to the representation of the first avatar sticker.

In some embodiments, the animation (e.g., 624) of the representation of the virtual avatar (e.g., 605) transitioning to the representation of the first avatar sticker (e.g., 625) includes adjusting a zoom level of the representation of the virtual avatar (e.g., zooming out) and, after adjusting the zoom level of the representation of the virtual avatar, displaying the representation of the first avatar sticker. Displaying the animation including adjusting a zoom level of the representation of the virtual avatar and then displaying the representation of the first avatar sticker provides feedback to a user of the computer system (e.g., 600 or 650) indicating that the avatar feature selected for editing is being emphasized or displayed in the representation of the first avatar sticker. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, the animation includes a crossfade effect where the representation of the virtual avatar gradually fades away while the representation of the first avatar sticker gradually fades into view.

In some embodiments, the animation (e.g., 624) of the representation of the virtual avatar (e.g., 605) transitioning to the representation of the first avatar sticker (e.g., 625) includes displaying facial features of the representation of the virtual avatar moving to the first pose shown in the representation of the first avatar sticker. Displaying facial features of the representation of the virtual avatar moving to the first pose shown in the representation of the first avatar sticker provides feedback to a user of the computer system (e.g., 600 or 650) indicating that the avatar feature selected for editing is being emphasized or displayed in the pose shown in the representation of the first avatar sticker. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the computer system (e.g., 600 or 650) displays, via the display generation component (e.g., 601 or 651), a messaging interface (e.g., 656) for a conversation between a first participant and a second participant, wherein the messaging interface includes a sticker display region (e.g., 656-3) that includes one or more avatar stickers (e.g., 658) in the set of stickers (e.g., the first avatar sticker and/or the second avatar sticker), wherein the avatar stickers are selectable to initiate a process to add a respective avatar sticker (e.g., 658-2) (e.g., a representation of the avatar sticker) to the conversation (e.g., 656-1). Displaying a messaging interface that includes a sticker display region that includes avatar stickers in the set of stickers provides additional controls for adding an avatar sticker to a conversation without cluttering the user interface with additional displayed controls. Providing additional control options without cluttering the user interface with additional displayed controls enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, the messaging interface includes a message display region (e.g., a region that includes a message that is received or transmitted by a participant of the conversation; a region that includes a message that is being composed for the conversation). In some embodiments, selecting a respective avatar sticker adds the avatar sticker to the message display region.

In some embodiments, the sticker display region 656-3 includes one or more stickers (e.g., 658-4, 658-5, or 658-6) from a second set of stickers based on the virtual avatar that includes one or more stickers that are different from stickers in the set of stickers that includes the first avatar sticker (e.g., 658-2) and the second avatar sticker (e.g., 658-1). In some embodiments, the second set of stickers are not accessible in the avatar editing interface. For example, such stickers can include stickers that do not include the portions of the virtual avatar that can be edited using the avatar editing interface (e.g., stickers that do not include avatar arms/hands/torso).

Note that details of the processes described above with respect to method 700 (e.g., FIG. 7) are also applicable in an analogous manner to the methods described below. For example, method 900 optionally includes one or more of the characteristics of the various methods described above with reference to method 700. For example, the display of an avatar sticker for editing can be used in combination with the avatar editing depicted in FIGS. 8A-8U and described with respect to method 900. For brevity, these details are not repeated.

FIGS. 8A-8U illustrate exemplary user interfaces for editing avatars, in accordance with some embodiments. The user interfaces in these figures are used to illustrate the processes described below, including the processes in FIG. 9.

FIG. 8A illustrates device 600 displaying editing interface 804 (similar to editing interface 604), which is an interface for editing an appearance of an avatar and/or avatar sticker. Editing interface 804 includes avatar 805 (similar to avatar 605). The appearance of avatar 805 is edited by selecting different avatar feature options from various avatar feature categories 806 (similar to feature categories 606). For example, in FIG. 8A, hairstyle category 806-1 is currently selected (as indicated by the centered and bolded appearance of "Hairstyle"), and hairstyle options 812 are displayed for modifying the hairstyle of avatar 805. Additionally, editing interface 804 includes color options 810 for selecting a hair color for avatar 805 and slider 814, which is adjustable to modify a selected color by moving tab 814-1 along track 814-2. In FIG. 8A, color option 810-1 is currently selected, and avatar hair 805-1 (and the hair of hairstyle options 812) has the color corresponding to selected color option 810-1.

In some embodiments, editing interface 804 includes tabs that are selectable to add and switch between the color options that are displayed for a respective avatar feature. In FIG. 8A, editing interface 804 includes hair tab 816 and highlights tab 818. Hair tab 816 is selected, as depicted in FIG. 8A by the enlarged and, optionally, bolded appearance of the tab. When hair tab 816 is selected, device 600 displays color options 810 for modifying the avatar hair color. Hair tab 816 includes text 816-1 indicating the feature that is modified by color options 810 and, in some embodiments, color indicator 816-2, which depicts the color that is currently selected for the avatar hair. Accordingly, in FIG. 8A, color indicator 816-2 is the same color as color option 810-1. Highlights tab 818 is shown having a shaded effect indicating that highlights are currently disabled for the avatar hair.

Highlights tab 818 can be selected to enable highlights for the avatar hair. For example, in FIG. 8A, device 600 detects input 820 on highlights tab 818 and, in response, replaces color options 810 with color options 822, as shown in FIG. 8B. Device 600 automatically selects a color option for the highlights, as indicated by selected color option 822-1. Accordingly, avatar hair 805-1 is modified to include highlights 805-2 having a color corresponding to selected color option 822-1. The selected highlight color is also applied to hairstyle options 812. Highlights tab 818 is modified to have a selected appearance, as indicated by the enlarged and bolded appearance of the tab. Additionally, the shading is removed from tab 818, revealing text 818-1, and color indicator 818-2 is displayed to indicate the current color that is selected for the highlights. Remove affordance 826 is displayed on highlights tab 826 and is selectable to remove the highlights from the avatar.

When highlights tab 818 is selected, device 600 displays highlight style options 824, which are selectable to change a highlighting style for the avatar's hair. In FIG. 8B, modern style 824-1 is currently selected. Device 600 detects input 828 selecting gradient style 824-2 and, in response, updates highlighting 805-2, and the highlighting depicted on hairstyle options 812, to the gradient style, as shown in FIG. 8C.

Figure 8D:
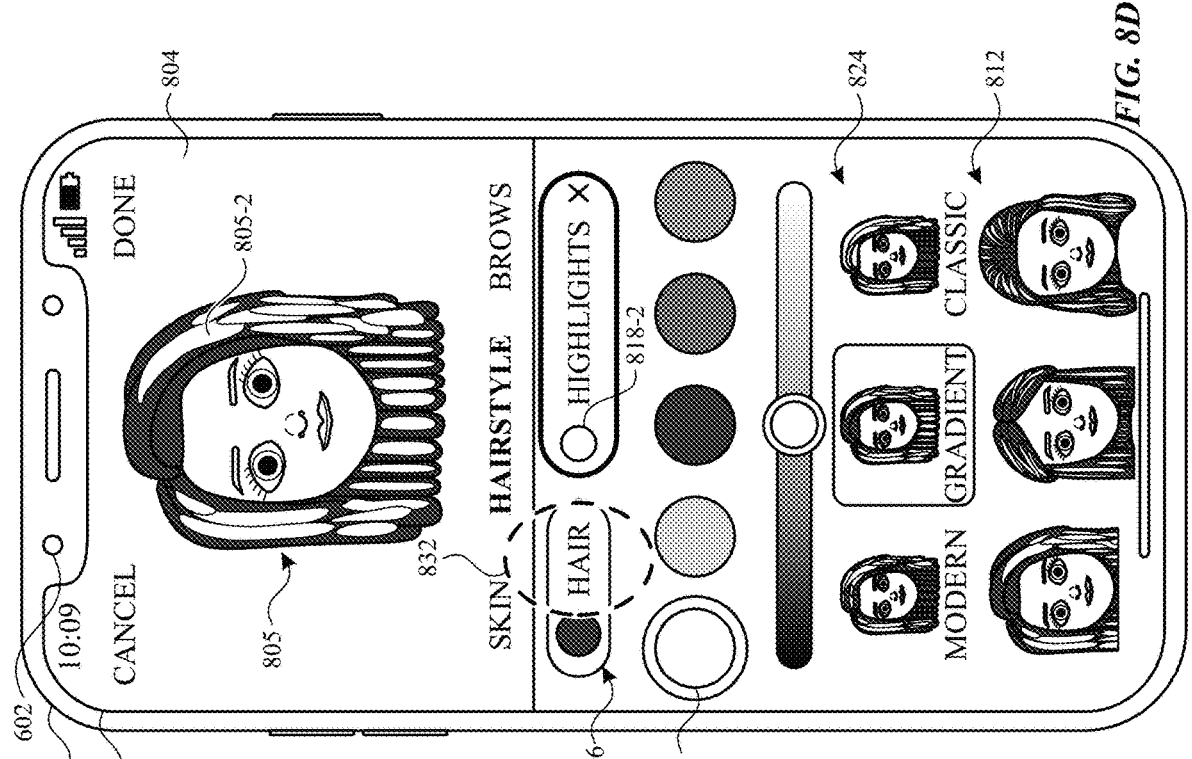
FIGS. 8A-8U illustrate exemplary user interfaces for editing avatars, in accordance with some embodiments.
Figure 8C:
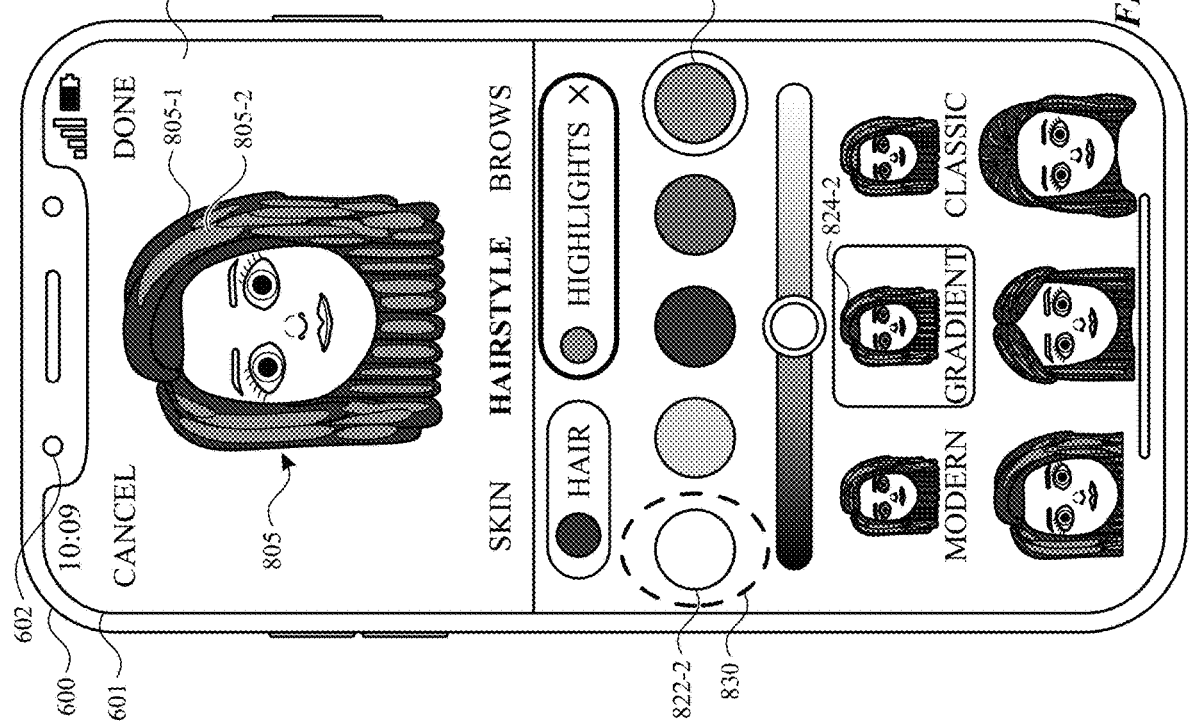

In FIG. 8C, device 600 detects input 830 selecting highlight color 822-2 and, in response, updates highlighting 805-2, color indicator 818-2, and the highlighting depicted in hairstyle options 812 and highlight style options 824, to the selected color of color option 822-2, as shown in FIG. 8D. Device 600 detects input 832 selecting hair tab 816 and, in response, updates editing interface 804 to display color options 810, as shown in FIG. 8E.

Figure 8E:
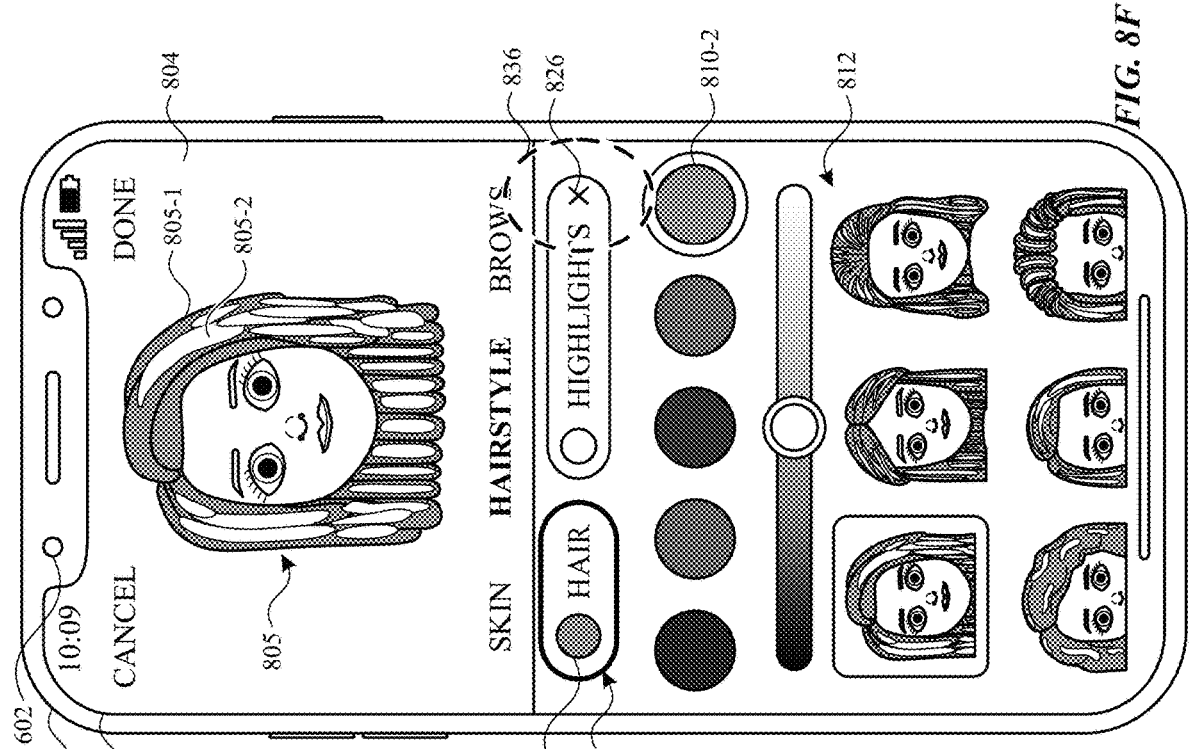
Figure 8F:
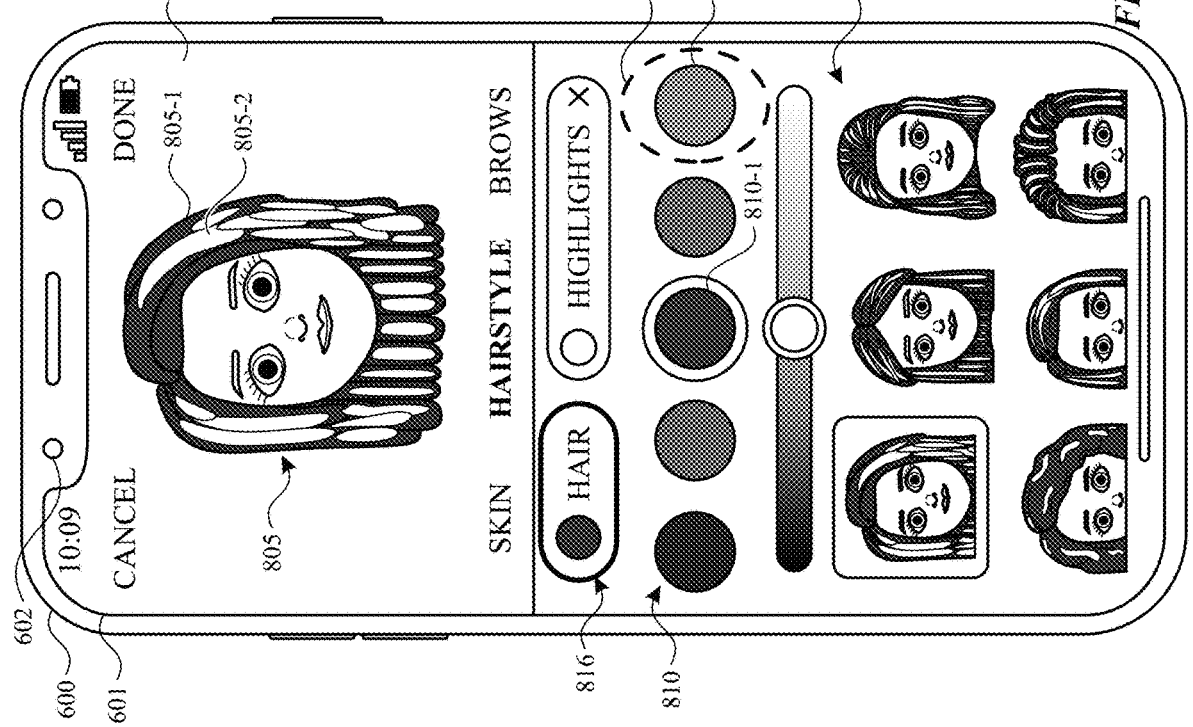
Figure 8G:
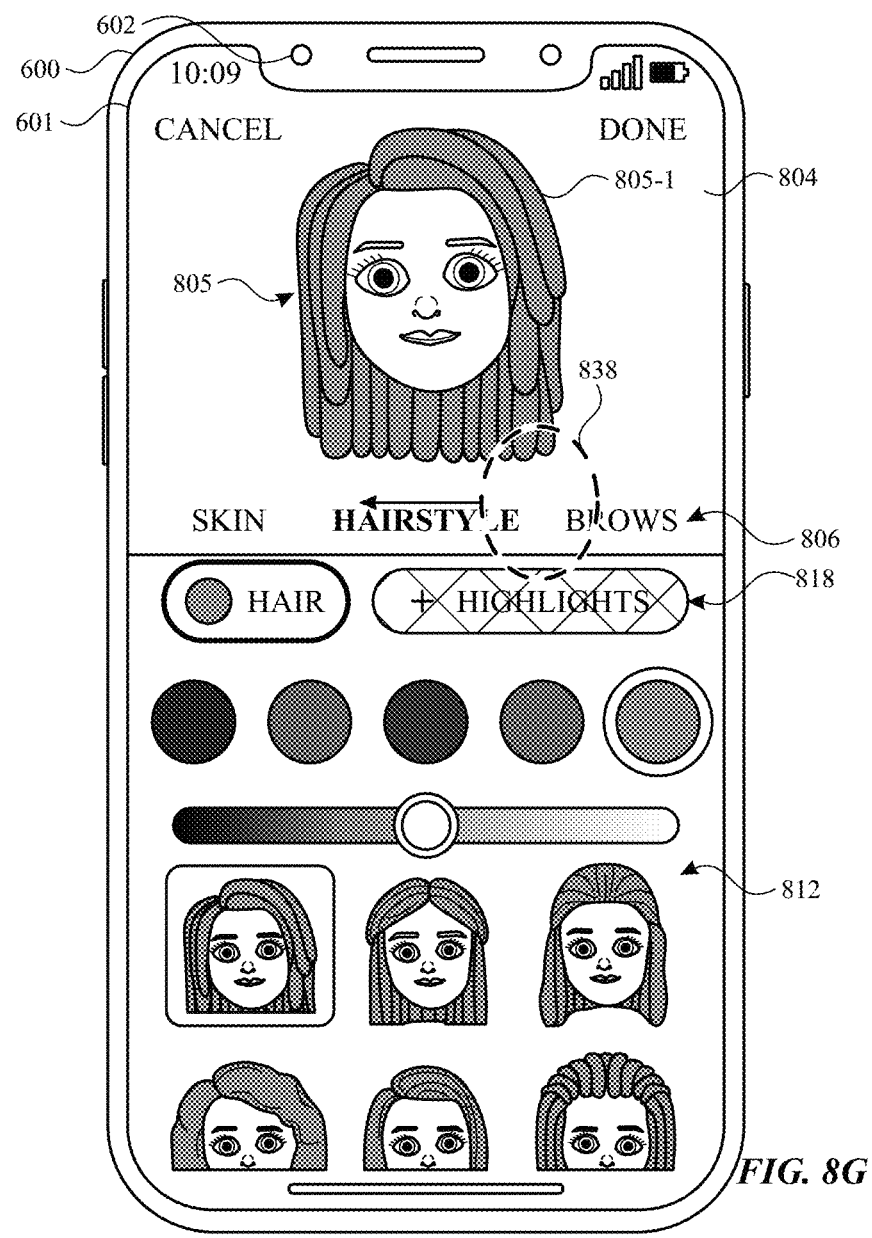

In FIG. 8E, device 600 detects input 834 selecting hair color option 810-2 and, in response, updates avatar hair 805-1, color indicator 816-2, and hairstyle options 812 to have the selected hair color option 810-2, while continuing to display the highlights, as shown in FIG. 8F. In FIG. 8F, device 600 detects input 836 to select remove affordance 826. In response, device 600 updates editing interface 804 by removing the highlights from avatar hair 805-1 and hairstyle options 812, and returning highlights tab 818 to the disabled state, as shown in FIG. 8G. Device 600 detects input 838 on feature categories 806 and, in response, changes to the avatar eyes category 806-2, as shown in FIG. 8H.

Figure 8H:
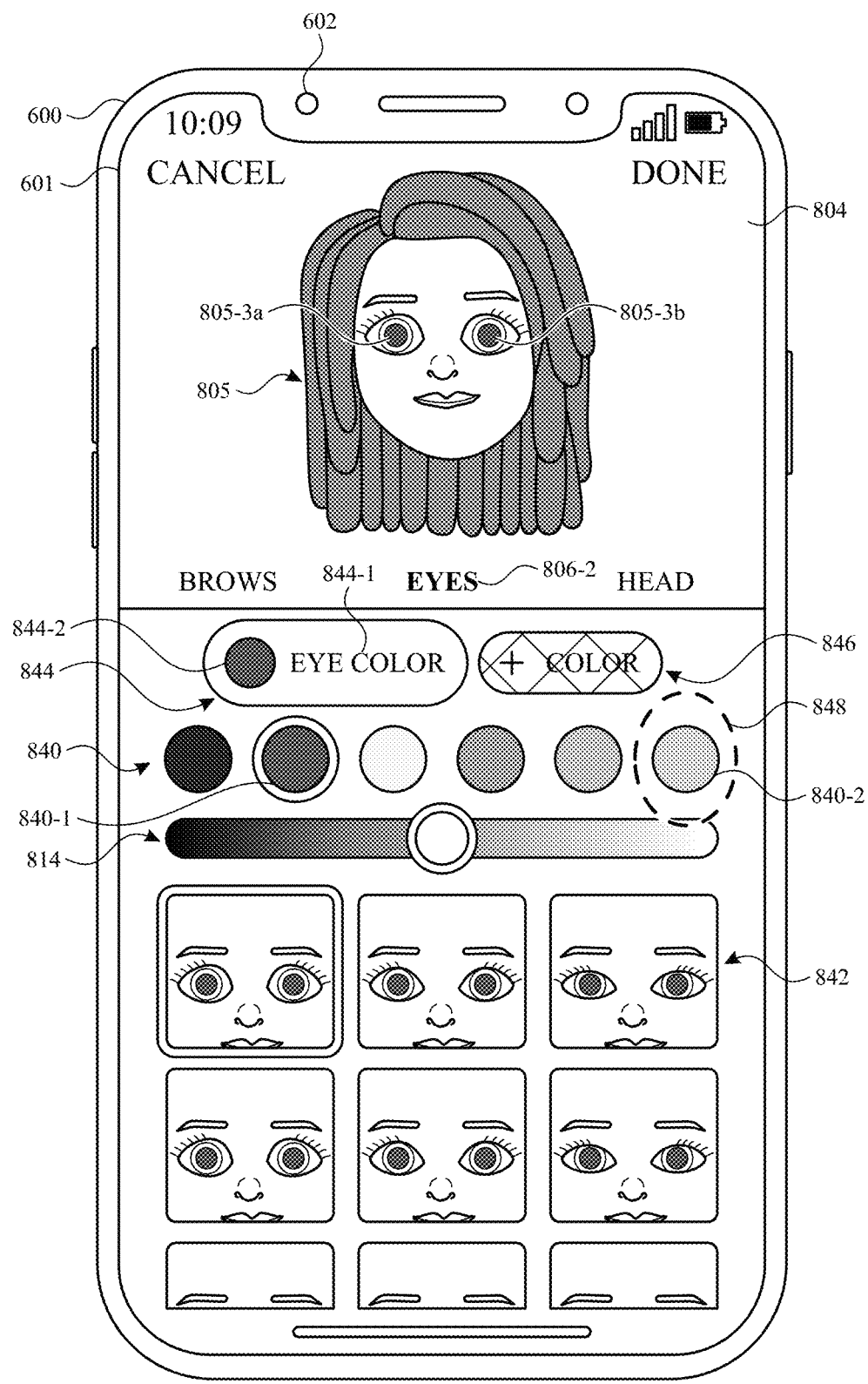
Figure 8I:
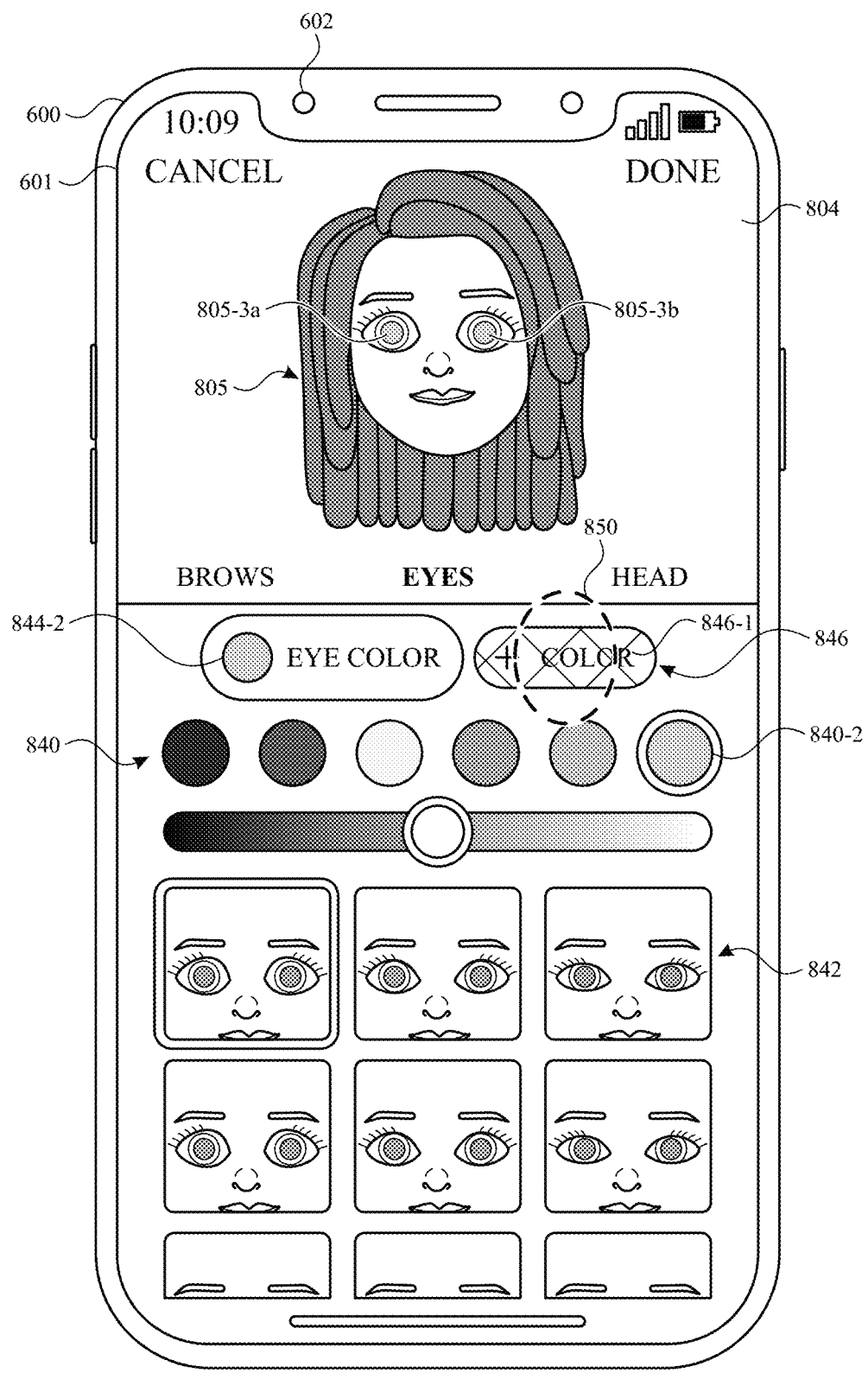

FIGS. 8H-8L illustrate example embodiments for selecting eye colors. In FIG. 8H, device 600 displays editing interface 804 having eye color options 840, eye style options 842, and eye color tabs 844 and 846. When tab 846 is disabled, tab 846 includes text 846-1 indicating that selection of tab 846 enables selection of a second eye color, and tab 844 includes text 844-1 indicating color options 840 are selectable to change the color of both avatar eyes 805-3a and 805-3b. Eye color 840-1 is currently selected for both avatar eyes, and shown in avatar eyes 805-3a and 805-3b, eye style options 842, and color indicator 844-2. Device 600 detects input 848 selecting eye color option 840-2 and, in response, updates the avatar eye color, as shown in FIG. 8I.

Figure 8J:
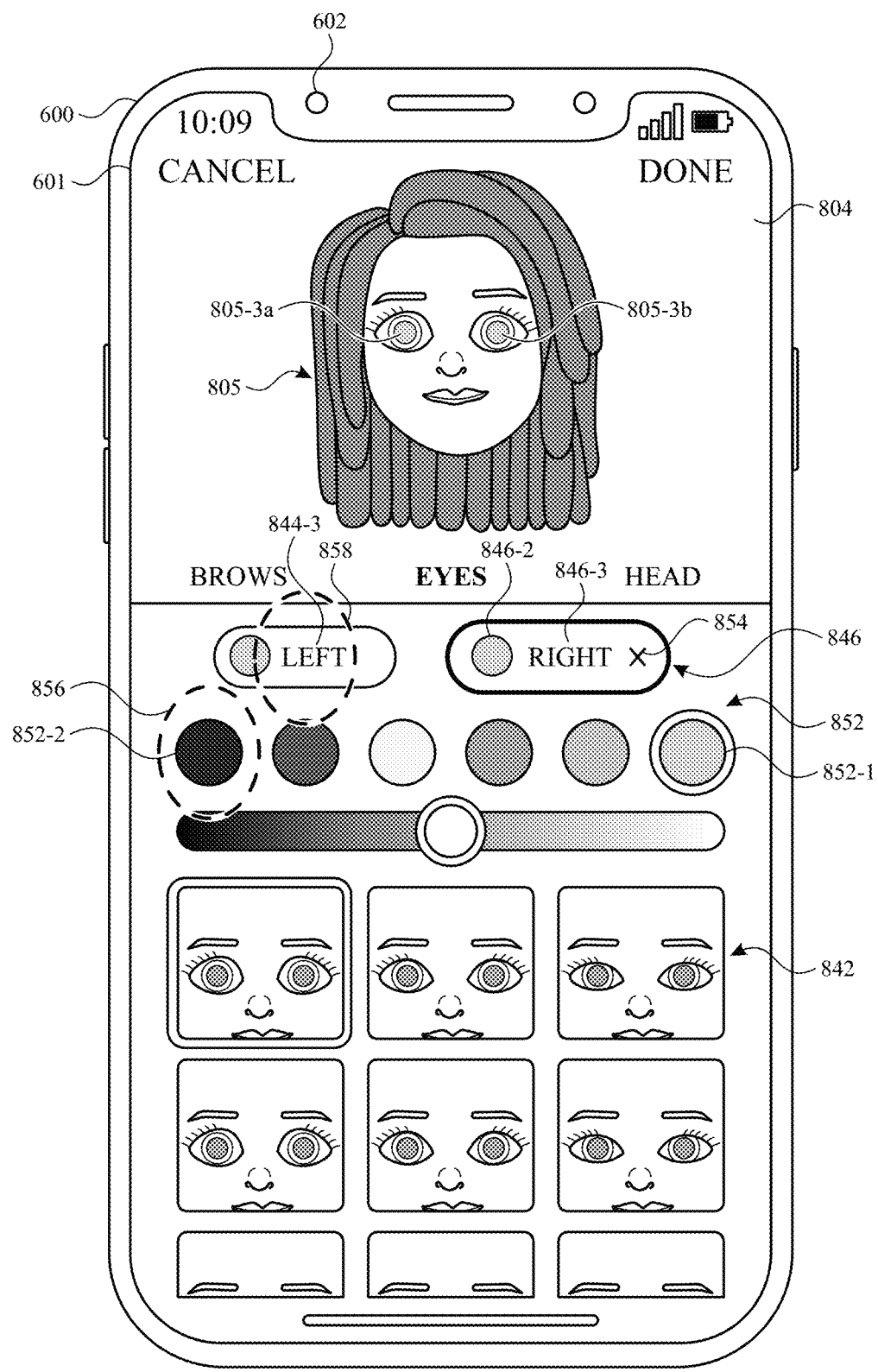

In FIG. 8I, device 600 detects input 850 selecting tab 846 and, in response, updates editing interface 804 to enable a mode where colors can be selected separately for respective avatar eyes 805-3a and 805-3b, as shown in FIG. 8J. Accordingly, tab 846 is updated to display color indicator 846-2 and text 846-3 indicating that color options 852 are selectable to choose a right eye color for right avatar eye 805-3a. Similarly, tab 844 is updated to display text 844-3 indicating that color options 840 are selectable to choose a left eye color for left avatar eye 805-3b when tab 844 is selected and separate eye colors are enabled. Tab 846 also includes remove affordance 854, which is selectable to remove the separate eye color for right avatar eye 805-3a, returning to the mode where a single eye color is selected for both avatar eyes together, similar to that shown in FIG. 8I. In FIG. 8J, device 600 detects input 856 on color option 852-2 to change the color of right avatar eye 805-3a and input 858 to select tab 844 and return to the color options for choosing a left eye color.

Figure 8K:
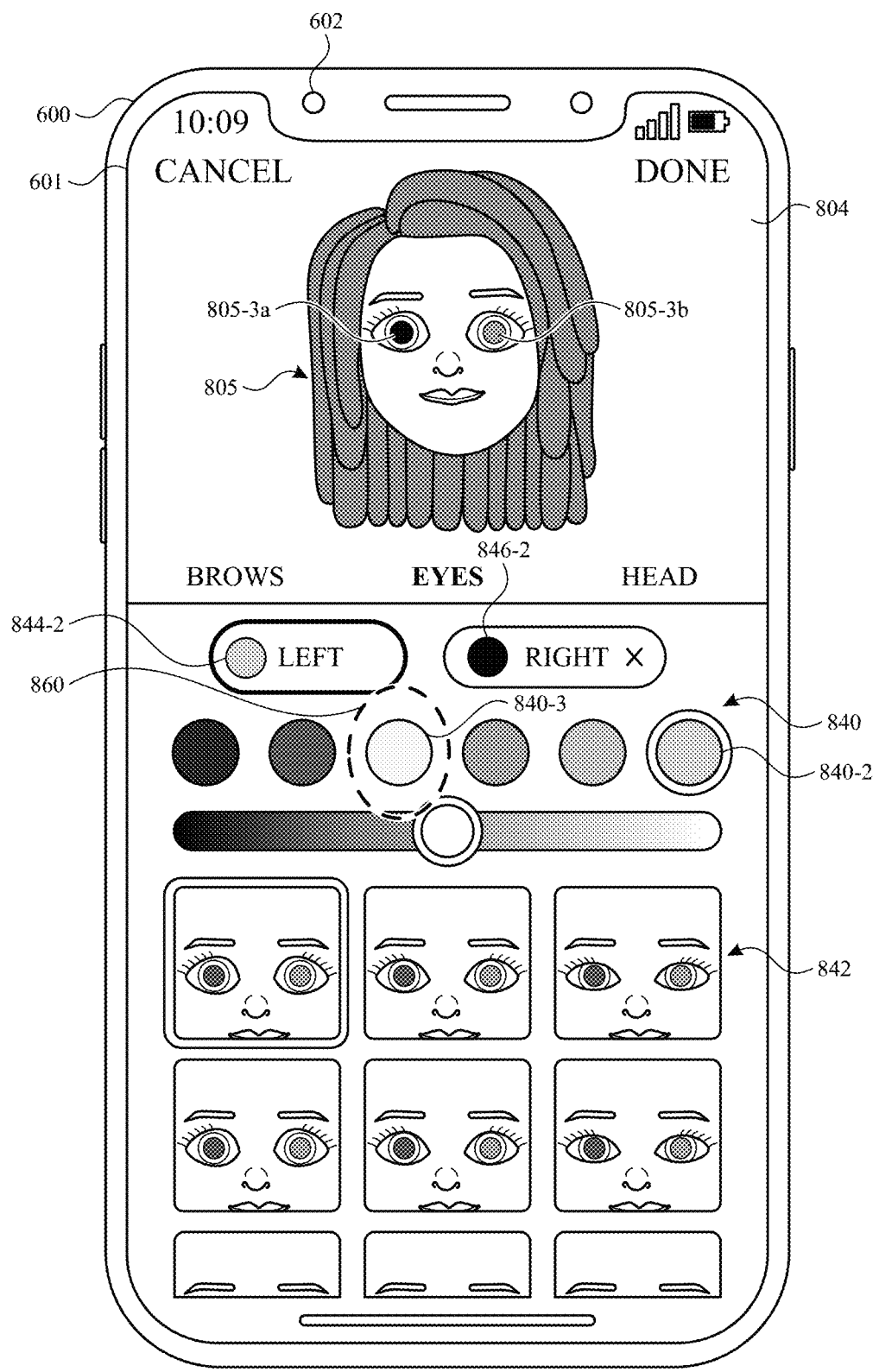
Figure 8L:
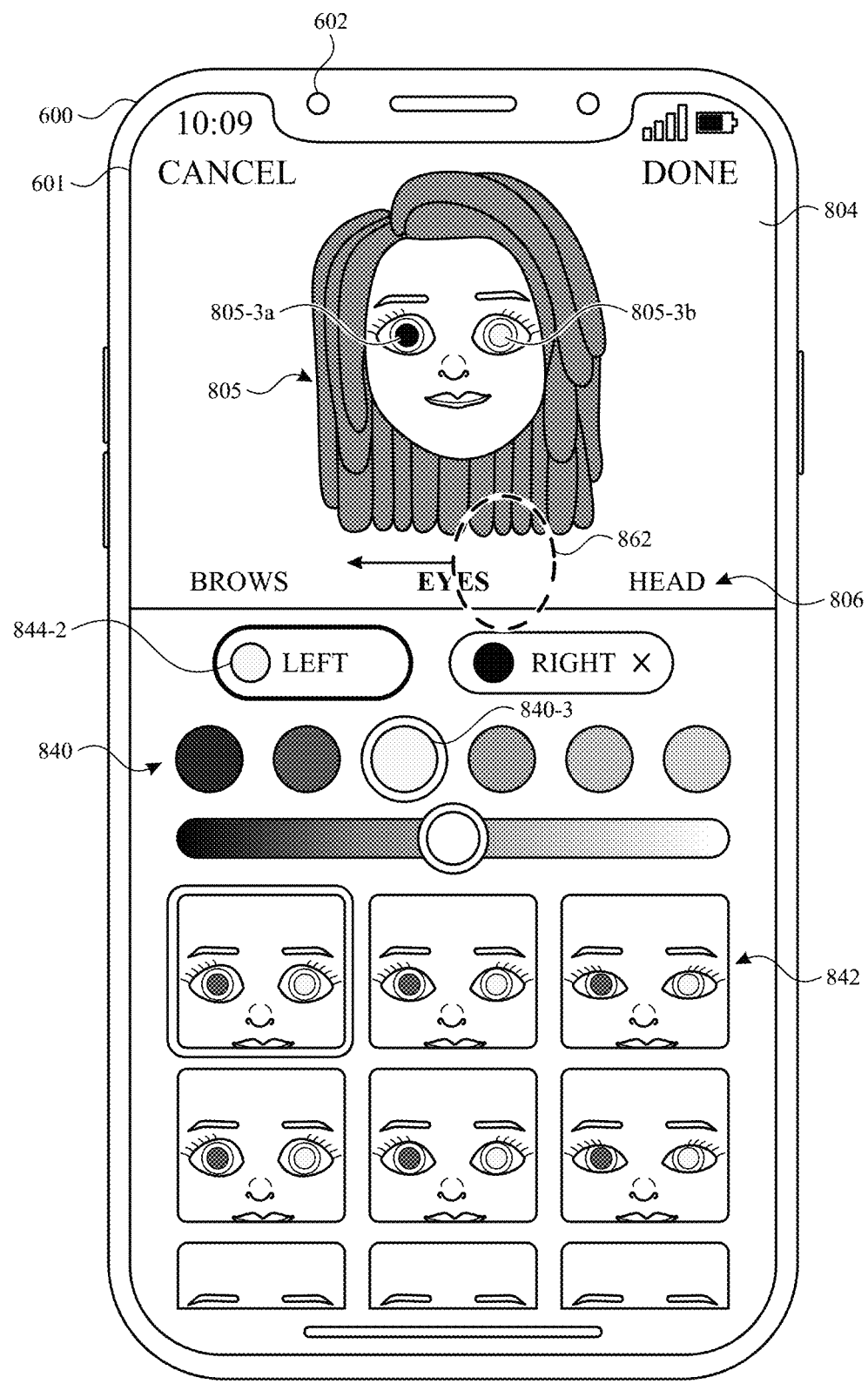

FIG. 8K illustrates editing interface 804 in response to inputs 856 and 858. Specifically, device 600 displays color options 840 (which are now selectable for choosing a left eye color), and displays right avatar eye 805-3a, color indicator 846-2, and the right avatar eyes in avatar eye style options 842 having the color corresponding to selected color option 852-2. Device 600 detects input 860 selecting color option 844-2 for left eye 805-3b. Accordingly, device 600 displays left avatar eye 805-3b, color indicator 844-2, and the left avatar eyes in avatar eye style options 842 having the color corresponding to selected color option 840-3, as shown in FIG. 8L. In FIG. 8L, device 600 detects input 862 on avatar feature categories 806 and, in response, changes to the avatar headwear category 806-3, as shown in FIG. 8M.

Figure 8M:
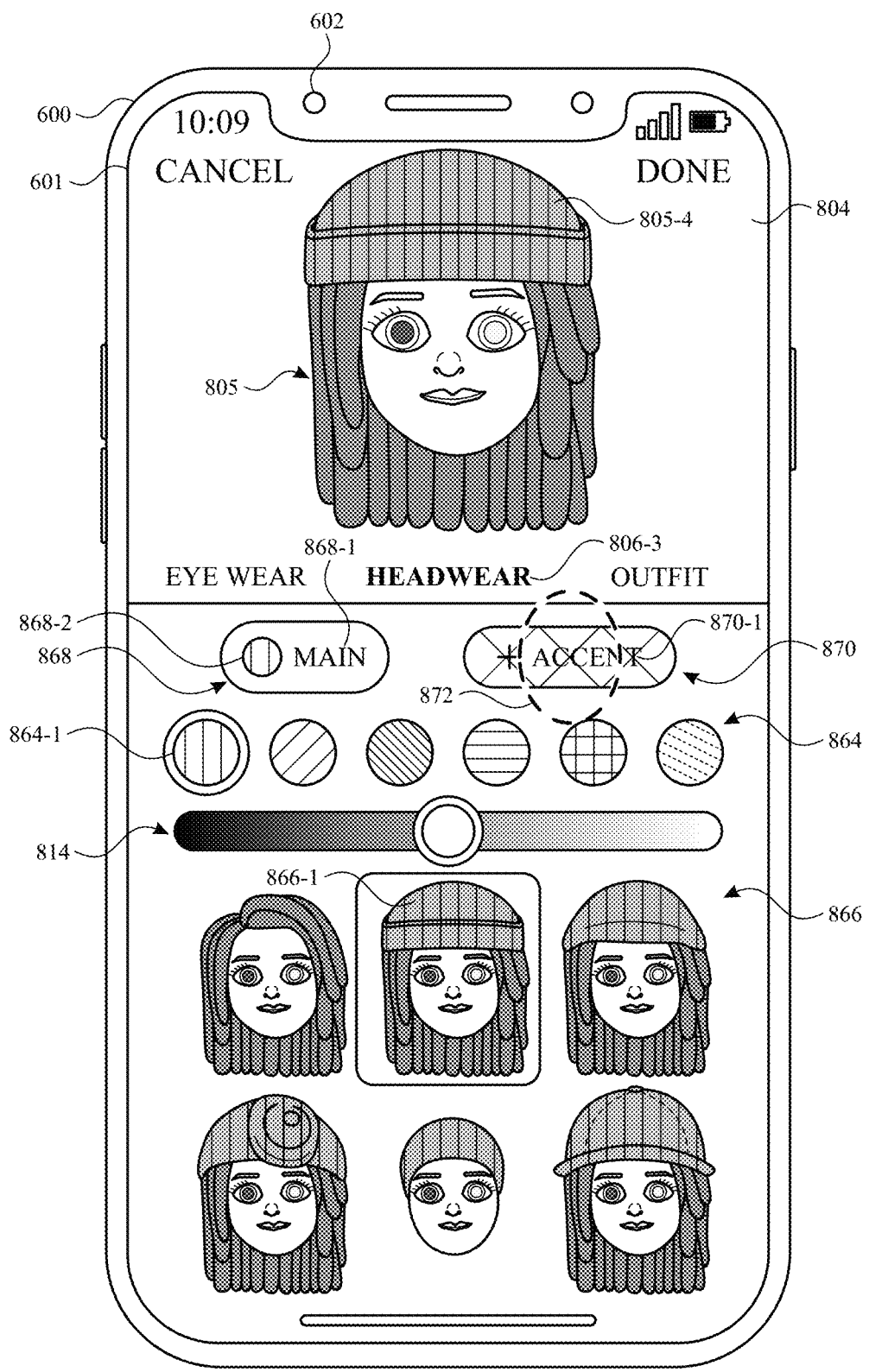
Figure 8N:
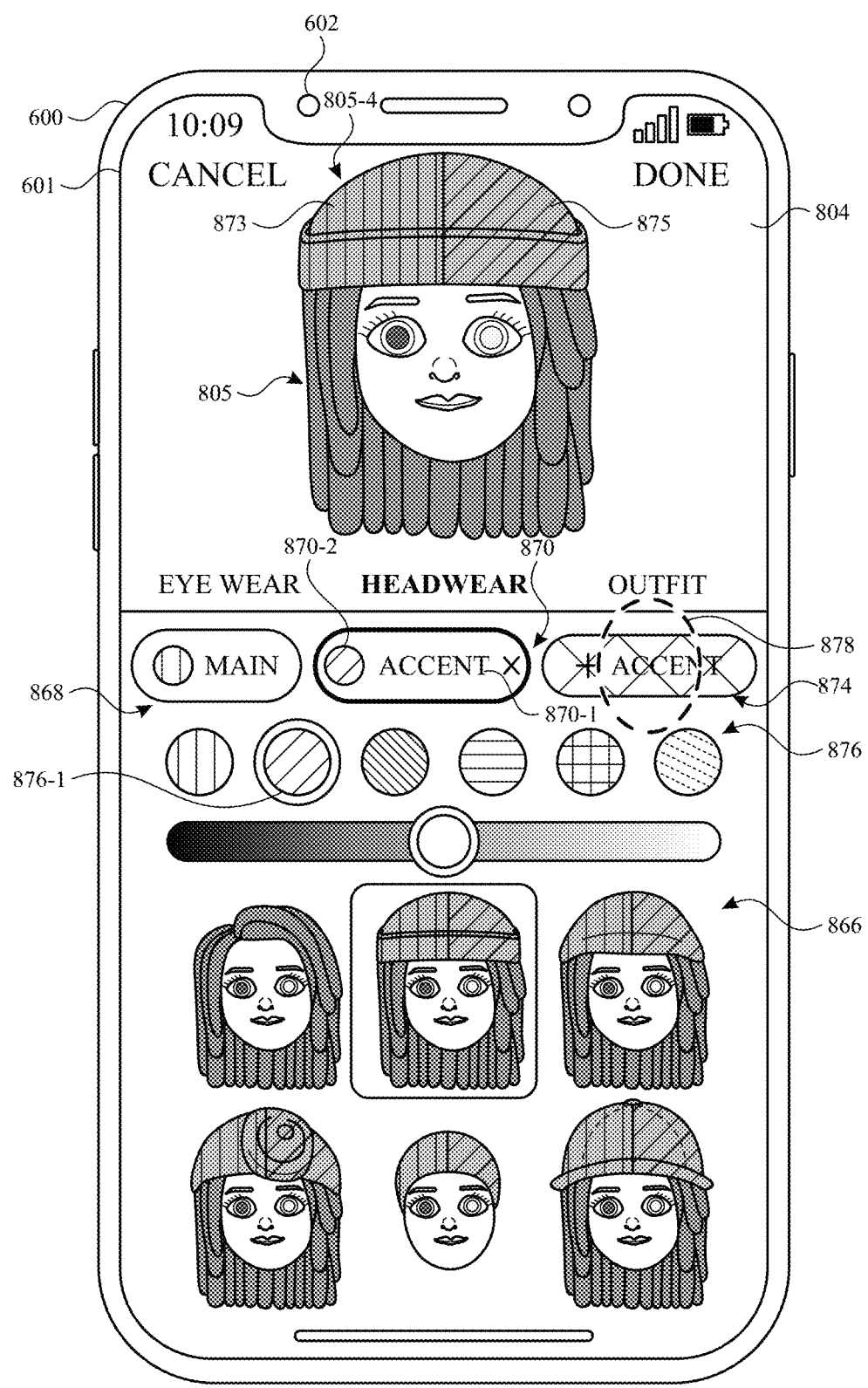
Figure 8O:
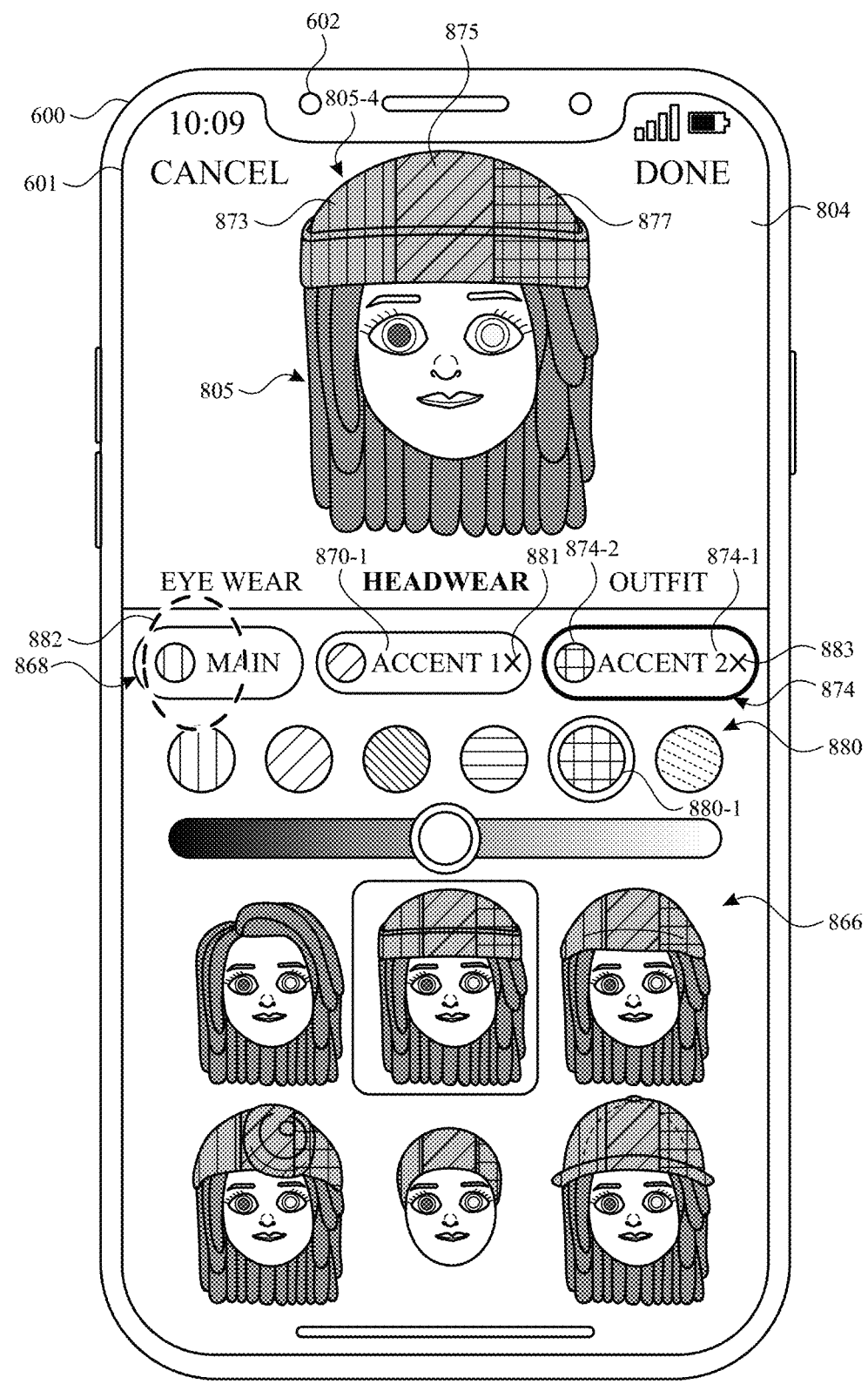
Figure 8P:
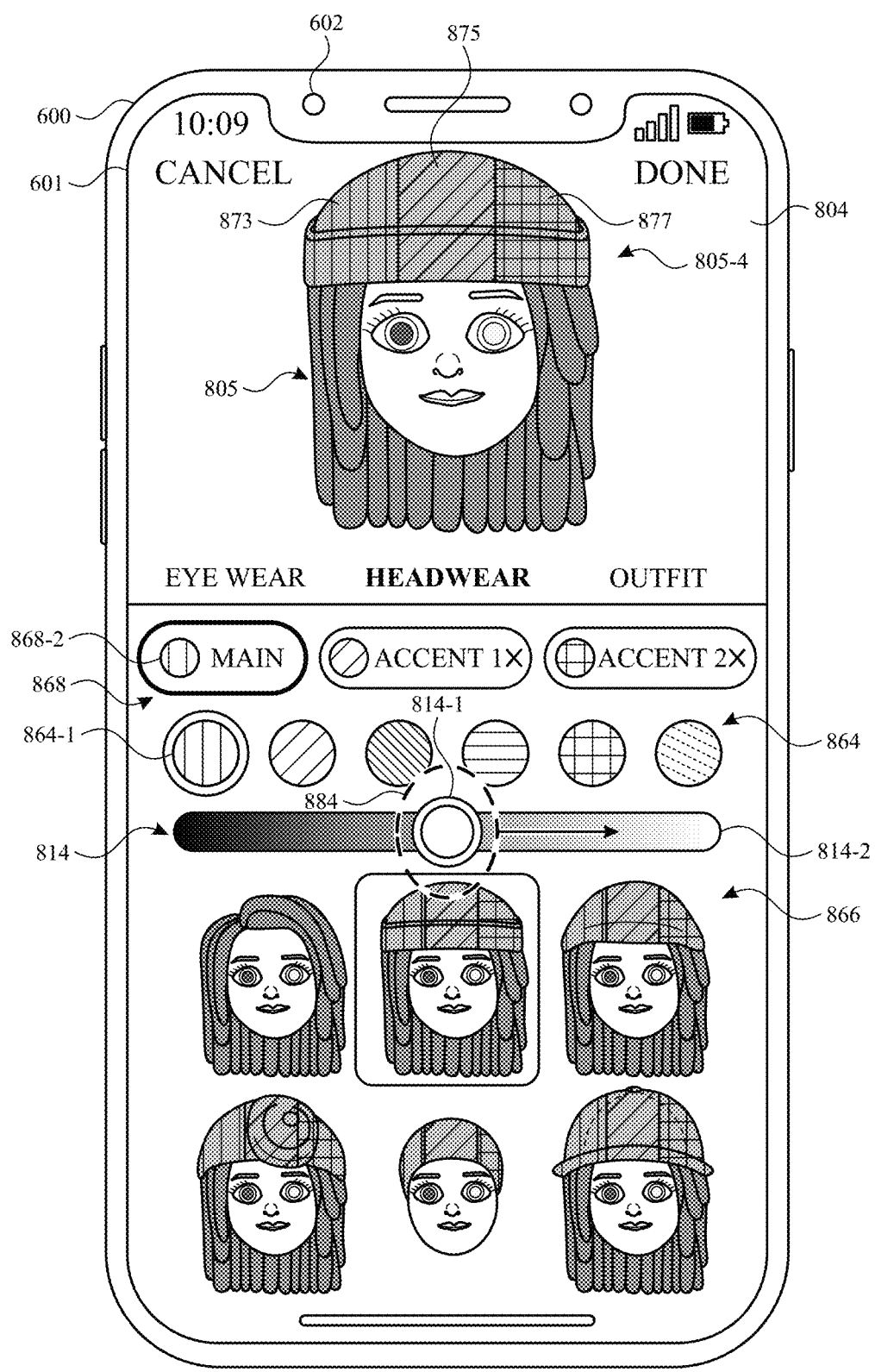
Figure 8Q:
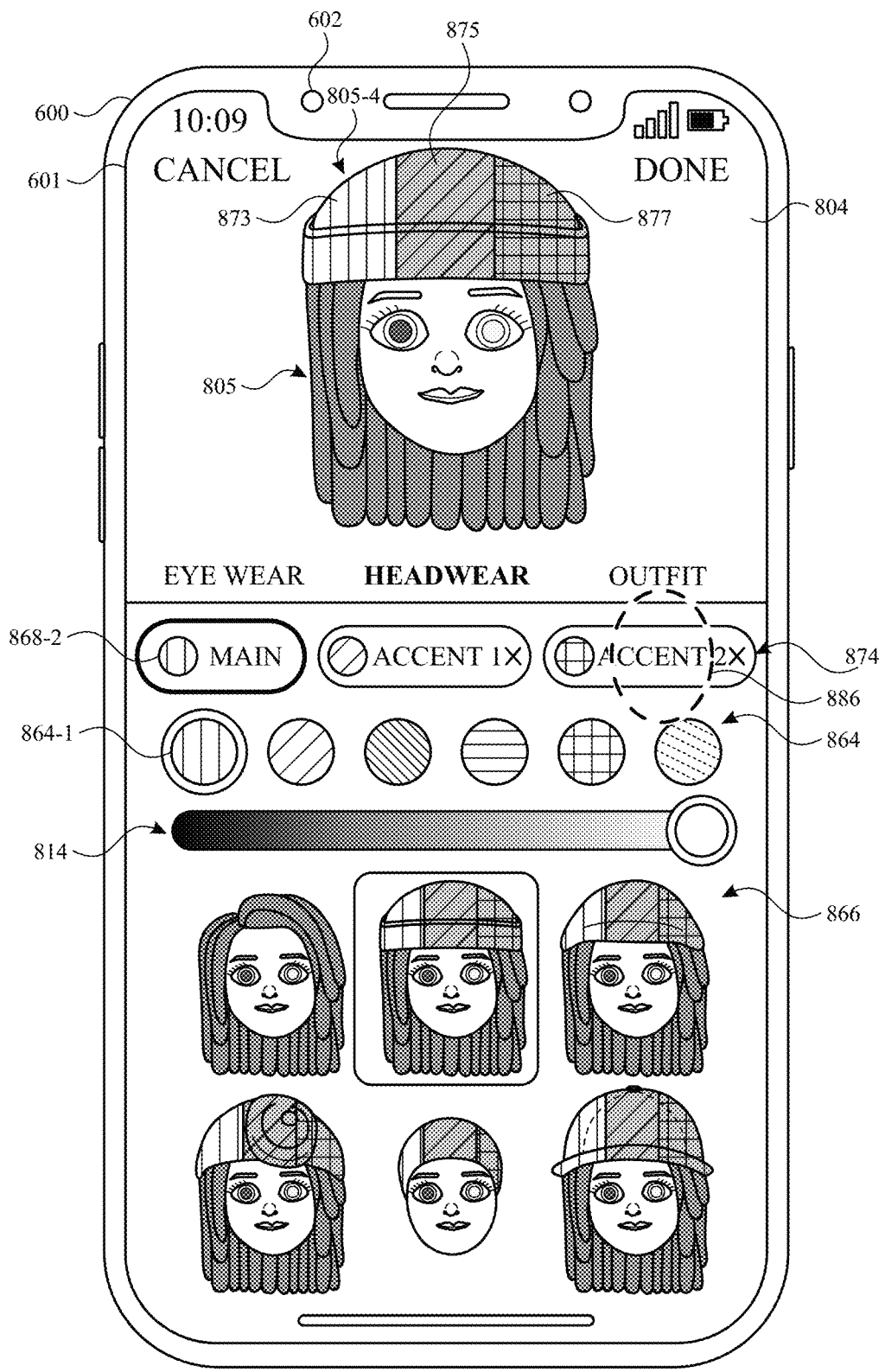
Figure 8R:
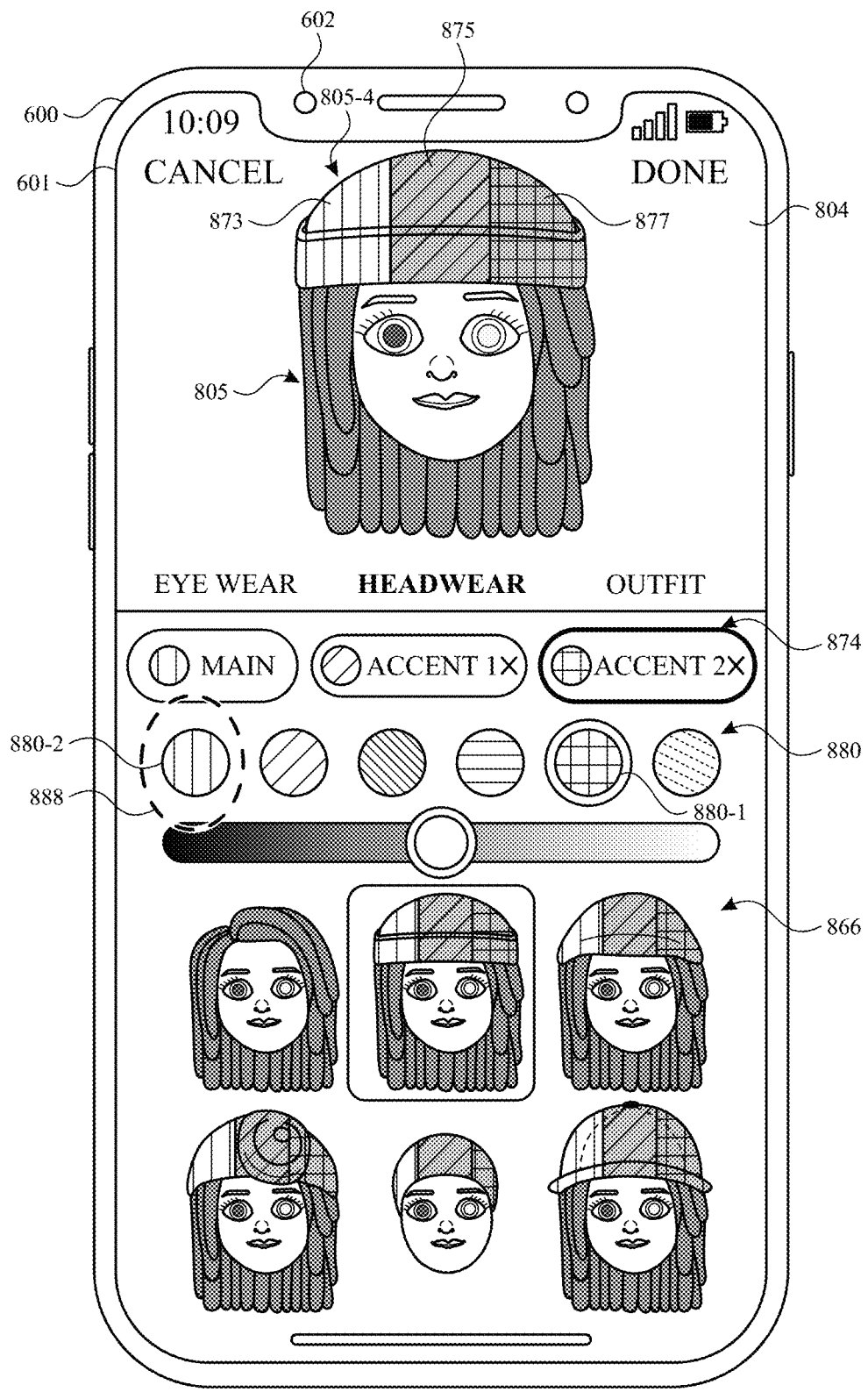
Figure 8S:
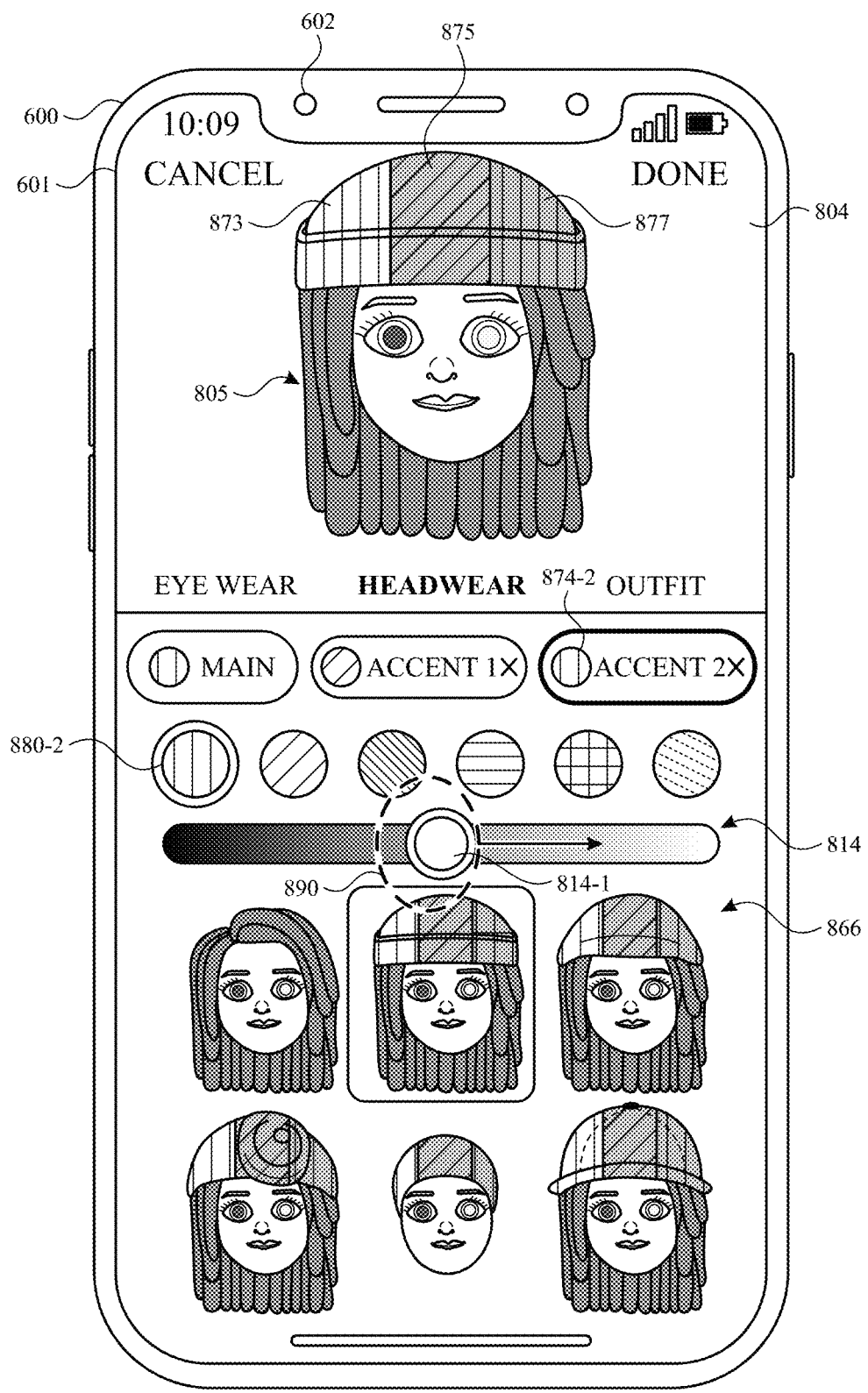
Figure 8T:
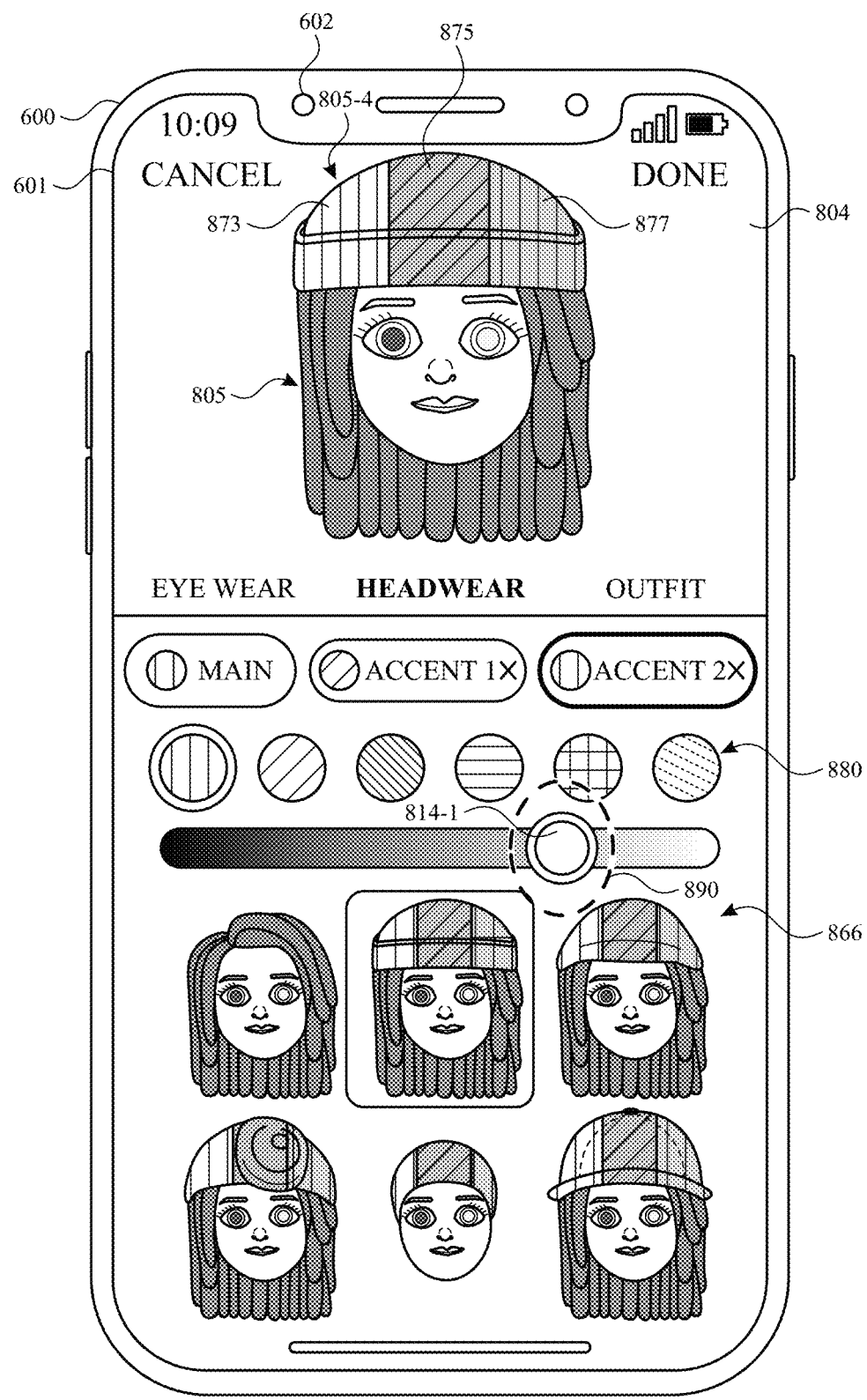
Figure 8U:
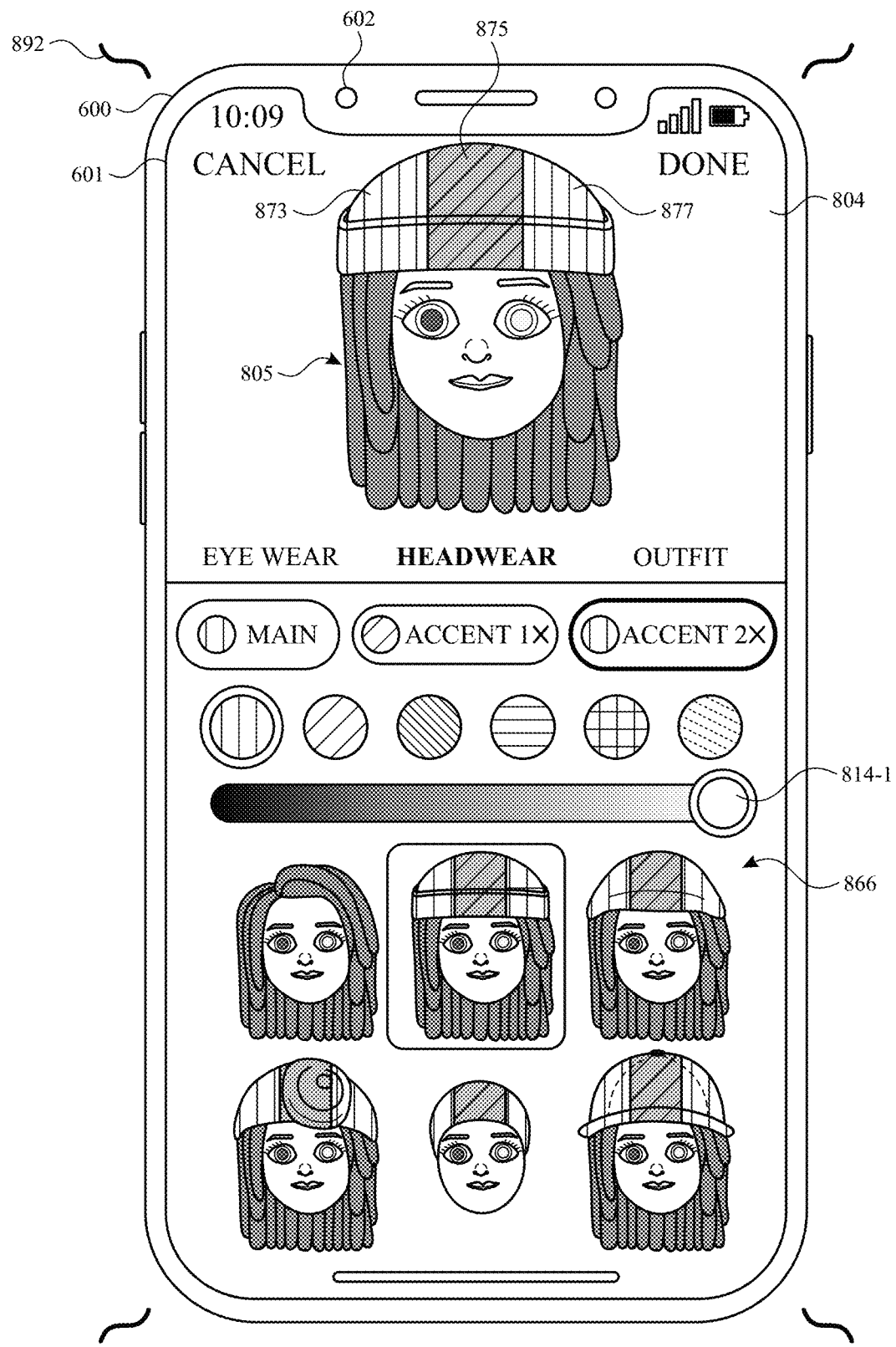

FIGS. 8M-8U illustrate example embodiments for selecting colors for avatar accessories. In FIG. 8M, headwear category 806-3 is selected, and editing interface 804 includes headwear color options 864, headwear options 866, and headwear color tabs 868 and 870. When tab 868 is selected, device 600 displays color options 864 for modifying a main color of the avatar headwear color. Tab 868 includes color indicator 868-2 and text 868-1 indicating that a main portion of the headwear is modified by the color options associated with tab 868. Tab 870 is currently disabled and includes text 870-1 indicating that tab 870 can be used to add a color to the avatar headwear. Headwear option 866-1 is selected, and avatar 805 is shown with hat 805-4 corresponding to headwear option 866-1. Because tab 868 is currently selected, color options 864 are selectable to choose a color of a selected headwear option (e.g., hat 805-4). Color option 864-1 is currently selected, and avatar hat 805-4, color indicator 868-2, and avatar headwear options 866 have a color corresponding to selected color option 864-1.

In FIG. 8M, device 600 detects input 872 on tab 870 to add a second color to hat 805-4, as shown in FIG. 8N. Device 600 updates editing interface 804 to display first accent color options 876, which are selectable to choose an accent color for the avatar headwear. Accent color option 876-1 is selected, and hat 805-4 is shown with main portion 873 having the main color option 864-1, and an accent portion 875 having accent color option 876-1. Headwear options 866 are updated similarly to include the two colors, and color indicator 870-2 is shown with the selected color on accent tab 870.

In some embodiments, when a color is added to an avatar feature, an additional option is displayed for adding a subsequent color to the avatar feature. For example, in FIG. 8N, after adding the second color to the avatar headwear, device 600 displays tab 874, which is selectable to add a third color to the avatar headwear. Tab 874 includes text 874-1 indicating that an additional accent color can be added using tab 874. Device 600 detects input 878 selecting tab 874 and, in response, adds a third color (e.g., a second accent color) to the avatar headwear, as shown in FIG. 8O.

In FIG. 8O, device 600 updates editing interface 804 to display second accent color options 880, with option 880-1 selected. Accordingly, device 600 displays avatar hat 805-4 updated to include second accent portion 877 (headwear options 866 are similarly updated to include a third color). Second accent portion 877, color indicator 874-2, and avatar headwear options 866 include a color corresponding to option 880-1, as shown in FIG. 8O. The text depicted on tabs 870 and 874 is updated based on the addition of a second accent color. Specifically, text 870-1 indicates that tab 870 corresponds to the first accent color, and text 874-1 indicates that tab 874 corresponds to the second accent color. Tab 870 includes remove affordance 881, which is selectable to remove the first accent color, and tab 874 includes remove affordance 883, which is selectable to remove the second accent color. Device 600 detects input 882 to select main color tab 868 and, in response, displays color options 864, which are selectable to choose the main color for the avatar headwear.

In some embodiments, slider 814 can be used to modify one or more visual characteristics of a selected color option such as shading, highlighting, brightness, tone, hue, contrast, or other visual characteristic. For example, in FIGS. 8P-8U, slider 814 is used to modify a shading of a selected color option. In FIG. 8P, device 600 detects input 884 dragging tab 814-1 to the far end of slider track 814-2 to reduce the shading of the color corresponding to main color option 864-1. In FIG. 8Q, main color portion 873 of avatar hat 805-4 is shown with no shading, and headwear options 866 are updated similarly. In some embodiments, adjusting the slider also adjusts the corresponding color option (e.g., 864-1) and color indicator (e.g., 868-2) displayed in editing interface 804. In FIG. 8Q, device 600 detects input 886 selecting second accent color tab 874 and, in response, displays color options 880, as shown in FIG. 8R.

In some embodiments, when adjusting a secondary color (e.g., first accent color or second accent color) using slider 814, the slider is biased to achieve a position along track 814-2 that matches the main accessory color. Thus, if the user places tab 814-1 within a threshold distance of a position on the track 814-2 that matches the main accessory color, device 600 automatically snaps the tab to the matching position so that the accessory color matches the main color, thereby allowing the user to easily and accurately match the accessory color to the main color. FIGS. 8R-8U demonstrate an example of such an embodiment.

In FIG. 8R, device 600 detects input 888 selecting second accessory color option 880-2, which is a same color as main color option 864-1. Device 600 updates editing interface 804 in response to the selection, as shown in FIG. 8S. Accordingly, main color portion 873 and second accent portion 877 are shown having the same color (as indicated by the same hatching patterns) in avatar hat 805-4 and headwear options 866. Device 600 detects input 890, which is a drag gesture moving tab 814-1 to the right, but not to the end of track 814-2, as shown in FIG. 8T. In FIG. 8T, input 890 is maintained, and device 600 updates the shading of the second accent color, as shown by second accent portion 877 having a light shading on hat 805-4 and headwear options 866. The user then releases the gesture at the position shown in FIG. 8T. If the location of tab 814-1 is not within a threshold distance of the corresponding shading position of the color of the main portion 873, then device 600 keeps tab 814-1 at the same location when the input is released. However, in the embodiment depicted in FIGS. 8T and 8U, the location of tab 814-1 is within the threshold distance of the position in track 814-2 that corresponds to the shading for the color of the main portion 873. Therefore, when input 890 is terminated while tab 814-1 is at the location shown in FIG. 8T, device 600 snaps tab 814-1 to the far end of track 814-2, which corresponds to the shading for the color of main portion 873, as shown in FIG. 8U. In some embodiments, device 600 generates haptic response 892, when tab 814-1 is snapped to a position (e.g., the end of track 814-2), as shown in FIG. 8U.

FIG. 9 is a flow diagram illustrating a method for editing avatars using a computer system in accordance with some embodiments. Method 900 is performed at a computer system (e.g., a smartphone, a tablet, a smartwatch) that is in communication with a display generation component (e.g., a display controller, a touch-sensitive display system) and one or more input devices (e.g., a touch-sensitive surface). Some operations in method 900 are, optionally, combined, the orders of some operations are, optionally, changed, and some operations are, optionally, omitted.

As described below, method 900 provides an intuitive way for editing avatars. The method reduces the cognitive burden on a user for editing avatars, thereby creating a more efficient human-machine interface. For battery-operated computing devices, enabling a user to edit avatars faster and more efficiently conserves power and increases the time between battery charges.

The computer system (e.g., 600 or 650) displays (902), via the display generation component (e.g., 601 or 651), an avatar editing interface (e.g., 804) (e.g., an interface for editing one or more features of an avatar character) that includes (e.g., concurrently displaying): (904) a representation of a virtual avatar (e.g., 805) (e.g., an avatar that can be customized and, optionally, created by a user of the computer system) (e.g., a live preview of a virtual avatar that tracks movement of a face of a user), wherein the representation of the virtual avatar includes a first avatar feature (e.g., 805-1, 805-3, or 805-4) and the first avatar feature includes a first color (e.g., 810-1, 840-1, or 864-1) (and, optionally does not include a second color) (e.g., an avatar hairstyle feature; an avatar outfit feature (e.g., a shirt); an avatar arms feature; a headwear feature; an avatar eyes feature); (906) a first graphical interface object (e.g., 818, 846, or 870) (e.g., an "add color" affordance) that is selectable to initiate a process for modifying an appearance of the first avatar feature to include a second color (e.g., to add a second color that is displayed with the first color; a color different from the first color); and (908) a plurality of selectable options (e.g., 812, 842, or 866) (e.g., different hairstyle options; different outfit options; different arm options; different headwear options; different eye color options) for modifying a characteristic of the first avatar feature (e.g., the selectable options each represent a value of the characteristic such as a first outfit option, a second outfit option, a third outfit option, etc.), wherein the plurality of selectable options includes respective representations of the first avatar feature and the first avatar feature includes the first color (e.g., each avatar outfit option includes a representation of the first avatar feature (e.g., the avatar outfit or shirt) having the first color).

While displaying the avatar editing interface, the computer system (e.g., 600 or 650) detects (910), via the one or more input devices (e.g., 601; 602; 651; or 652), an input (e.g., 820, 850, or 872) directed to the first graphical interface object (e.g., 818, 846, or 870). In response to detecting the input (e.g., 820, 850, or 872) directed to the first graphical interface object (e.g., 818, 846, or 870), the computer system (e.g., 600; 650) updates (912) display of the avatar editing interface (e.g., 804), including: displaying (914) an updated representation of the virtual avatar (e.g., 805). The updated representation of the virtual avatar includes the first avatar feature (e.g., 805-1, 805-3, or 805-4) and the first avatar feature includes the first color (e.g., 810-1, 840-1, or 864-1) and the second color (e.g., 822-1, 852-1, or 876-1) (e.g., the avatar is updated so that the first avatar feature (e.g., an outfit or shirt) has the first color and the second color). In response to detecting the input directed to the first graphical interface object, the computer system displays (916) an updated plurality of selectable options (e.g., 812 in FIG. 8B, 842 in FIG. 8J, or 866 in FIG. 8N). The updated plurality of selectable options includes respective updated representations of the first avatar feature and the first avatar feature includes the first color and the second color (e.g., for each avatar outfit option, the representation of the first avatar feature (e.g., the avatar outfit or shirt) is updated to have the first color and the second color). In response to detecting the input directed to the first graphical interface object, the computer system displays (918) controls (e.g., 822, 852, or 876) (e.g., a set of different color options for selecting the second color) for modifying the second color that were not displayed prior to detecting the input (e.g., replacing display of a first set of color options for selecting the first color with a second set of color options for selecting the second color). Displaying controls for modifying the second color that were not displayed prior to detecting the input provides additional control options without cluttering the user interface with additional displayed controls until they are desired and avoids accidental inputs while the additional control options are not displayed. Providing additional control options without cluttering the user interface with additional displayed controls and avoiding accidental inputs enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the second color (e.g., 822-1, 852-1, or 876-1) is selected (e.g., automatically; without further input from a user of the computer system) from a set of color options (e.g., 822, 852, or 876) (e.g., color options that can be selected via the controls for modifying the second color) in response to detecting the input (e.g., 820, 850, or 872) directed to the first graphical interface object (e.g., 818, 846, or 870). Selecting the second color from a set of color options in response to detecting the input directed to the first graphical interface object automatically applies the second color to the representation of the virtual avatar and the plurality of selectable options without requiring additional user input. Performing an operation automatically when a set of conditions has been met reduces the number of inputs at the computer system (e.g., 600; 650), enhances the operability of the computer system, and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, updating display of the avatar editing interface (e.g., 804) includes displaying a second graphical interface object (e.g., 874) (e.g., a second "add color" affordance) that is selectable to initiate a process for modifying the appearance of the first avatar feature (e.g., 805-4) to include a third color (e.g., 880-1) (e.g., to add a third color that is displayed with the first and second colors). Displaying a second graphical interface object that is selectable to initiate a process for modifying the appearance of the first avatar feature to include a third color provides additional control options for adding a color to the first avatar feature without cluttering the user interface with additional displayed controls until they are desired and avoids accidental inputs while the additional control options are not displayed. Providing additional control options without cluttering the user interface with additional displayed controls and avoiding accidental inputs enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, after updating display of the avatar editing interface (e.g., 804) (e.g., after modifying an appearance of the first avatar feature to include the second color), the avatar editing interface includes a first selectable object (e.g., 868) (e.g., a primary color tab (e.g., a "main" color tab)) associated with a first portion (e.g., 873) of the first avatar feature (e.g., 805-4) (e.g., a crown portion of an avatar hat) and a second selectable object (e.g., 870 or 874) (e.g., a secondary color tab (e.g., an "accent" color tab)) associated with a second portion (e.g., 875) of the first avatar feature (e.g., a brim portion of an avatar hat). In some embodiments, the computer system (e.g., 600, 650) receives a set of one or more inputs (e.g., 882, 884, 886, 888, or 890) that includes a selection (e.g., 884, 888, or 890) of a fourth color (e.g., from a second set of colors). In some embodiments, the one or more inputs includes a selection of the first selectable object and/or the second selectable object. In some embodiments, selectable options corresponding to the second set of colors are displayed as part of the controls for modifying the second color. In some embodiments, selectable options corresponding to the second set of colors are displayed as at least a portion of controls for modifying the first color. In response to receiving the set of one or more inputs that includes a selection of the fourth color, displaying the first avatar feature (e.g., 805-4) having the fourth color (e.g., 864-1 or 880-2), including: in accordance with a determination that the first selectable object (e.g., 868) is in a selected state (e.g., the first selectable object is highlighted, bolded, outlined, or otherwise visually emphasized relative to the second selectable object) when the fourth color is selected, displaying the first portion of the avatar feature having the fourth color (e.g., portion 873 of 805-4 has the color of 864-1 in FIG. 8Q) (e.g., changing a color of the first portion of the avatar feature to the fourth color) (in some embodiments, forgoing changing a color of the second portion of the avatar feature (e.g., continue displaying the second portion of the avatar feature having a previously selected color (e.g., the second color))); and in accordance with a determination that the second selectable object is (e.g., 874) in a selected state (e.g., the second selectable object is highlighted, bolded, outlined, or otherwise visually emphasized relative to the first selectable object) when the fourth color is selected, displaying the second portion of the avatar feature having the fourth color (e.g., portion 877 of 805-4 has the color of 880-2 in FIG. 8S) (e.g., changing a color of the second portion of the avatar feature to the fourth color) (in some embodiments, forgoing changing a color of the first portion of the avatar feature (e.g., continue displaying the first portion of the avatar feature having a previously selected color (e.g., the first color))). Displaying the first portion of the avatar feature having the fourth color when the first selectable object is in a selected state when the fourth color is selected, and displaying the second portion of the avatar feature having the fourth color when the second selectable object is in a selected state when the fourth color is selected provides an enhanced control scheme for adjusting the colors of the avatar features that provides additional control options for applying the fourth color to the first or second portion of the first avatar feature without cluttering the user interface with additional controls that, when displayed, cause the plurality of selectable options to move off-screen thereby preventing the user from viewing the changes to the avatar features depicted in the plurality of selectable options while adjusting the color. Providing additional control options without cluttering the user interface with additional displayed controls enhances the operability of the computer system (e.g., 600 or 650) and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, one of the first or second selectable object is in a selected state by default (and the other selectable object is in an unselected or deselected state). In some embodiments, the first or second selectable object transitions to a selected state (e.g., is selected) in response to an input directed to the respective selectable object (when the respective selectable object is currently in an unselected (e.g., deselected) state). In some embodiments, selecting the first selectable object de-selects the second selectable object, and vice versa.

In some embodiments, displaying the plurality of selectable options (e.g., 812, 842, or 866) includes displaying the plurality of selectable options at a first location (e.g., a location shown in FIG. 8H or a location shown in FIG. 8M) with respect to the display generation component (e.g., 601 or 651) (e.g., a position that corresponds to a location on the display generation component). Displaying the updated plurality of selectable options includes displaying the updated plurality of selectable options in a first region of the user interface (e.g., at the first location with respect to the display generation component). After updating display of the avatar editing interface (e.g., 804) (e.g., after modifying an appearance of the first avatar feature to include the second color), the computer system (e.g., 600 or 651) receives a set of one or more inputs (e.g., 848, 856, 860) (e.g., while displaying the plurality of selectable options at the first location; while displaying the updated plurality of selectable options at the first location). In response to receiving the set of one or more inputs, the computer system updates the representation of the virtual avatar (e.g., 805), including: in accordance with a determination that the set of one or more inputs includes an input (e.g., 860) corresponding to a request to change the first color of the first avatar feature, changing the first color of the first avatar feature while displaying the plurality of selectable options in the first region of the user interface (e.g., avatar eye 805-3*b* changes to color 844-2 in FIG. 8L) (in some embodiments, the plurality of selectable options (e.g., different hairstyle options; different outfit options; different arm options; different headwear options; different eye color options) remain displayed at a fixed location as the user selects/changes the first color of the avatar feature.); and in accordance with a determination that the set of one or more inputs includes an input (e.g., 856) corresponding to a request to change the second color of the first avatar feature, changing the second color of the first avatar feature while displaying the updated plurality of selectable options in the first region of the user interface (e.g., avatar eye 805-3*a* changes to color 852-2 in FIG. 8K, and eye style options 842 remain displayed at the same location). Changing the first color of the first avatar feature while displaying the plurality of selectable options at the first region of the user interface, and changing the second color of the first avatar feature while displaying the updated plurality of selectable options at the first region of the user interface provides feedback to a user of the computer system (e.g., 600 or 650) illustrating the changes in the colors of the first avatar feature, while maintaining a fixed position of the selectable options that show the changed colors so that user can more easily observe the changes in the colors. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, the updated plurality of selectable options (e.g., different hairstyle options; different outfit options; different arm options; different headwear options; different eye color options) remain displayed at a fixed location as the user selects/changes the second color of the avatar feature.

In some embodiments, displaying the controls for modifying the second color that were not displayed prior to detecting the input includes displaying an option (e.g., 826, 854, 881, or 883) that is selectable to initiate a process for removing the second color (e.g., a highlights color) from the first avatar feature (e.g., 805-1, 805-3, or 805-4) (e.g., avatar hair). In some embodiments, the option that is selectable to initiate a process for removing the second color from the first avatar feature is displayed while the first avatar feature (e.g., 805-1, 805-3, or 805-4) includes the second color (e.g., while the second color is applied for the first avatar feature). Displaying an option that is selectable to initiate a process for removing the second color from the first avatar feature while the first avatar feature includes the second color provides additional control options for removing the second color without cluttering the user interface with additional displayed controls until they are desired and avoids accidental inputs while the additional control options are not displayed. Providing additional control options without cluttering the user interface with additional displayed controls and avoiding accidental inputs enhances the operability of the computer system (e.g., 600 or 650) and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, in response to detecting an input directed to the option, the computer system removes the second color from the first avatar feature and updates display of the avatar editing interface, including: displaying the representation of the virtual avatar including the first avatar feature without the second color (and with the first color); displaying the plurality of selectable options including respective representations of the first avatar feature without the second color (and with the first color); and displaying controls for modifying the first color (and ceasing displaying controls for modifying the second color). In some embodiments, the option to remove the second color is displayed for some avatar features and not for others. For example, in some embodiments, an option is displayed to remove a color for a portion of the avatar's body (e.g., an avatar hair highlight color, eye color, and/or skin color), but is not displayed to remove a color for an accessory of the avatar (e.g., an article of clothing such as a hat, shirt, and/or eye glasses).

In some embodiments, the first avatar feature is an accessory (e.g., 805-4) of the virtual avatar (e.g., 805) (e.g., an article of clothing such as a hat, shirt, glasses, and the like). In some embodiments, the first avatar feature is a portion of a body (e.g., 805-1, 805-3) of the virtual avatar (e.g., a portion of the avatar's body such as the avatar's eyes, hair, and the like).

In some embodiments, displaying the avatar editing interface (e.g., 804) including the first graphical interface object (e.g., 818, 846, or 870) includes: in accordance with a determination that the first avatar feature is a first type of avatar feature (e.g., 805-1) (e.g., avatar hair), the first graphical interface object includes first text (e.g., 818-1) that is based on the first type of avatar feature (e.g., having text that reads "highlights") (e.g., having text that indicates how the second color will be applied to the first avatar feature or indicating which portion of the first avatar feature will receive the second color); and in accordance with a determination that the first avatar feature is a second type of avatar feature (e.g., 805-4) different from the first type of avatar feature (e.g., avatar clothing), the first graphical interface object includes second text (e.g., 870-1) different from the first text and based on the second type of avatar feature (e.g., having text that reads "accent") (e.g., having text that indicates how the second color will be applied to the first avatar feature or indicating which portion of the first avatar feature will receive the second color). Displaying the first graphical interface object including first text that is based on a first type of avatar feature when the first avatar feature is the first type, and displaying the first graphical interface object including second text that is different from the first text and based on a second type of avatar feature when the first avatar feature is the second type, provides feedback to a user of the computer system (e.g., 600 or 650) about the functionality of the controls associated with the first graphical interface object, depending on the type of the first avatar feature. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, the text that is displayed on the first graphical interface object changes depending on which avatar feature is being modified to add the second color. For example, when the first avatar feature is avatar hair, the text reads "highlights". As another example, when the first avatar feature is avatar clothing, the text reads "accent." As yet another example, when the first avatar feature is avatar eyes, the text reads "color."

In some embodiments, prior to detecting the input directed to the first graphical interface object (e.g., 818, 846, or 870): the avatar editing interface (e.g., 804) includes controls (e.g., 844) (e.g., an eye color tab) for modifying the first color; and the controls for modifying the first color include third text (e.g., 844-1) (e.g., "eye color"); and updating display of the avatar editing interface includes displaying the controls for modifying the first color having fourth text different from the third text (e.g., 844-3) (e.g., "left"). Displaying the controls for modifying the first color having fourth text different from the third text provides feedback to a user of the computer system (e.g., 600 or 650) about the functionality of the controls for modifying the first color after the second color has been added to the first avatar feature. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, the first graphical interface object includes fifth text (e.g. "+color") prior to the computer system detecting the input directed to the first graphical interface object. In some embodiments, updating display of the avatar editing interface includes displaying the first graphical interface object having sixth text, different from the fifth text (e.g., "right").

In some embodiments, the first avatar feature includes avatar hair (e.g., 805-4). In some embodiments, displaying the controls for modifying the second color that were not displayed prior to detecting the input includes displaying one or more avatar hair highlight style options (e.g., 824) (and, optionally, a slider for adjusting a gradient of the avatar hair highlight color, wherein the highlight style options are displayed adjacent (e.g., below and/or above) the slider) that are selectable to change an avatar hair highlight style (e.g., an avatar hair highlight style that is displayed in a plurality of avatar hairstyle options) from a first highlight style (e.g., 824-1) (e.g., a default style or a user-customized style) to a second highlight style (e.g., 824-2) (e.g., a predefined style), different from the first style. Displaying one or more avatar hair highlight style options provides additional control options for changing an avatar hair highlight style without cluttering the user interface with additional displayed controls until an input is detected and avoids accidental inputs while the additional control options are not displayed. In some embodiments, the method includes: while a first avatar hair highlight style option is selected and a plurality of avatar hairstyle options are displayed having the first highlight style and the second color, detecting a selection of a second avatar hair highlight style option; and in response to detecting the selection of the second avatar hair highlight style option, modifying the plurality of avatar hairstyle options from having the first highlight style and the second color to having the second highlight style and the second color. In some embodiments, the avatar hair highlight style options correspond to predefined highlight styles (hair length, curly, straight, etc.) that a user would otherwise have to provide one or more input additional inputs directed to one or more additional controls and/or options to create.

In some embodiments, displaying the one or more avatar hair highlight style options (e.g., 824) includes: displaying a first representation of the virtual avatar having the second color and a first hair highlight style corresponding to a first avatar hair highlight style option of the one or more avatar hair highlight style options (e.g., 824-1) (e.g., a preview of the avatar having the first hair highlight style and the second color); and displaying a second representation of the virtual avatar having the second color and a second hair highlight style corresponding to a second avatar hair highlight style option of the one or more avatar hair highlight style options (e.g., 824-2) (e.g., a preview of the avatar having the second hair highlight style and the second color).

In some embodiments, displaying one or more avatar hair highlight style options (e.g., 824) includes: displaying an indication of the first hair highlight style (e.g., 824-1) (e.g., text or a label describing the highlight style (e.g., modem, classic, and/or gradient)); and displaying an indication of the second hair highlight style (e.g., 824-1) (e.g., text or a label describing the highlight style (e.g., modern, classic, and/or gradient)).

In some embodiments, displaying the controls for modifying the second color that were not displayed prior to detecting the input includes displaying a color slider (e.g., 814) having a selectable element (e.g., 814-1) that is adjustable to modify the second color (e.g., 880-2). In some embodiments, the computer system (e.g., 600; 650) receives an input (e.g., 890) corresponding to a request to adjust the selectable element to a first position on the color slider (e.g., a position shown in FIG. 8T) (e.g., an input moving the selectable element to a first position on the color slider for modifying the second color). In response to receiving the input corresponding to a request to adjust the selectable element to the first position on the color slider, the computer system performs the following items. In accordance with a determination that a first set of criteria is met (e.g., the first position is within a threshold distance from a color value on the color slider that matches the first color), the computer system adjusts the selectable element to a second position on the color slider (e.g., a far right position on track 814-2, shown in FIG. 8U), different from the first position and corresponding to the first color (e.g., snapping the selectable element to a color value on the color slider that matches the first color, and updating the second color to have the first color) (e.g., and, optionally, generating a tactile and/or audio output). In accordance with a determination that the first set of criteria is not met (e.g., the first position is not within a threshold distance from a color value on the color slider that matches the first color), the computer system adjusts the selectable element to the first position on the color slider (e.g., moving the selectable element to a color value that corresponds to the first position on the color slider, and updating the second color to have the color value that corresponds to the first position on the color slider). Adjusting the selectable element to the second position on the color slider, different from the first position and corresponding to the first color, in accordance with a determination that the first set of criteria is met, allows a user to easily and conveniently select a second color that matches the first color without having to match the colors using a trial-and-error method. Performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Note that details of the processes described above with respect to method 900 (e.g., FIG. 9) are also applicable in an analogous manner to the methods described above. For example, method 700 optionally includes one or more of the characteristics of the various methods described above with reference to method 900. For example, the color editing features can be used to edit an avatar sticker. For brevity, these details are not repeated.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to display and/or edit an avatar. The present disclosure contemplates that in some instances, this gathered data may include personal information data that uniquely identifies or can be used to contact or locate a specific person. Such personal information data can include demographic data, location-based data, telephone numbers, email addresses, social network IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver avatars having a particular appearance or features that are of greater interest to the user. Accordingly, use of such personal information data enables users to have calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, avatar content can be selected and delivered to users by inferring preferences based on non-personal information data or a bare minimum amount of personal information, such as the content being requested by the device associated with a user, other non-personal information available to the device, or publicly available information.

What is claimed is:

1. A computer system that is in communication with a display generation component and one or more input devices, comprising:
   one or more processors; and
   memory storing one or more programs configured to be executed by the one or more processors, the one or more programs including instructions for:
      displaying, via the display generation component, an avatar editing interface that includes:
         a representation of a virtual avatar having a plurality of avatar features, wherein the virtual avatar is associated with a set of stickers including a first avatar sticker that shows the virtual avatar in a first pose and a second avatar sticker that shows the virtual avatar in a second pose different from the first pose; and
         a first set of one or more graphical interface objects that are selectable for modifying a first avatar feature of the plurality of avatar features that are visible in the representation of the virtual avatar;
      while displaying the avatar editing interface including the representation of the virtual avatar, detecting, via the one or more input devices, an input corresponding to a request to display editing options for a second avatar feature of the plurality of avatar features; and
      in response to detecting the input, updating display of the avatar editing interface, including:
         displaying a representation of the first avatar sticker having an appearance that includes the second avatar feature and is based on an appearance of the virtual avatar; and
         displaying a second set of one or more graphical interface objects that are selectable for modifying one or more of the avatar features that are visible in the first avatar sticker.

2. The computer system of claim 1, wherein:
   the first avatar sticker that shows the virtual avatar in the first pose includes a first portion of the virtual avatar that is not visible in the representation of the virtual avatar displayed in the avatar editing interface; and
   the second avatar sticker that shows the virtual avatar in the second pose includes a second portion of the virtual avatar that is not visible in the representation of the virtual avatar displayed in the avatar editing interface.

3. The computer system of claim 1, the one or more programs further including instructions for:
   while displaying the representation of the first avatar sticker, detecting, via the one or more input devices, a second input; and
   in response to detecting the second input, displaying a representation of the second avatar sticker having an appearance that includes the second avatar feature and is based on an appearance of the virtual avatar.

4. The computer system of claim 3, the one or more programs further including instructions for:
   while displaying the representation of the second avatar sticker having a first appearance, detecting, via the one or more input devices, a set of one or more inputs that includes an input corresponding to a request to change an appearance of the virtual avatar; and
   in response to detecting the set of one or more inputs, displaying the representation of the second avatar sticker having a second appearance different from the first appearance and based on the request to change the appearance of the virtual avatar.

5. The computer system of claim 1, the one or more programs further including instructions for:
while displaying the avatar editing interface including the representation of the virtual avatar:
detecting, via the one or more input devices, an input corresponding to a request to display editing options for a third avatar feature of the plurality of avatar features; and
in response to detecting the input corresponding to the request to display editing options for the third avatar feature of the plurality of avatar features, displaying a third set of one or more graphical interface objects that are selectable for modifying the third avatar feature.

6. The computer system of claim 1, the one or more programs further including instructions for:
while displaying the avatar editing interface including the representation of the first avatar sticker:
detecting, via the one or more input devices, an input corresponding to a request to display editing options for a fourth avatar feature of the plurality of avatar features; and
in response to detecting the input corresponding to the request to display editing options for the fourth avatar feature of the plurality of avatar features, displaying a fourth set of one or more graphical interface objects that are selectable for modifying the fourth avatar feature.

7. The computer system of claim 1, the one or more programs further including instructions for:
while displaying the avatar editing interface including the representation of the virtual avatar having a first appearance of the first avatar feature, detecting, via the one or more input devices, a selection of one of the graphical interface objects in the first set of one or more graphical interface objects; and
in response to detecting the selection of one of the graphical interface objects in the first set of one or more graphical interface objects, displaying the representation of the virtual avatar having a second appearance of the first avatar feature that is different from the first appearance and based on the selected graphical interface object in the first set of one or more graphical interface objects.

8. The computer system of claim 1, the one or more programs further including instructions for:
while displaying the avatar editing interface including the representation of the first avatar sticker having a first appearance of the second avatar feature, detecting, via the one or more input devices, a selection of one of the graphical interface objects in the second set of one or more graphical interface objects; and
in response to detecting the selection, displaying the representation of the first avatar sticker having a second appearance of the second avatar feature that is different from the first appearance and based on the selected graphical interface object in the second set of one or more graphical interface objects.

9. The computer system of claim 8, wherein the second avatar feature includes avatar clothing.

10. The computer system of claim 8, wherein the second avatar feature includes avatar arms.

11. The computer system of claim 1, wherein displaying the avatar editing interface that includes the representation of the virtual avatar includes displaying an animation of the representation of the virtual avatar.

12. The computer system of claim 11, wherein the animation of the representation of the virtual avatar is based on a face that is detected by one or more cameras associated with the computer system.

13. The computer system of claim 1, wherein the representation of the first avatar sticker is static.

14. The computer system of claim 1, wherein displaying the avatar editing interface that includes the representation of the virtual avatar includes displaying the representation of the virtual avatar with a first facial pose of the virtual avatar, the one or more programs further including instructions for:
while displaying the avatar editing interface including the representation of the virtual avatar with the first facial pose of the virtual avatar, detecting, via the one or more input devices, a first input; and
in response to detecting the first input, transitioning the representation of the virtual avatar from the first facial pose of the virtual avatar to a second facial pose of the virtual avatar that is different from the first facial pose.

15. The computer system of claim 1, the one or more programs further including instructions for:
while displaying the avatar editing interface including a representation of a respective avatar sticker in the set of stickers, detecting expiration of a predetermined amount of time; and
in response to detecting expiration of the predetermined amount of time, displaying a representation of a subsequent avatar sticker in the set of stickers different from the respective avatar sticker.

16. The computer system of claim 15, wherein:
the set of stickers includes one or more avatar stickers that show a respective avatar feature that is currently selected for editing and one or more avatar stickers that do not show the respective avatar feature that is currently selected for editing; and
the respective avatar sticker and the subsequent avatar sticker are selected from a first subset of avatar stickers that includes multiple stickers that show the respective avatar feature and does not include stickers that do not show the respective avatar feature.

17. The computer system of claim 15, the one or more programs further including instructions for:
while displaying a representation of a sticker from the set of stickers, detecting an input corresponding to a request to display editing options for a fifth avatar feature of the plurality of avatar features; and
in response to detecting the input corresponding to the request to display editing options for the fifth avatar feature, displaying a representation of a first sticker that is selected from a second subset of avatar stickers that includes multiple stickers that show the fifth avatar feature and does not include stickers that do not show the fifth avatar feature.

18. The computer system of claim 1, wherein updating display of the avatar editing interface includes displaying an animation of the representation of the virtual avatar transitioning to the representation of the first avatar sticker.

19. The computer system of claim 18, wherein the animation of the representation of the virtual avatar transitioning to the representation of the first avatar sticker includes adjusting a zoom level of the representation of the virtual avatar and, after adjusting the zoom level of the representation of the virtual avatar, displaying the representation of the first avatar sticker.

20. The computer system of claim 18, wherein the animation of the representation of the virtual avatar transitioning to the representation of the first avatar sticker includes displaying facial features of the representation of the virtual avatar moving to the first pose shown in the representation of the first avatar sticker.

21. The computer system of claim 1, the one or more programs further including instructions for:
displaying, via the display generation component, a messaging interface for a conversation between a first participant and a second participant, wherein the messaging interface includes a sticker display region that includes one or more avatar stickers in the set of stickers, wherein the avatar stickers are selectable to initiate a process to add a respective avatar sticker to the conversation.

22. The computer system of claim 21, wherein the sticker display region includes one or more stickers from a second set of stickers based on the virtual avatar that includes one or more stickers that are different from stickers in the set of stickers that includes the first avatar sticker and the second avatar sticker.

23. A non-transitory computer-readable storage medium storing one or more programs configured to be executed by one or more processors of a computer system that is in communication with a display generation component and one or more input devices, the one or more programs including instructions for:
displaying, via the display generation component, an avatar editing interface that includes:
a representation of a virtual avatar having a plurality of avatar features, wherein the virtual avatar is associated with a set of stickers including a first avatar sticker that shows the virtual avatar in a first pose and a second avatar sticker that shows the virtual avatar in a second pose different from the first pose; and
a first set of one or more graphical interface objects that are selectable for modifying a first avatar feature of the plurality of avatar features that are visible in the representation of the virtual avatar;
while displaying the avatar editing interface including the representation of the virtual avatar, detecting, via the one or more input devices, an input corresponding to a request to display editing options for a second avatar feature of the plurality of avatar features; and
in response to detecting the input, updating display of the avatar editing interface, including:
displaying a representation of the first avatar sticker having an appearance that includes the second avatar feature and is based on an appearance of the virtual avatar; and
displaying a second set of one or more graphical interface objects that are selectable for modifying one or more of the avatar features that are visible in the first avatar sticker.

24. The computer-readable storage medium of claim 23, wherein:
the first avatar sticker that shows the virtual avatar in the first pose includes a first portion of the virtual avatar that is not visible in the representation of the virtual avatar displayed in the avatar editing interface; and
the second avatar sticker that shows the virtual avatar in the second pose includes a second portion of the virtual avatar that is not visible in the representation of the virtual avatar displayed in the avatar editing interface.

25. The computer-readable storage medium of claim 23, the one or more programs further including instructions for:
while displaying the representation of the first avatar sticker, detecting, via the one or more input devices, a second input; and
in response to detecting the second input, displaying a representation of the second avatar sticker having an appearance that includes the second avatar feature and is based on an appearance of the virtual avatar.

26. The computer-readable storage medium of claim 25, the one or more programs further including instructions for:
while displaying the representation of the second avatar sticker having a first appearance, detecting, via the one or more input devices, a set of one or more inputs that includes an input corresponding to a request to change an appearance of the virtual avatar; and
in response to detecting the set of one or more inputs, displaying the representation of the second avatar sticker having a second appearance different from the first appearance and based on the request to change the appearance of the virtual avatar.

27. The computer-readable storage medium of claim 23, the one or more programs further including instructions for:
while displaying the avatar editing interface including the representation of the virtual avatar:
detecting, via the one or more input devices, an input corresponding to a request to display editing options for a third avatar feature of the plurality of avatar features; and
in response to detecting the input corresponding to the request to display editing options for the third avatar feature of the plurality of avatar features, displaying a third set of one or more graphical interface objects that are selectable for modifying the third avatar feature.

28. The computer-readable storage medium of claim 23, the one or more programs further including instructions for:
while displaying the avatar editing interface including the representation of the first avatar sticker:
detecting, via the one or more input devices, an input corresponding to a request to display editing options for a fourth avatar feature of the plurality of avatar features; and
in response to detecting the input corresponding to the request to display editing options for the fourth avatar feature of the plurality of avatar features, displaying a fourth set of one or more graphical interface objects that are selectable for modifying the fourth avatar feature.

29. The computer-readable storage medium of claim 23, the one or more programs further including instructions for:
while displaying the avatar editing interface including the representation of the virtual avatar having a first appearance of the first avatar feature, detecting, via the one or more input devices, a selection of one of the graphical interface objects in the first set of one or more graphical interface objects; and
in response to detecting the selection of one of the graphical interface objects in the first set of one or more graphical interface objects, displaying the representation of the virtual avatar having a second appearance of the first avatar feature that is different from the first appearance and based on the selected graphical interface object in the first set of one or more graphical interface objects.

30. The computer-readable storage medium of claim 23, the one or more programs further including instructions for:
while displaying the avatar editing interface including the representation of the first avatar sticker having a first appearance of the second avatar feature, detecting, via the one or more input devices, a selection of one of the graphical interface objects in the second set of one or more graphical interface objects; and in response to detecting the selection, displaying the representation of the first avatar sticker having a second appearance of the second avatar feature that is different from the first appearance and based on the selected graphical interface object in the second set of one or more graphical interface objects.

31. The computer-readable storage medium of claim 30, wherein the second avatar feature includes avatar clothing.

32. The computer-readable storage medium of claim 30, wherein the second avatar feature includes avatar arms.

33. The computer-readable storage medium of claim 23, wherein displaying the avatar editing interface that includes the representation of the virtual avatar includes displaying an animation of the representation of the virtual avatar.

34. The computer-readable storage medium of claim 33, wherein the animation of the representation of the virtual avatar is based on a face that is detected by one or more cameras associated with the computer system.

35. The computer-readable storage medium of claim 23, wherein the representation of the first avatar sticker is static.

36. The computer-readable storage medium of claim 23, wherein displaying the avatar editing interface that includes the representation of the virtual avatar includes displaying the representation of the virtual avatar with a first facial pose of the virtual avatar, the one or more programs further including instructions for:

while displaying the avatar editing interface including the representation of the virtual avatar with the first facial pose of the virtual avatar, detecting, via the one or more input devices, a first input; and in response to detecting the first input, transitioning the representation of the virtual avatar from the first facial pose of the virtual avatar to a second facial pose of the virtual avatar that is different from the first facial pose.

37. The computer-readable storage medium of claim 23, the one or more programs further including instructions for:

while displaying the avatar editing interface including a representation of a respective avatar sticker in the set of stickers, detecting expiration of a predetermined amount of time; and in response to detecting expiration of the predetermined amount of time, displaying a representation of a subsequent avatar sticker in the set of stickers different from the respective avatar sticker.

38. The computer-readable storage medium of claim 37, wherein:

the set of stickers includes one or more avatar stickers that show a respective avatar feature that is currently selected for editing and one or more avatar stickers that do not show the respective avatar feature that is currently selected for editing; and the respective avatar sticker and the subsequent avatar sticker are selected from a first subset of avatar stickers that includes multiple stickers that show the respective avatar feature and does not include stickers that do not show the respective avatar feature.

39. The computer-readable storage medium of claim 37, the one or more programs further including instructions for:

while displaying a representation of a sticker from the set of stickers, detecting an input corresponding to a request to display editing options for a fifth avatar feature of the plurality of avatar features; and in response to detecting the input corresponding to the request to display editing options for the fifth avatar feature, displaying a representation of a first sticker that is selected from a second subset of avatar stickers that includes multiple stickers that show the fifth avatar feature and does not include stickers that do not show the fifth avatar feature.

40. The computer-readable storage medium of claim 23, wherein updating display of the avatar editing interface includes displaying an animation of the representation of the virtual avatar transitioning to the representation of the first avatar sticker.

41. The computer-readable storage medium of claim 40, wherein the animation of the representation of the virtual avatar transitioning to the representation of the first avatar sticker includes adjusting a zoom level of the representation of the virtual avatar and, after adjusting the zoom level of the representation of the virtual avatar, displaying the representation of the first avatar sticker.

42. The computer-readable storage medium of claim 40, wherein the animation of the representation of the virtual avatar transitioning to the representation of the first avatar sticker includes displaying facial features of the representation of the virtual avatar moving to the first pose shown in the representation of the first avatar sticker.

43. The computer-readable storage medium of claim 23, the one or more programs further including instructions for:

displaying, via the display generation component, a messaging interface for a conversation between a first participant and a second participant, wherein the messaging interface includes a sticker display region that includes one or more avatar stickers in the set of stickers, wherein the avatar stickers are selectable to initiate a process to add a respective avatar sticker to the conversation.

44. The computer-readable storage medium of claim 43, wherein the sticker display region includes one or more stickers from a second set of stickers based on the virtual avatar that includes one or more stickers that are different from stickers in the set of stickers that includes the first avatar sticker and the second avatar sticker.

45. A method, comprising:

at a computer system that is in communication with a display generation component and one or more input devices:

displaying, via the display generation component, an avatar editing interface that includes:

a representation of a virtual avatar having a plurality of avatar features, wherein the virtual avatar is associated with a set of stickers including a first avatar sticker that shows the virtual avatar in a first pose and a second avatar sticker that shows the virtual avatar in a second pose different from the first pose; and a first set of one or more graphical interface objects that are selectable for modifying a first avatar feature of the plurality of avatar features that are visible in the representation of the virtual avatar;

while displaying the avatar editing interface including the representation of the virtual avatar, detecting, via the one or more input devices, an input corresponding to a request to display editing options for a second avatar feature of the plurality of avatar features; and in response to detecting the input, updating display of the avatar editing interface, including:

displaying a representation of the first avatar sticker having an appearance that includes the second avatar feature and is based on an appearance of the virtual avatar; and displaying a second set of one or more graphical interface objects that are selectable for modifying one or more of the avatar features that are visible in the first avatar sticker.

46. The method of claim 45, wherein:

the first avatar sticker that shows the virtual avatar in the first pose includes a first portion of the virtual avatar that is not visible in the representation of the virtual avatar displayed in the avatar editing interface; and the second avatar sticker that shows the virtual avatar in the second pose includes a second portion of the virtual avatar that is not visible in the representation of the virtual avatar displayed in the avatar editing interface.

47. The method of claim 45, further comprising:

while displaying the representation of the first avatar sticker, detecting, via the one or more input devices, a second input; and in response to detecting the second input, displaying a representation of the second avatar sticker having an appearance that includes the second avatar feature and is based on an appearance of the virtual avatar.

48. The method of claim 47, further comprising:

while displaying the representation of the second avatar sticker having a first appearance, detecting, via the one or more input devices, a set of one or more inputs that includes an input corresponding to a request to change an appearance of the virtual avatar; and in response to detecting the set of one or more inputs, displaying the representation of the second avatar sticker having a second appearance different from the first appearance and based on the request to change the appearance of the virtual avatar.

49. The method of claim 45, further comprising:

while displaying the avatar editing interface including the representation of the virtual avatar:

detecting, via the one or more input devices, an input corresponding to a request to display editing options for a third avatar feature of the plurality of avatar features; and in response to detecting the input corresponding to the request to display editing options for the third avatar feature of the plurality of avatar features, displaying a third set of one or more graphical interface objects that are selectable for modifying the third avatar feature.

50. The method of claim 45, further comprising:

while displaying the avatar editing interface including the representation of the first avatar sticker:

detecting, via the one or more input devices, an input corresponding to a request to display editing options for a fourth avatar feature of the plurality of avatar features; and in response to detecting the input corresponding to the request to display editing options for the fourth avatar feature of the plurality of avatar features, displaying a fourth set of one or more graphical interface objects that are selectable for modifying the fourth avatar feature.

51. The method of claim 45, further comprising:

while displaying the avatar editing interface including the representation of the virtual avatar having a first appearance of the first avatar feature, detecting, via the one or more input devices, a selection of one of the graphical interface objects in the first set of one or more graphical interface objects; and in response to detecting the selection of one of the graphical interface objects in the first set of one or more graphical interface objects, displaying the representation of the virtual avatar having a second appearance of the first avatar feature that is different from the first appearance and based on the selected graphical interface object in the first set of one or more graphical interface objects.

52. The method of claim 45, further comprising:

while displaying the avatar editing interface including the representation of the first avatar sticker having a first appearance of the second avatar feature, detecting, via the one or more input devices, a selection of one of the graphical interface objects in the second set of one or more graphical interface objects; and in response to detecting the selection, displaying the representation of the first avatar sticker having a second appearance of the second avatar feature that is different from the first appearance and based on the selected graphical interface object in the second set of one or more graphical interface objects.

53. The method of claim 52, wherein the second avatar feature includes avatar clothing.

54. The method of claim 52, wherein the second avatar feature includes avatar arms.

55. The method of claim 45, wherein displaying the avatar editing interface that includes the representation of the virtual avatar includes displaying an animation of the representation of the virtual avatar.

56. The method of claim 55, wherein the animation of the representation of the virtual avatar is based on a face that is detected by one or more cameras associated with the computer system.

57. The method of claim 45, wherein the representation of the first avatar sticker is static.

58. The method of claim 45, wherein displaying the avatar editing interface that includes the representation of the virtual avatar includes displaying the representation of the virtual avatar with a first facial pose of the virtual avatar, the method further comprising:

while displaying the avatar editing interface including the representation of the virtual avatar with the first facial pose of the virtual avatar, detecting, via the one or more input devices, a first input; and in response to detecting the first input, transitioning the representation of the virtual avatar from the first facial pose of the virtual avatar to a second facial pose of the virtual avatar that is different from the first facial pose.

59. The method of claim 45, further comprising:

while displaying the avatar editing interface including a representation of a respective avatar sticker in the set of stickers, detecting expiration of a predetermined amount of time; and in response to detecting expiration of the predetermined amount of time, displaying a representation of a subsequent avatar sticker in the set of stickers different from the respective avatar sticker.

60. The method of claim 59, wherein:

the set of stickers includes one or more avatar stickers that show a respective avatar feature that is currently selected for editing and one or more avatar stickers that do not show the respective avatar feature that is currently selected for editing; and the respective avatar sticker and the subsequent avatar sticker are selected from a first subset of avatar stickers that includes multiple stickers that show the respective avatar feature and does not include stickers that do not show the respective avatar feature.

61. The method of claim 59, further comprising:

while displaying a representation of a sticker from the set of stickers, detecting an input corresponding to a request to display editing options for a fifth avatar feature of the plurality of avatar features; and in response to detecting the input corresponding to the request to display editing options for the fifth avatar feature, displaying a representation of a first sticker that is selected from a second subset of avatar stickers that includes multiple stickers that show the fifth avatar feature and does not include stickers that do not show the fifth avatar feature.

62. The method of claim 45, wherein updating display of the avatar editing interface includes displaying an animation of the representation of the virtual avatar transitioning to the representation of the first avatar sticker.

63. The method of claim 62, wherein the animation of the representation of the virtual avatar transitioning to the representation of the first avatar sticker includes adjusting a zoom level of the representation of the virtual avatar and, after adjusting the zoom level of the representation of the virtual avatar, displaying the representation of the first avatar sticker.

64. The method of claim 62, wherein the animation of the representation of the virtual avatar transitioning to the representation of the first avatar sticker includes displaying facial features of the representation of the virtual avatar moving to the first pose shown in the representation of the first avatar sticker.

65. The method of claim 45, further comprising:

displaying, via the display generation component, a messaging interface for a conversation between a first participant and a second participant, wherein the messaging interface includes a sticker display region that includes one or more avatar stickers in the set of stickers, wherein the avatar stickers are selectable to initiate a process to add a respective avatar sticker to the conversation.

66. The method of claim 65, wherein the sticker display region includes one or more stickers from a second set of stickers based on the virtual avatar that includes one or more stickers that are different from stickers in the set of stickers that includes the first avatar sticker and the second avatar sticker.

* * * * *